United States Patent
Mahoney et al.

(10) Patent No.: US 10,472,943 B2
(45) Date of Patent: *Nov. 12, 2019

(54) SELF-SUSPENDING PROPPANTS FOR HYDRAULIC FRACTURING

(71) Applicant: SELF-SUSPENDING PROPPANT LLC, Chesterland, OH (US)

(72) Inventors: Robert P. Mahoney, Newbury, MA (US); David S. Soane, Chestnut Hill, MA (US); Marie K. Herring, Watertown, MA (US); Kevin P. Kincaid, Salt Lake City, UT (US); Rosa Casado Portilla, Peabody, MA (US); Philip Wuthrich, Belmont, MA (US)

(73) Assignee: SELF-SUSPENDING PROPPANT LLC, Independence, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/721,983

(22) Filed: Oct. 2, 2017

(65) Prior Publication Data

US 2018/0044578 A1   Feb. 15, 2018
US 2018/0194991 A9   Jul. 12, 2018

Related U.S. Application Data

(60) Division of application No. 15/078,371, filed on Mar. 23, 2016, now abandoned, which is a continuation of
(Continued)

(51) Int. Cl.
*E21B 43/267* (2006.01)
*C09K 8/80* (2006.01)
(Continued)

(52) U.S. Cl.
CPC .............. *E21B 43/267* (2013.01); *C09K 8/62* (2013.01); *C09K 8/80* (2013.01); *C09K 8/805* (2013.01);
(Continued)

(58) Field of Classification Search
None
See application file for complete search history.

(56) References Cited

U.S. PATENT DOCUMENTS

| 2,703,316 A | 3/1955 | Schneider |
| 3,596,141 A | 7/1971 | Jones et al. |

(Continued)

FOREIGN PATENT DOCUMENTS

| CA | 276357 | 12/1927 |
| CA | 2763357 | 12/2010 |

(Continued)

OTHER PUBLICATIONS

QUAB® Cationization of Polymer, Product literature of SKW Quab Chemicals, Inc. of Saddle Brook, NJ, pp. 1-11.
(Continued)

*Primary Examiner* — Anuradha Ahuja
(74) *Attorney, Agent, or Firm* — Calfee, Halter & Griswold LLP

(57) ABSTRACT

The invention provides for modified proppants, comprising a proppant particle and a hydrogel coating, wherein the hydrogel coating localizes on the surface of the proppant particle to produce the modified proppant, methods of manufacturing such proppants and methods of use.

26 Claims, 14 Drawing Sheets

Related U.S. Application Data application No. 13/838,806, filed on Mar. 15, 2013, now Pat. No. 9,297,244, which is a continuation-in-part of application No. 13/599,828, filed on Aug. 30, 2012, now Pat. No. 9,315,721, and a continuation-in-part of application No. 13/599,828, filed on Aug. 30, 2012, now Pat. No. 9,315,721.

(60) Provisional application No. 61/529,600, filed on Aug. 31, 2011, provisional application No. 61/635,612, filed on Apr. 19, 2012, provisional application No. 61/662,681, filed on Jun. 21, 2012, provisional application No. 61/725,751, filed on Nov. 13, 2012, provisional application No. 61/764,792, filed on Feb. 14, 2013.

(51) Int. Cl.
*C09K 8/62* (2006.01)
*B01J 13/14* (2006.01)

(52) U.S. Cl.
CPC .......... *B01J 13/14* (2013.01); *Y10T 428/2991* (2015.01); *Y10T 428/2998* (2015.01)

(56) References Cited

U.S. PATENT DOCUMENTS

| | | | |
|---|---|---|---|
| 3,912,692 A | 10/1975 | Casey et al. | |
| 3,956,141 A | 5/1976 | Walker | |
| 4,022,736 A | 5/1977 | Schmitt et al. | |
| 4,387,769 A | 6/1983 | Erbstoesser et al. | |
| 4,417,989 A | 11/1983 | Hunter | |
| 4,532,052 A | 7/1985 | Weaver et al. | |
| 4,554,021 A | 11/1985 | Harvey et al. | |
| 4,888,240 A | 12/1989 | Graham et al. | |
| 5,124,376 A | 6/1992 | Clark, Jr. | |
| 5,161,615 A | 11/1992 | Hutchins et al. | |
| 5,216,050 A | 6/1993 | Sinclair | |
| 5,279,656 A | 1/1994 | Kenyon et al. | |
| 5,728,742 A | 3/1998 | Staples et al. | |
| 5,837,656 A | 11/1998 | Sinclair et al. | |
| 5,924,888 A | 7/1999 | Nguyen et al. | |
| 5,925,714 A | 7/1999 | Larson et al. | |
| 6,109,350 A * | 8/2000 | Nguyen | C09K 8/14 166/281 |
| 6,169,058 B1 | 1/2001 | Lee et al. | |
| 6,279,656 B1 | 8/2001 | Sinclair | |
| 6,323,307 B1 | 11/2001 | Bigg et al. | |
| 6,364,018 B1 | 4/2002 | Brannon et al. | |
| 6,605,674 B1 | 8/2003 | Whipple et al. | |
| 6,667,374 B2 | 12/2003 | Hernandez-Barajas et al. | |
| 6,734,147 B2 | 5/2004 | Levy | |
| 6,742,590 B1 | 6/2004 | Nguyen | |
| 6,866,099 B2 | 3/2005 | Nguyen | |
| 6,892,813 B2 | 5/2005 | Nguyen et al. | |
| 7,021,379 B2 | 4/2006 | Nguyen | |
| 7,032,667 B2 | 4/2006 | Nguyen et al. | |
| 7,044,220 B2 | 5/2006 | Nguyen et al. | |
| 7,131,491 B2 | 11/2006 | Blauch et al. | |
| 7,132,389 B2 | 11/2006 | Lee | |
| 7,135,231 B1 | 11/2006 | Sinclair et al. | |
| 7,178,596 B2 | 2/2007 | Blauch et al. | |
| 7,204,312 B2 | 4/2007 | Roddy et al. | |
| 7,216,711 B2 | 5/2007 | Nguyen et al. | |
| 7,228,904 B2 | 6/2007 | Todd et al. | |
| 7,244,492 B2 | 7/2007 | Sinclair et al. | |
| 7,261,156 B2 | 8/2007 | Nguyen et al. | |
| 7,264,051 B2 | 9/2007 | Nguyen et al. | |
| 7,299,869 B2 | 11/2007 | Kalman | |
| 7,308,939 B2 | 12/2007 | Welton et al. | |
| 7,442,741 B2 | 10/2008 | Boyer et al. | |
| 7,461,697 B2 | 12/2008 | Todd et al. | |
| 7,482,309 B2 | 1/2009 | Ravi et al. | |
| 7,490,667 B2 | 2/2009 | Sinclair et al. | |
| 7,571,767 B2 | 8/2009 | Parker et al. | |
| 7,666,469 B2 | 2/2010 | Weintritt et al. | |
| 7,718,583 B2 | 5/2010 | Barmatov et al. | |
| 7,721,804 B2 | 5/2010 | Duenckel | |
| 7,726,070 B2 | 5/2010 | Thrash | |
| 7,730,948 B2 | 6/2010 | de Grood et al. | |
| 7,754,659 B2 | 7/2010 | Rediger et al. | |
| 7,772,163 B1 | 8/2010 | Brannon et al. | |
| 7,789,147 B2 | 9/2010 | Brannon et al. | |
| 7,902,128 B2 | 3/2011 | Zhang et al. | |
| 7,931,084 B2 | 4/2011 | Nguyen et al. | |
| 7,931,087 B2 | 4/2011 | Gupta | |
| 7,931,089 B2 | 4/2011 | Miller et al. | |
| 7,934,554 B2 | 5/2011 | Roddy | |
| 7,968,501 B2 | 6/2011 | Parris | |
| 7,972,997 B2 | 7/2011 | Svoboda et al. | |
| 8,058,213 B2 | 11/2011 | Rediger et al. | |
| 8,062,998 B2 | 11/2011 | Fulton et al. | |
| 8,066,068 B2 | 11/2011 | Lesko et al. | |
| 8,105,986 B2 | 1/2012 | Zhang | |
| 8,127,849 B2 | 3/2012 | Gupta | |
| 8,236,738 B2 | 8/2012 | Zhang | |
| 8,240,383 B2 | 8/2012 | Xu et al. | |
| 8,470,746 B2 | 6/2013 | Eoff | |
| 8,605,674 B2 | 12/2013 | Park et al. | |
| 8,661,729 B2 | 3/2014 | Hendrickson et al. | |
| 9,297,244 B2 | 3/2016 | Mahoney et al. | |
| 9,315,721 B2 | 4/2016 | Mahoney et al. | |
| 9,644,139 B2 | 5/2017 | Mahoney et al. | |
| 9,796,916 B2 | 10/2017 | Mahoney et al. | |
| 9,845,427 B2 | 12/2017 | Soane et al. | |
| 9,845,428 B2 | 12/2017 | Soane et al. | |
| 9,845,429 B2 * | 12/2017 | Mahoney | C09K 8/80 |
| 9,868,896 B2 | 1/2018 | Mahoney et al. | |
| 9,932,521 B2 | 4/2018 | Soane et al. | |
| 2003/0032562 A1 | 2/2003 | Crossman et al. | |
| 2003/0106713 A1 | 6/2003 | Slater et al. | |
| 2003/0131998 A1 | 7/2003 | Nguyen et al. | |
| 2004/0081015 A1 | 4/2004 | Graham | |
| 2004/0188089 A1 | 9/2004 | Nguyen | |
| 2004/0244978 A1 | 12/2004 | Shaarpour | |
| 2005/0006095 A1 | 1/2005 | Justus et al. | |
| 2005/0019574 A1 | 1/2005 | McCrary | |
| 2005/0115710 A1 | 6/2005 | Kotler et al. | |
| 2005/0123590 A1 | 6/2005 | Burton | |
| 2005/0167105 A1 | 8/2005 | Roddy et al. | |
| 2005/0194141 A1 | 9/2005 | Sinclair et al. | |
| 2005/0244641 A1 | 11/2005 | Vincent | |
| 2005/0274510 A1 | 12/2005 | Nguyen et al. | |
| 2006/0175059 A1 | 8/2006 | Sinclair et al. | |
| 2006/0185847 A1 | 8/2006 | Saini et al. | |
| 2006/0211776 A1 | 9/2006 | Crews | |
| 2007/0202318 A1 | 8/2007 | Smith et al. | |
| 2007/0227732 A1 | 10/2007 | Miller et al. | |
| 2007/0246214 A1 | 10/2007 | Fish et al. | |
| 2008/0011477 A1 | 1/2008 | Rediger et al. | |
| 2008/0078547 A1 | 4/2008 | Sinclair | |
| 2008/0108524 A1 * | 5/2008 | Willberg | C09K 8/035 507/225 |
| 2008/0135242 A1 * | 6/2008 | Lesko | C09K 8/665 166/268 |
| 2008/0176009 A1 | 7/2008 | Chereau et al. | |
| 2008/0257553 A1 | 10/2008 | Gatlin et al. | |
| 2008/0257833 A1 | 10/2008 | Fite et al. | |
| 2008/0289828 A1 | 11/2008 | Hutchins et al. | |
| 2009/0038797 A1 | 2/2009 | Skala et al. | |
| 2009/0038799 A1 | 2/2009 | Garcia-Lopez De Victoria et al. | |
| 2009/0062154 A1 | 3/2009 | Windebank | |
| 2009/0071653 A1 | 3/2009 | Hodge | |
| 2009/0099047 A1 | 4/2009 | Cunningham et al. | |
| 2010/0089581 A1 * | 4/2010 | Nguyen | C09K 8/685 166/280.2 |
| 2010/0126726 A1 | 5/2010 | Armstrong | |
| 2010/0147515 A1 | 6/2010 | Hughes et al. | |
| 2010/0167965 A1 | 7/2010 | Sebastian et al. | |
| 2010/0204071 A1 | 8/2010 | Zhang | |
| 2010/0249273 A1 | 9/2010 | Scales et al. | |
| 2010/0252262 A1 | 10/2010 | Ekstrand et al. | |

(56) References Cited

U.S. PATENT DOCUMENTS

| | | | |
|---|---|---|---|
| 2010/0252263 A1* | 10/2010 | Ferrero | C04B 33/138 166/280.2 |
| 2010/0256024 A1 | 10/2010 | Zhang | |
| 2010/0270023 A1 | 10/2010 | Dusterhoft et al. | |
| 2010/0307749 A1 | 12/2010 | Nguyen et al. | |
| 2011/0098377 A1 | 4/2011 | Huang et al. | |
| 2011/0120719 A1* | 5/2011 | Soane | C09K 8/94 166/308.1 |
| 2011/0272325 A1* | 11/2011 | Soane | C09K 8/524 208/14 |
| 2011/0289841 A1 | 12/2011 | Thrash | |
| 2012/0018162 A1 | 1/2012 | Tanguey et al. | |
| 2012/0058355 A1 | 3/2012 | Lee et al. | |
| 2012/0067576 A1 | 3/2012 | Reyes | |
| 2012/0071371 A1 | 3/2012 | Zhang | |
| 2012/0080192 A1 | 4/2012 | Hendrickson et al. | |
| 2012/0190593 A1 | 7/2012 | Soane | |
| 2012/0225800 A1 | 9/2012 | Hendrickson | |
| 2012/0267105 A1 | 10/2012 | Zhang | |
| 2012/0267112 A1 | 10/2012 | Zhang et al. | |
| 2013/0186624 A1 | 7/2013 | McCrary et al. | |
| 2013/0196884 A1 | 8/2013 | Kakadjian et al. | |
| 2013/0233545 A1 | 9/2013 | Mahoney | |
| 2014/0000891 A1 | 1/2014 | Mahoney et al. | |
| 2014/0014348 A1 | 1/2014 | Mahoney et al. | |
| 2014/0060832 A1 | 3/2014 | Mahoney | |
| 2014/0076558 A1 | 3/2014 | Nguyen et al. | |
| 2014/0087974 A1 | 3/2014 | Villarreal | |
| 2014/0138092 A1 | 5/2014 | Reddy et al. | |
| 2015/0252252 A1 | 9/2015 | Soane et al. | |
| 2016/0200966 A1 | 7/2016 | Mahoney et al. | |
| 2016/0215208 A1 | 7/2016 | Monastiriotis et al. | |
| 2016/0298926 A1 | 10/2016 | Aboushabana et al. | |
| 2017/0335178 A1 | 11/2017 | Aboushabana et al. | |
| 2018/0030338 A1* | 2/2018 | Lu | C09K 8/805 |
| 2018/0155614 A1 | 6/2018 | Soane et al. | |
| 2018/0201828 A1* | 7/2018 | Pravesh | C09K 8/64 |
| 2019/0002756 A1 | 1/2019 | Kincaid et al. | |

FOREIGN PATENT DOCUMENTS

| | | |
|---|---|---|
| CN | 1894284 A | 1/2007 |
| CN | 101903453 A | 12/2010 |
| CN | 102127415 | 7/2011 |
| CN | 102167969 A | 8/2011 |
| CN | 104379697 A | 2/2015 |
| EP | 0101855 | 3/1984 |
| EP | 0933414 | 4/2003 |
| EP | 2066761 | 2/2009 |
| EP | 2027361 | 6/2009 |
| EP | 2175004 | 4/2010 |
| EP | 2433998 A1 | 3/2012 |
| EP | 1654439 | 6/2012 |
| JP | 05237369 | 9/1993 |
| JP | 10054990 | 2/1996 |
| JP | 200014604 | 5/2000 |
| JP | 2001058126 | 3/2001 |
| JP | 2001342377 | 12/2001 |
| JP | 2004517712 | 6/2004 |
| JP | 2006508074 | 3/2006 |
| JP | 3832777 | 10/2006 |
| JP | 2007532721 | 11/2007 |
| JP | 2009503196 | 1/2009 |
| JP | 2009542862 | 12/2009 |
| JP | 2010502992 | 1/2010 |
| JP | 2010513212 | 4/2010 |
| RU | 2392295 | 6/2010 |
| RU | 2445339 | 3/2012 |
| RU | 2446200 | 3/2012 |
| RU | 2459852 | 8/2012 |
| WO | 199530818 | 11/1995 |
| WO | 1995995604 | 11/1995 |
| WO | 2005121505 | 12/2005 |
| WO | 2006023172 | 3/2006 |
| WO | 2007007039 | 1/2007 |
| WO | 2007147072 | 12/2007 |
| WO | 2008028074 | 3/2008 |
| WO | 2008042317 | 4/2008 |
| WO | 2008056302 | 5/2008 |
| WO | 2008088449 A2 | 7/2008 |
| WO | 2008130279 | 10/2008 |
| WO | 2009078745 | 6/2009 |
| WO | 2009088315 | 7/2009 |
| WO | 2009091511 | 7/2009 |
| WO | 2010043852 | 4/2010 |
| WO | 2010084442 | 7/2010 |
| WO | 2010126925 | 11/2010 |
| WO | 20102129119 | 11/2010 |
| WO | 2011050046 | 4/2011 |
| WO | 2011056409 | 5/2011 |
| WO | 2011063004 | 5/2011 |
| WO | 2011081549 | 7/2011 |
| WO | 2011136678 | 11/2011 |
| WO | 2012010627 | 1/2012 |
| WO | 2012045155 | 4/2012 |
| WO | 2012151109 A1 | 11/2012 |
| WO | 2013158306 | 10/2013 |
| WO | 2013188413 | 12/2013 |
| WO | 2016070044 A1 | 5/2016 |
| WO | 2010070600 | 6/2016 |
| WO | 2017091463 A1 | 6/2017 |
| WO | 2019005570 A1 | 1/2019 |

OTHER PUBLICATIONS

Moad, Chemical Modification of Starch by Reactive Extrusion, Progress in Polymer Science 36 (2011) 218-237.
Properties of Modified Starches and their Use in the Surface Treatment of Paper, Dissertation of Anna Jonhed, 2006:42, at http://www.diva-portal.org/smash/get/diva2:6450/FULLTEXT01.pdfAnna, Karlstad University 2006.
Kalia & Averous, Biopolymers: Biomedical and Environmental Applications, p. 89, © 2011 by Scrivener Publishing LLC, Co-published by John Wiley & Sons, Hoboken, N.J.
Maher, Alkali Gelatinization of Starches, Starch/Starke 35 (1983) Nr. 7, S. 226-234, © Verlag Chemie GmbH, D-6940 Weinheim 1983.
Harper, J.M. (1978). "Food extrusion". Critical Reviews in Food Science and Nutrition 11 (2): 155-215. doi:10.1080/10408397909527262. PMID 378548.
Riaz, Mian N. (2000). Extruders in Food Applications. CRC Press. p. 193. ISBN 9781566767798.
Office Action for U.S. U.S. Appl. No. 14/631,946 dated Apr. 28, 2017.
First Office Action for Omani Patent Application No. OM/P/2014/00039 dated Feb. 25, 2017.
Second Office Action for Chinese Patent Application No. 201280042615.X dated Feb. 21, 2017.
Office Action for U.S. Appl. No. 15/340,000 dated Feb. 17, 2017.
Response to Office Action dated Dec. 12, 2016 for U.S. Appl. No. 14/197,596 dated Mar. 13, 2017.
Office Action for U.S. Appl. No. 15/081,037 dated Jan. 23, 2017.
Office Action for U.S. Appl. No. 14/197,596 dated Apr. 6, 2017.
Office Action for U.S. Appl. No. 12/908,411 dated May 26, 2017.
Response to Office Action dated Jan. 23, 2017 for U.S. Appl. No. 15/081,037 dated Apr. 21, 2017.
Office Action for U.S. Appl. No. 15/339,986 dated May 25, 2017.
Response to Second Office Action from Chinese Patent Application No. 201280042615.x dated May 8, 2017.
Response to Office Action dated Feb. 17, 2017 for U.S. Appl. No. 15/340,000 dated May 17, 2017.
Office Action from U.S. Appl. No. 14/197,596 dated Dec. 12, 2016.
Response to Office Action dated May 19, 2016 from U.S. Appl. No. 12/908,411 dated Oct. 5, 2016.
Response to First Office Action from Chinese Patent Application No. 201280042615.X dated Oct. 28, 2016, together with an English translation of the observations and amended claims only.

(56) References Cited

OTHER PUBLICATIONS

Response to Office Action dated Apr. 1, 2016 from Canadian Patent Application No. 2,845,840 dated Oct. 31, 2016.
Response to First Office Action from Russian Patent Application No. 2014107250 dated Jul. 5, 2016, together with an English translation of the amended set of claims only.
English translation of Decision to Grant from Russian Patent Application No. 2014107250 dated Aug. 25, 2016.
Response to EP Communication dated Oct. 12, 2016 from European Patent Application No. 13778228.0 dated Dec. 15, 2016.
First Office Action from U.S. Appl. No. 15/339,986 dated Dec. 29, 2016.
Notice of Allowance from U.S. Appl. No. 14/958,112 dated Jan. 17, 2017.
English Text of First Office Action from Chinese Patent Application No. 201380030270.0 dated Aug. 30, 2016.
Response to Office Action dated Jun. 6, 2016 from U.S. Appl. No. 14/197,596 dated Sep. 15, 2016.
Response to Examiner's Report dated Oct. 15, 2015 from Australian Patent Application No. 2012301900 dated Sep. 5, 2016.
International Search Report and Written Opinion from International Application No. PCT/US2016/026166 dated Jun. 13, 2016.
Final Office Action from U.S. Appl. No. 12/908,411 dated May 19, 2016.
Office Action from U.S. Appl. No. 14/197,596 dated Jun. 7, 2016.
Office Action from Canadian Patent Application No. 2,777,748 dated May 14, 2014.
Norman, I.R., "Application of Curable Resin-Coated Proppants", SPE Production Engineering, Nov. 1992.
International Search Report and Written Opinion from International Application No. PCT/US2010/053354 dated Dec. 21, 2010.
International Preliminary Report on Patentability from International Application No. PCT/US2013/032435 dated Oct. 21, 2014.
International Preliminary Report on Patentability from International Application No. PCT/2012/05134 dated Mar. 4, 2014.
International Search Report and Written Opinion from International Application No. PCT/US2013/032424 dated Jun. 6, 2013.
International Search Report and Written Opinion from International Application No. PCT/2013/046867 dated Feb. 20, 2014.
International Search Report and Written Opinion from International Application No. PCT/US2013/032435 dated Jun. 5, 2013.
International Search Report and Written Opinion from International Application No. PCT/US2013/050098 dated Mar. 11, 2014.
International Preliminary Report on Patentability from International Application No. PCT/US2013050098 dated Dec. 23, 2014.
International Preliminary Report on Patentability from International Application No. PCT/US2013/046867 dated Dec. 23, 2014.
International Preliminary Report on Patentability from International Application No. PCT/2013/032424 dated Oct. 21, 2014.
Kim A.J. et al., "Swelling-Based Method for Preparing Stable, Functionalized Polymer Colloids" J. Am. Chem. Soc. 127(6): 1592-1593 (2005).
Written Opinion from International Application No. PCT/US2012/053134 dated Nov. 26, 2012.
Office Action from U.S. Appl. No. 13/838,806, dated Apr. 9, 2015.
Website printout, Wikipedia's monographs on Binding Constant; http://en.wikipedia/org/wiki/Binding_constant; page last modified on Feb. 1, 2014; retrieved Apr. 23, 2015; 2 pages.
English Text of First Office Action for Chinese Patent Application No. 20130030233.x dated Aug. 19, 2016.
Response to Office Action dated Jul. 24, 2015 from Canadian Patent Application No. 2,845,840 dated Jan. 22, 2016.
Office Action from U.S. Appl. No. 13/599,828 dated May 6, 2015.
Search Report from European Patent Application No. 12828438.7 dated Aug. 18, 2015.
International Search Report and Written Opinion from PCT/US2015/18374 dated May 28, 2015.
Office Action from Canadian Patent Application No. 2845840 dated Jul. 24, 2015.

International Search Report and Written Opinion from International Application No. PCT/US2015/018377 dated Jun. 5, 2015.
http://www.balcoindia.com/operation/bauxite2.aspx, downloaded on Aug. 14, 2015.
http://www.aqua-calc.com/page/density-table/substance/sand-coma-and-blank-fine, downloaded Aug. 14, 2015.
http://www.aqua-cal.com/page/density-table/substance/bauxite-coma-and-blank-crushed, downloaded Aug. 14, 2015.
Office Action from U.S. Appl. No. 13/923,158 dated Jun. 4, 2015.
Response to Office Action dated Apr. 9, 2015 from U.S. Appl. No. 13/838,806 dated Sep. 2, 2015.
Response to Office Action dated Aug. 19, 2015 from U.S. Appl. No. 12/908,411 dated Feb. 18, 2016.
Office Action from U.S. Appl. No. 12/908,411 dated Aug. 19, 2015.
Notice of Allowance from U.S. Appl. No. 13/599,828 dated Feb. 29, 2016.
English translation of Office Action from Russian Patent Application No. 201407250 dated Apr. 17, 2016.
Website printout, Wikipedia's monographs on Ligand; http://en.wikipedia/org/wiki/Ligand_(biochemistry); page last modified on Feb. 6, 2014; retrieved Apr. 23, 2015; 5 pages.
Clarke, Neil, "Binding equilibria", Topics in Biophysical Chemistry, 1998; http://biophysics.med.jhmi/edu/courses/pdf/bindeq.pdf; 18 pages.
Review of Chemical Equilibrium; University of Buffalo, Review of Chemical Equilibrium, University of Buffalo, www.acsu.buffalo.edu/~koudelka/Binding-constant-lectures.pdf, known prior art, 15 pages.
Thordason, Determining Association Constants from Titration Experiments in Supramolecular Chemistry, Chem. Soc. Rev. 2011, vol. 40, pp. 1305-1323.
Marina MA, Evans WJ, Berger RL; "Use of the twin-cell differential titration calorimeter for binding studies. I. EDTA and its calcium complex." J Biochem Biophys Methods. Mar. 1985; 10(5-6): 273-85.
Response to Office Action dated May 14, 2014 from Canadian Patent Application No. 2,777,748 dated Nov. 16, 2015.
Patent Examination Report No. 1 from Australian Patent Application No. 2012301990 dated Oct. 15, 2015.
Notice of Allowance from U.S. Appl. No. 13/838,806 dated Dec. 24, 2015.
Search Report from European Patent Application No. 13778014.4 dated Nov. 19, 2015.
Patent Examination Report No. 1 from Australian Patent Application No. 2013249743 dated Dec. 18, 2015.
First Office Action from Chinese Patent Application No. 201280042615.x dated Nov. 23, 2015.
Response to Office Action dated May 6, 2015 from U.S. Appl. No. 13/599,828 filed Nov. 5, 2015.
Patent Examination Report No. 1 from Australian Patent Application No. 2013249741 dated Dec. 14, 2015.
Search Report from European Patent Application No. 13778228.0 dated Nov. 6, 2015.
Office Action for Taiwanese Patent Application No. 102141303 dated Jun. 21, 2017.
Amendment and Response to Office Action dated Apr. 6, 2017 for U.S. Appl. No. 14/197,596 dated Jun. 26, 2017.
Notice of Allowance for Canadian Patent Application No. 2,777,748 dated Aug. 10, 2017.
Response to Office Action dated May 25, 2017 for U.S. Appl. No. 15/339,986 dated Aug. 24, 2017.
Notice of Allowance for U.S. Appl. No. 15/081,037 dated Jun. 29, 2017.
Response to Office Action dated Feb. 17, 2017 for Canadian Patent Application No. 2,845,840 dated Aug. 17, 2017.
Response to Office Action dated May 26, 2017 for U.S. Appl. No. 12/908,411 dated Aug. 24, 2017.
Office Action for U.S. Appl. No. 14/631,946 dated Aug. 11, 2017.
Office Action for U.S. Appl. No. 15/091,987 dated Sep. 22, 2017.
Notice of Allowance for U.S. Appl. No. 14/631,946 dated Nov. 24, 2017.

(56) References Cited

OTHER PUBLICATIONS

Tudorachi, Synthesis and Swelling behaviour of some crosslinked poly(vinyl alchol)-acrylamide hydrogels, materials Plastice, 45, Nr.4 2008 (Year 2008) from 05278-4USC3.
Office Action for U.S. Appl. No. 15/834,255 dated Apr. 10, 2018.
Office Action for U.S. Appl. No. 15/782,922 dated Feb. 21, 2018.
Effect of Chemical Treatment on the Characteristic of Shrimp Chitosan—Lertsutthiwong et al. Journal of Metlas, Materials and Mineral, vol. 12, No. 1, pp. 11-18 (2002).
Office Action for U.S. Appl. No. 15/091,987 dated Dec. 4, 2017.
Search Report for International application No. PCT/US2017/056287 dated Jan. 4, 2018.
Search Report for International application No. PCT/US2017/056452 dated Jan. 4, 2018.
Office Action for U.S. Appl. No. 15/091,987 dated Apr. 25, 2018.
Response to Office Action dated Jun. 6, 2016 for U.S. Appl. No. 14/197,596 dated Mar. 15, 2016.
Goldstein et al., "Self-suspending proppant transport technology increases stimulated reservoir volume and reduces proppant pack and formation damage," Journal of Petroleum Scient and Engineering, Sep. 1, 2015, pp. 1016.
Soane et al., Self-Suspending proppants from Hydraulic Fracturing, : Mar. 7, 2013, pp. 406.
Akdogan, Hulya, "High Mositure food extrusion," International Journal of Food Science and Technology, 1999, 34, pp. 195-207.
Examination Report for GGC Patent Application No. GC2017-34166 dated Apr. 22, 2018.
Search Report and Written Opinion for International Application No. PCT/US18/05314 dated Sep. 14, 2018.
Response to Office Action dated Apr. 25, 2018 for U.S. Appl. No. 15/091,987 dated Jul. 24, 2018.
English translation Office Action for Mexican Patent Application No. Mx/a/2014/02423 dated Jun. 21, 2018.
Request for Reconsideration in response to the Office Action dated Apr. 10, 2018 for U.S. Appl. No. 15/834,255 dated Jul. 9, 2018.
Notice of Allowance for U.S. Appl. No. 14/197,596 dated Oct. 19, 2017.
Response to Office Action dated Apr. 6, 2017 for U.S. Appl. No. 14/197,596 dated Jun. 26, 2017.
Response to Final Office Action dated Aug. 11, 2017 for U.S. Appl. No. 141631,946 dated Nov. 10, 2017.
Response to Office Action dated Apr. 28, 2017 for U.S. Appl. No. 14/631,946 dated Jun. 27, 2017.
Advisory Action for U.S. Appl. No. 15/091,987 dated Sep. 20, 2018.
Response to Office Action dated Dec. 4, 2017 for U.S. Appl. No. 15/091,987 dated Feb. 28, 2018.
Okay, Oguz, "Swelling behavior of poly(acrylamide-co-sodium acrylate) hydrogels in aqueous salt solutions: theory versus experiments", European Polymer Journal 36 (2000) 393-399.
Office Action for U.S. Appl. No. 15/091,987 dated Oct. 19, 2018.
Office Action for U.S. Appl. No. 15/595,722 dated Sep. 19, 2018.
Notice of Allowance for U.S. Appl. No. 15/834,255 dated Nov. 2, 2018.
Office Action for U.S. Appl. No. 15/952,459 dated Sep. 6, 2018.
Office Action for U.S. Appl. No. 15/782,066 dated Jan. 31, 2019.
Office Action for U.S. Appl. No. 15/595,722 dated Jan. 30, 2019.
Response to Office Action dated Oct. 19, 2018 for U.S. Appl. No. 15/091,987 dated Jan. 18, 2019.
Office Action for U.S. Appl. No. 15/952,459 dated Jan. 18, 2019.

* cited by examiner

SELF-SUSPENDING PROPPANTS FOR HYDRAULIC FRACTURING

RELATED APPLICATIONS

This application is a divisional application of U.S. patent application Ser. No. 15/078,371, filed Mar. 23, 2016, which claims benefit of U.S. application Ser. No. 13/599,828 filed Aug. 30, 2012, which claims the benefit of U.S. Provisional Application Ser. No. 61/529,600, filed Aug. 31, 2011, U.S. Provisional Application Ser. No. 61/635,612 filed Apr. 19, 2012, and U.S. Provisional Application Ser. No. 61/662,681, filed Jun. 21, 2012; this application also claims the benefit of U.S. Provisional Application No. 61/635,612, filed Apr. 19, 2012, U.S. Provisional Application Ser. No. 61/662,681, filed Jun. 21, 2012, U.S. application Ser. No. 13/599,828 filed Aug. 30, 2012, U.S. Provisional Application Ser. No. 61/725,751, filed Nov. 13, 2012 and U.S. Provisional Application Ser. No. 61/764,792 filed Feb. 14, 2013. The entire teachings of the above applications are incorporated herein by reference.

FIELD OF APPLICATION

This application relates generally to systems, formulations and methods for fracturing technologies.

BACKGROUND

In the process of acquiring oil and/or gas from a well, it is often necessary to stimulate the flow of hydrocarbons via hydraulic fracturing. The term "fracturing" refers to the method of pumping a fluid into a well until the pressure increases to a level that is sufficient to fracture the subterranean geological formations containing the entrapped materials. This process results in cracks and breaks that disrupt the underlying layer to allow the hydrocarbon product to be carried to the well bore at a significantly higher rate. Unless the pressure is maintained, however, the newly formed openings close. In order to open a path and maintain it, a propping agent or "proppant" is injected along with the hydraulic fluid to create the support needed to preserve the opening. As the fissure is formed, the proppants are delivered in a slurry where, upon release of the hydraulic pressure, the proppants form a pack or a prop that serves to hold open the fractures.

To accomplish the placement of the proppants inside the fracture, these particles are suspended in a fluid that is then pumped to its subterranean destination. To prevent the particles from settling, a high viscosity fluid is often required to suspend them. The viscosity of the fluid is typically managed by addition of synthetic or naturally-based polymers. There are three common types of polymer-enhanced fluid systems in general use for suspending and transporting proppants during hydraulic fracturing operations: slickwater, linear gel, and crosslinked gel.

In slickwater systems, an anionic or cationic polyacrylamide is typically added as a friction reducer additive, allowing maximum fluid flow with a minimum of pumping energy. Since the pumping energy requirements of hydraulic fracturing are high, on the order of 10,000-100,000 horsepower, a friction reducer is added to slickwater fluids to enable high pumping rates while avoiding the need for even higher pumping energy. While these polymers are effective as friction reducers, they are not highly effective as viscosifiers and suspending agents. Slickwater polymer solutions typically contain 0.5-2.0 gallons of friction reducer polymer per 1000 gallons of slickwater fluid, and the solutions have low viscosity, typically on the order of 3-15 cps. At this low viscosity, suspended proppant particles can readily settle out of suspension as soon as turbulent flow is stopped. For this reason, slickwater fluids are used in the fracturing stages that have either no proppant, proppant with small particle size, or low proppant loadings.

The second type of polymer enhanced fluid system is known as a linear gel system. Linear gel systems typically contain carbohydrate polymers such as guar, hydroxyethylcellulose, hydroxyethyl guar, hydroxypropyl guar, and hydroxypropylcellulose. These linear gel polymers are commonly added at a use rate of 10-50 pounds of polymer per 1000 gallons of linear gel fluid. These concentrations of linear gel polymer result in a fluid with improved proppant suspending characteristics vs. the slickwater fluid. The linear gel fluids are used to transport proppants, at loading levels of about 0.1 to 1 pound of proppant per gallon of fluid. Above this proppant loading level, a more viscous solution is typically required to make a stable suspension.

Crosslinked gel is the most viscous type of polymer-enhanced fluid used for transporting of proppant. In crosslinked gel systems, the linear gel fluid as described above is crosslinked with added reagents such as borate, zirconate, and titanate in the presence of alkali. Upon crosslinking of the linear gel fluid into a crosslinked gel fluid, the viscosity is much higher and the proppants can be effectively suspended. The linear gel and crosslinked gel fluids have certain advantages but they require a high dose rate of expensive polymer.

Modifications of proppant particles could be used advantageously to improve their performance in hydraulic fracturing systems. First, if the proppant particles were more buoyant, a less viscous suspension fluid could be used, which would still convey the particles to the target area but which would be easier to pump into the formation. Second, it is desirable that the proppants remain where they are placed throughout the lifetime of the well after they have been injected into a fracture line. If changes within the reservoir during well production force the proppants out of position, production equipment can be damaged, and the conductivity of the reservoir formation can be decreased as the reservoir pores are plugged by the displaced proppants. Third, the proppants in the system should be resistant to closure stress once they are placed in the fracture. Closure stresses can range from 1700 psi in certain shale gas wells, up to and exceeding 15,000 psi for deep, high temperature wells. Care must be taken that the proppants do not fail under this stress, lest they be crushed into fine particles that can migrate to undesirable locations within the well, thereby affecting production. Desirably, a proppant should resist diagenesis during fracture treatment. The high pressures and temperatures combine with the chemicals used in frac fluids can adversely affect the proppant particles, resulting in their diagenesis, which can eventually produce fine particulate matter that can scale out and decrease the productivity of the well over time.

Current proppant systems and polymer-enhanced fracturing fluids endeavor to address these concerns, so that the proppants can be carried by the fracturing fluids, can remain in place once they arrive at their target destination, and can resist the closure stresses in the formation. One approach to preparing suitable proppants includes coating the proppant materials with resins. A resin-coated proppant can be either fully cured or partially cured. The fully cured resin can provide crush resistance to the proppant substrate by helping to distribute stresses among the grain particles. A fully cured resin can furthermore help reduce fine migration by encapsulating the proppant particle. If initially partially cured, the resin may become fully cured once it is placed inside the fracture. This approach can yield the same benefits as the use of a resin that is fully-cured initially. Resins, though, can decrease the conductivity and permeability of the fracture, even as the proppants are holding it open. Also, resins can fail, so that their advantages are lost. Resin-based systems tend to be expensive and they are still prone to settling out of suspension.

In addition, there are health, safety and environmental concerns associated with the handling and processing of proppants. For example, fine particulates ("fines"), such as crystalline silica dust, are commonly found in naturally occurring sand deposits. These fines can be released as a respirable dust during the handling and processing of proppant sand. With chronic exposure, this dust can be harmful to workers, resulting in various inhalation-associated conditions such as silicosis, chronic obstructive pulmonary disease, lung cancers in the like. In addition to these health effects, the fines can cause "nuisance dust" problems such as fouling of equipment and contamination of the environment.

Another approach to preparing suitable proppants involves mixing additives with the proppant itself, such as fibers, elastomeric particles, and the like. The additives, though, can affect the rheological properties of the transport slurry, making it more difficult to deliver the proppants to the desired locations within the fracture. In addition, the use of additives can interfere with uniform placement of the proppant mixture into the fracture site. While there are known methods in the art for addressing the limitations of proppant systems, certain problems remain. There is thus a need in the art for improved proppant systems that allow precise placement, preserve fracture conductivity after placement, protect well production efficiency and equipment life, simplify hydraulic fracturing operations, reduce environmental impact, and promote worker health and safety. It is further desirable that such improved systems be cost-effective.

SUMMARY OF THE INVENTION

The invention relates to modified proppants, comprising a proppant particle and a hydrogel coating, wherein the hydrogel coating localizes on the surface of the proppant particle to produce the modified proppant. The proppant particles can be solids such as sand, bauxite, sintered bauxite, ceramic, or low density proppant. Alternatively or additionally, the proppant particle comprises a resin-coated substrate. Optionally, the modified proppant further comprises an adhesion promoter, optionally affixing the hydrogel coating to the resin-coated substrate. The hydrogel coating preferably comprises a water-swellable polymer. The hydrogel coating can be manufactured form a water soluble polymer. The preferred weight average molecular weight of the polymer is ≥about 1 million g/mol, preferably ≥about 5 million g/mol. Preferably, the proppant is dry, free-flowing when dry and/or free-flowing after being subjected to a relative humidity of between about 80%-90% for one hour at 25-35° C. The hydrogel coating is preferably durable and possesses a shearing ratio as determined by a Shear Analytical Test of ≥0.6.

The invention relates to methods of manufacturing the proppants and to the proppants produced by the methods. Preferably, the hydrogel coating is applied to the proppant particle as a liquid coating formulation that dries to form a substantially continuous film on the surface of the proppant particle. The modified proppant can be made by an invert emulsion coating technique in which the proppant particle substrate is combined with an invert emulsion in which the oil phase forms the continuous phase of the emulsion and a solution or dispersion of the superabsorbent polymer in water forms the discontinuous, emulsified phase.

The hydrogel coating preferably comprises a polymer selected from the group consisting of polyacrylamide, hydrolyzed polyacrylamide, copolymers of acrylamide with ethylenically unsaturated ionic comonomers, copolymers of acrylamide and acrylic acid salts, poly(acrylic acid) or salts thereof, carboxymethyl cellulose, hydroxyethyl cellulose, hydroxypropyl cellulose, guar gum, carboxymethyl guar, carboxymethyl hydroxypropyl guar gum, hydrophobically associating swellable emulsion polymers, and latex polymers. The amount of hydrogel coating can be less than about 5 wt % of the total dry weight.

The modified proppant is preferably self-suspending. Preferred proppants of the invention can undergo a volumetric expansion of at least 100%, preferably at least 500%, upon hydration in an excess of water.

The modified proppants can comprise additional excipients, such as a cationic/anionic polymer pair comprising a cationic polymer and a high molecular weight anionic polymer. The cationic polymer can be selected from the group consisting of poly-DADMAC, LPEI, BPEI, chitosan, and cationic polyacrylamide.

The modified proppants are preferably used in conjunction with and/or further comprise an oxidative breaker or an enzymatic breaker. The oxidative breaker can be selected from the group consisting of peroxides, magnesium peroxide, calcium peroxide, persulfate salts, nitrate salts, bromate salts, ozone, and oxidizing chlorine species. The oxidative breaker can be a cationically modified oxidative breaker capable of associating with the hydrogel by ionic interaction. The enzymatic breaker can be a cationic enzymatic breaker capable of associating with the hydrogel by ionic interaction. The modified proppant can further comprise a hydrophobic outer layer. For example, the hydrophobic outer layer can be selected from the group consisting of fatty acids, aliphatic amines, hydrophobic quaternary amines, aliphatic amides, hydrogenated oils, vegetable oils, castor oil, triacetin, waxes, polyethylene oxides, and polypropylene oxides. Alternatively, the modified proppant can further comprise a delayed hydration additive, such as a low hydrophilic-lipophilic balance surfactant, an exclusion agent capable of excluding a finishing surfactant, an ionic crosslinking agent, a covalent crosslinking agent and/or a monovalent salt charge shielder. The modified proppant can further comprise an alcohol selected from the group consisting of ethylene glycol, propylene glycol, glycerol, propanol, and ethanol. In an embodiment, the modified proppant of claim 1, further comprises an anticaking agent, such as a hydrophobic layer material, a finely divided particulate material and/or a crosslinking agent. Examples of anticaking agent include calcium silicate, calcium carbonate, talc, kaolin, bentonite, diatomaceous earth, silica, colloidal silica, microcrystalline cellulose, and attapulgate. They can also include fumed silica, calcium silicate, calcium carbonate, kaolin, bentonite and attapulgate. The hydrogel coating can comprise an additive, such as a chemical additive or tracer.

The modified proppant preferably contains less fines than a proppant particle that is not modified.

The invention includes hydraulic fracturing formulations, comprising the modified proppants described herein and an oxidative breaker or an enzymatic breaker. The invention also includes methods of fracturing wells. Such methods preferably comprise the steps:

preparing the hydraulic fracturing formulation of the invention, and introducing the hydraulic fracturing formulation into the well in an effective volume and at an effective pressure for hydraulic fracturing, thereby fracturing the well.

In embodiments, the method of fracturing a well, comprises:

preparing a hydraulic fracturing formulation comprising the modified proppant of the invention, introducing the hydraulic fracturing formulation into the well in an effective volume and at an effective pressure for hydraulic fracturing, providing a breaker formulation comprising an oxidative breaker or an enzymatic breaker, and adding the breaker formulation into the well at an effective volume and at an effective volume, thereby fracturing the well.

In the methods the breaker formulation can be added into the well before, during or after introducing the hydraulic fracturing formulation into the well. The breaker formulation can be added in one or more steps.

In a process for fracturing a geological formation penetrated by a well in which a fracing fluid containing a proppant is charged into the geological formation with pulsed pressure, the invention includes a method for reducing the amount of thickening agent that is added to the fracing fluid comprising selecting as the proppant the modified proppant of the invention. The modified proppants of the invention preferably hydrate essentially completely within 2 hours, such as within 10 minutes, of first being combined with the fracing fluid.

The invention includes methods of manufacturing a modified proppant. Such methods can comprise the steps:

providing a proppant substrate particle and a fluid polymeric coating composition; and applying the fluid polymeric coating composition on the proppant substrate particle;

optionally drying the modified proppant;

wherein the fluid polymeric coating composition comprises a hydrogel polymer, and wherein the hydrogel polymer localizes on the surface of the proppant substrate particle to produce the modified proppant. The step of drying can dry the fluid polymeric coating so as to form a substantially continuous film on the surface of the modified proppant. The method can preferably take place at or near a point of use for the modified proppant, such as a location which produces sand, ceramic, low density proppant, a resin coated substrate, and/or bauxite. The method can further comprise adding an alcohol selected from the group consisting of ethylene glycol, propylene glycol, glycerol, propanol, and ethanol during or before the step of mixing the proppant substrate particles and the fluid polymer coating composition.

The method preferably comprises adding an inversion promoter during or following the step of mixing the proppant substrate particles and the fluid polymer coating composition and/or an anticaking agent.

The methods of manufacturing a hydrogel-coated proppant can also comprise:

providing a proppant substrate particle and a formulation comprising a coating precursor, wherein the coating precursor is capable of forming a hydrogel coating on a surface of the proppant substrate particle by in situ polymerization;

applying the formulation to the proppant substrate particle; and polymerizing the coating precursor in juxtaposition to the proppant substrate particle to form the hydrogel-coated proppant.

The method preferably results in a substantially continuous coating film on the surface of the proppant substrate particle.

DETAILED DESCRIPTION

1. Modified Proppant Particles

Disclosed herein are systems and methods for forming and using proppant particles having a hydrogel surface layer to enhance the hydrodynamic volume of the proppant particles during fluid transport, creating a more stable proppant suspension that resists sedimentation, separation, and screenout before the proppant can reach the intended target destination in the fracture. Further benefits of the hydrogel-coated proppants as disclosed herein include lower tendency to erode equipment, lower friction coefficient in the wet state, good bonding adhesion with each other after placement in a fracture site, resistance to uncontrolled fines formation, and anti-fouling properties attributable to the hydrophilic surface. In embodiments, the disclosed systems for forming proppant particles can be applied to the types of proppant substrates most widely used, e.g., sand, resin coated sand, bauxites, low density proppants, and ceramics. In other embodiments, the proppant particles can be formed from a variety of substrates, including fibrous materials, as would be available to those having ordinary skill in the art. In certain embodiments, the proppant particles can be fabricated so that they resist crush or deformation, so that they resist displacement, and so that they can be suspended in less viscous fluid carriers for transporting into the formation.

Figure 1:
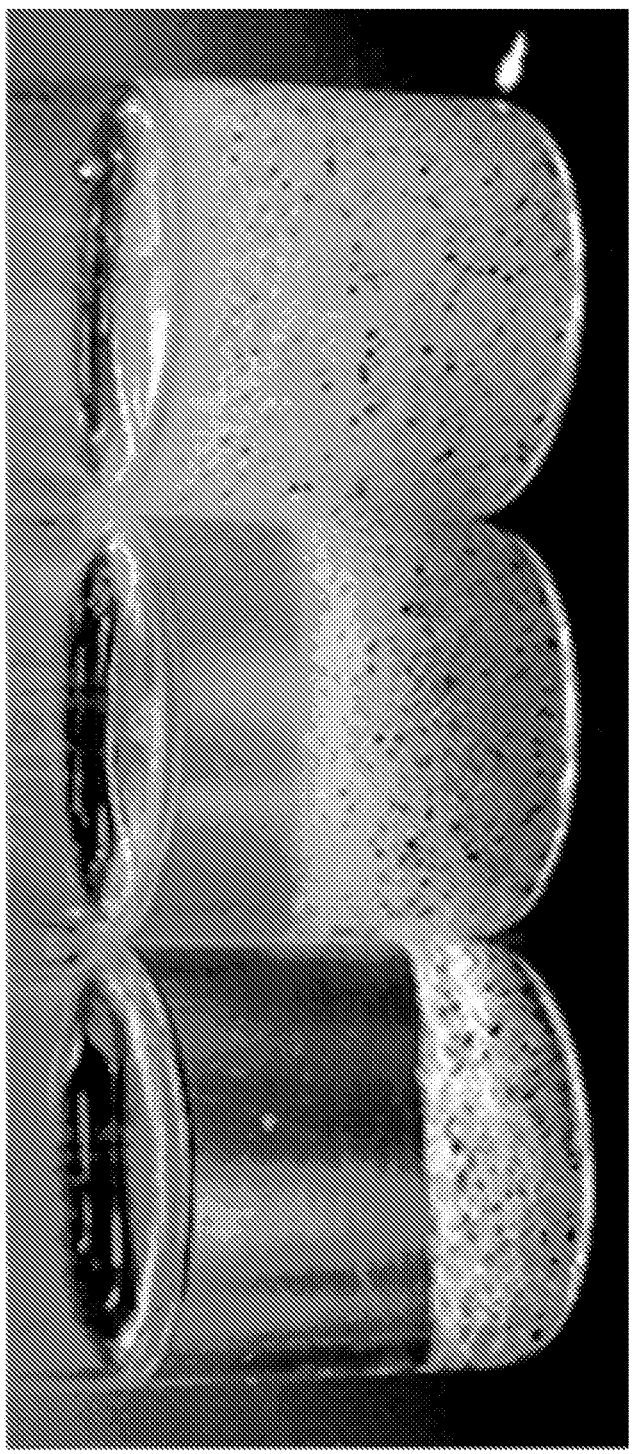
FIG. 1 shows vials of uncoated sand (L) and hydrogel coated sand (middle and R) in water.
Figure 2C:
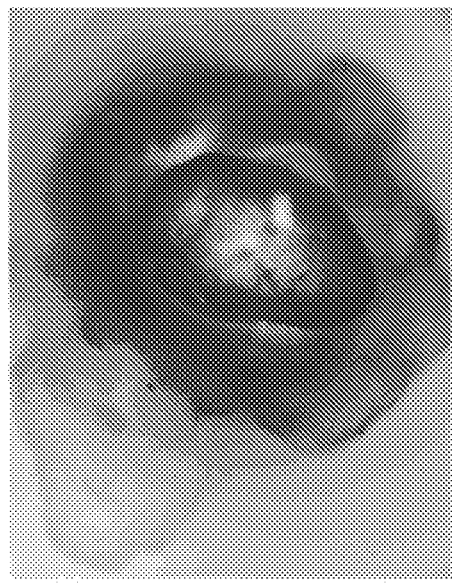
FIGS. 2A-2C shows microscope images of the time dependent hydration of the hydrogel layer on a proppant.
Figure 2B:
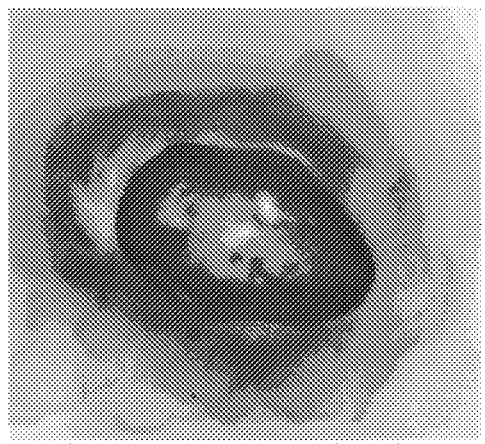
Figure 2A:
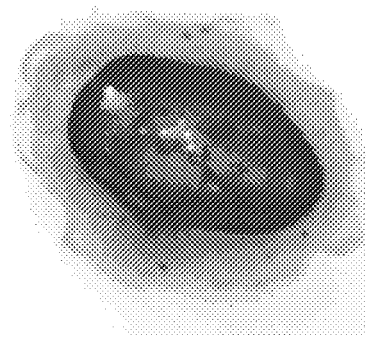

The invention encompasses a modified proppant, comprising a proppant particle and a hydrogel coating, wherein the hydrogel coating localizes on the surface of the proppant particle to produce the modified proppant. In embodiments, these self-suspending proppants are formed by modification of a particulate substrate with a water swellable polymer coating such as a hydrogel. In embodiments, the particulate substrate can be modified with the polymer coating before the particulate substrate is introduced into the fracturing fluid. In embodiments, the amount of hydrogel polymer coating can be in the range of about 0.1 to about 10% based on the weight of the proppant. In embodiments, the hydrogel layer applied onto the surface of the proppant substrate can be a coating thickness of about 0.01% to about 20% of the average diameter of the proppant substrate. Upon hydration and swelling of the hydrogel layer in the fracturing fluid, the hydrogel layer can become expanded with water, such that the expanded hydrogel layer thickness can become about 10% to about 1000% of the average diameter of the proppant substrate. FIG. 1 shows an image of three vials, each containing the same amount of proppant in water, where the vial on the left contains proppant with no hydrogel coating, the vial in the center contains proppant with 1% hydrogel coating, and the vial on the right contains proppant with 3% hydrogel coating. In each vial, the proppant was mixed with water and then allowed to settle for 24 hours without agitation. The settled bed volume of the hydrogel coated proppants is significantly larger than the settled bed volume of the uncoated proppant, showing that the hydrogel coated proppant remains suspended in water. FIGS. 2A, 2B and 2C show, respectively, three light microscopy images of the same hydrogel-coated proppant grain, where each image was taken after a different amount of time hydrating the hydrogel-coated proppant in water. In FIG. 2A, the hydrogel-coated proppant particle had been in water for 15 seconds; in FIG. 2B, the hydrogel-coated proppant particle had been in water for 45 seconds; in FIG. 2C, the hydrogel-coated proppant particle had been in water for 120 seconds. As shown in these Figures, the hydrogel layer grows in volume quickly and expands significantly in size as the hydration time increases.

While it is known in the art to form hydrogel coatings on individual proppant particle substrates by coating them with superabsorbent polymers (see, for example, U.S.2008/0108524), the formulations and methods disclosed herein differ from such technologies in important, advantageous ways. As disclosed herein, hydrogel formulations that are used have certain salient properties. In more detail, the formulations disclosed herein comprise hydrogels that are selected and applied to a proppant particle, forming a modified particle that, in a way so that: (a) when dry, is free flowing, and/or, (b) upon hydration with water, the hydrogel coating is durable and/or the hydrogel coating expands volumetrically so that the volume of the hydrated modified proppant is at least 20% greater than the volume of the dry modified proppant, or is between about 20% to about 50% greater than the volume of the dry modified proppant, or is between about 50% and about 100% greater than the volume of the dry modified proppant, or is between about 100% and about 200% greater than the volume of the dry modified proppant, or is between about 200% and about 400% greater than the volume of the dry modified proppant, or is greater than about 400% of the volume of the dry modified proppant.

As the term "dry" is used herein, a modified proppant will be understood to be dry when its moisture content is 1 wt. % or less. Preferably, the moisture content of the modified proppants of this disclosure, when dry, is ≤0.5 wt. %, or even ≤0.1 wt. %. In embodiments, the thickness of the dried hydrogel coating on the modified proppant can be less than 10 microns, and often less than 2 microns. In embodiments, the hydration of the hydrogel polymers in an aqueous suspension is essentially complete within 2 hours, or within 1 hour, or within 30 minutes, or within 10 minutes, or within 2 minutes or even within 1 minute of being contacted with an excess of tap water at 20° C. As used herein, describing a hydrogel coated proppant as being "hydrated essentially completely" means that the amount of volume increase by the hydrogel coated proppant is at least 80% of the total amount of volume increase by the hydrogel coated proppant when hydrated completely in water.

In embodiments, modified proppants formed in accordance with these formulations and methods, will, when dry, be free flowing, with any clumping or agglomeration being readily dispersed by gentle agitation. The modified proppants shall still be considered to be free-flowing if they exhibit some degree of clumping or agglomeration, provided that these clumps and agglomerates can be broken up by gentle agitation.

The volumetric expansion of the proppants can be determined using a Settled Bed Height Analytical Test. For example, in a 20 mL glass vial, 1 gm of the dry modified proppant to be tested is added to 10 gms of water (e.g., tap water) at approximately 20° C. The vial is then agitated for about 1 minute (e.g., by inverting the vial repeatedly) to wet the modified proppant coating. The vial is then allowed to sit, undisturbed, until the hydrogel polymer coating has become hydrated. The height of the bed formed by the hydrated modified proppant can be measured using a digital caliper. This bed height is then divided by the height of the bed formed by the dry proppant. The number obtained indicates the factor (multiple) of the volumetric expansion. Also, for convenience, the height of the bed formed by the hydrated modified proppant can be compared with the height of a bed formed by uncoated proppant, as shown in the following working Example 5.

Coating durability can be measured following the Shear Analytical Test. For example, 1 L of water (e.g., tap water) is added to a square 1 L beaker (such a beaker having a total volume of approximately 1.25 L, with the fill line at the 1 L mark). The beaker is then placed in an EC Engineering CLM4 paddle mixer. The mixer is set to mix at 300 rpm. Once mixing commences, 50 gm of the modified proppant to be tested, in dry form, is added to the beaker. After 30 seconds of mixing at 300 rpm, the mixing rate is reduced to 200 rpm and mixing is continued until the hydrogel polymer coating is hydrated. The mixture is then poured into a graduated 1 L cylinder and allowed to settle, after which the settled bed height of the modified proppant is measured in the manner indicated above. This settled bed height ("settled bed height with shearing") is then compared with the settled bed height of an identical amount of hydrated modified proppant which has not been subjected to this shear treatment ("settled bed height without shearing"). The amount by which this shear treatment reduces the settled bed height of the modified proppant is a measure of the durability of its hydrogel coating. For the purposes of this disclosure, a hydrogel coating is considered durable if the ratio of the settled bed height with shearing to the settled bed height without shearing ("shearing ratio") is at least 0.2. Modified proppants exhibiting shearing ratios of greater than 0.2, greater than or equal to 0.3, greater than or equal to 0.4, greater than or equal to 0.5, greater than or equal to 0.6, greater than or equal to 0.7, greater than or equal to 0.8, or greater than or equal to 0.9 are desirable.

As indicated above, the type and amount of hydrogel polymer used in the modified proppants disclosed herein can be selected so that the volumetric expansion of the modified proppant, as determined by the above Settled Bed Height Analytical Test, increases by a factor of at least 1.2. In particular embodiments, as shown in working Example 5, this factor can be greater than or equal to about 3, about 5, about 7, about 8 and even about 10.

As also indicated above, the modified proppants of this disclosure are free flowing when dry. In particular embodiments, these modified proppants are free flowing even after being subjected to high humidity conditions, such as would be found, for example, in a mid-summer's day in the southern United States. For this purpose, a modified proppant to be tested can be subjected to humidity test conditions of 80-90% relative humidity at 25-50° C. for 1 hour. A modified proppant that is still free flowing after being subjected to these humidity test conditions is regarded as being free flowing even after being subjected to high humidity conditions.

Methods for modification of proppant include spraying or saturation of a liquid polymer formulation onto a proppant substrate, followed by drying to remove water or other carrier fluids. The drying process can be accelerated by application of heat or vacuum, and by tumbling or agitation of the modified proppant during the drying process. The heating can be applied by forced hot air, convection, friction, conduction, combustion, exothermic reaction, microwave heating, or infrared radiation. Agitation during the proppant modification process has a further advantage of providing a more uniform coating on the proppant material.

Figure 3:
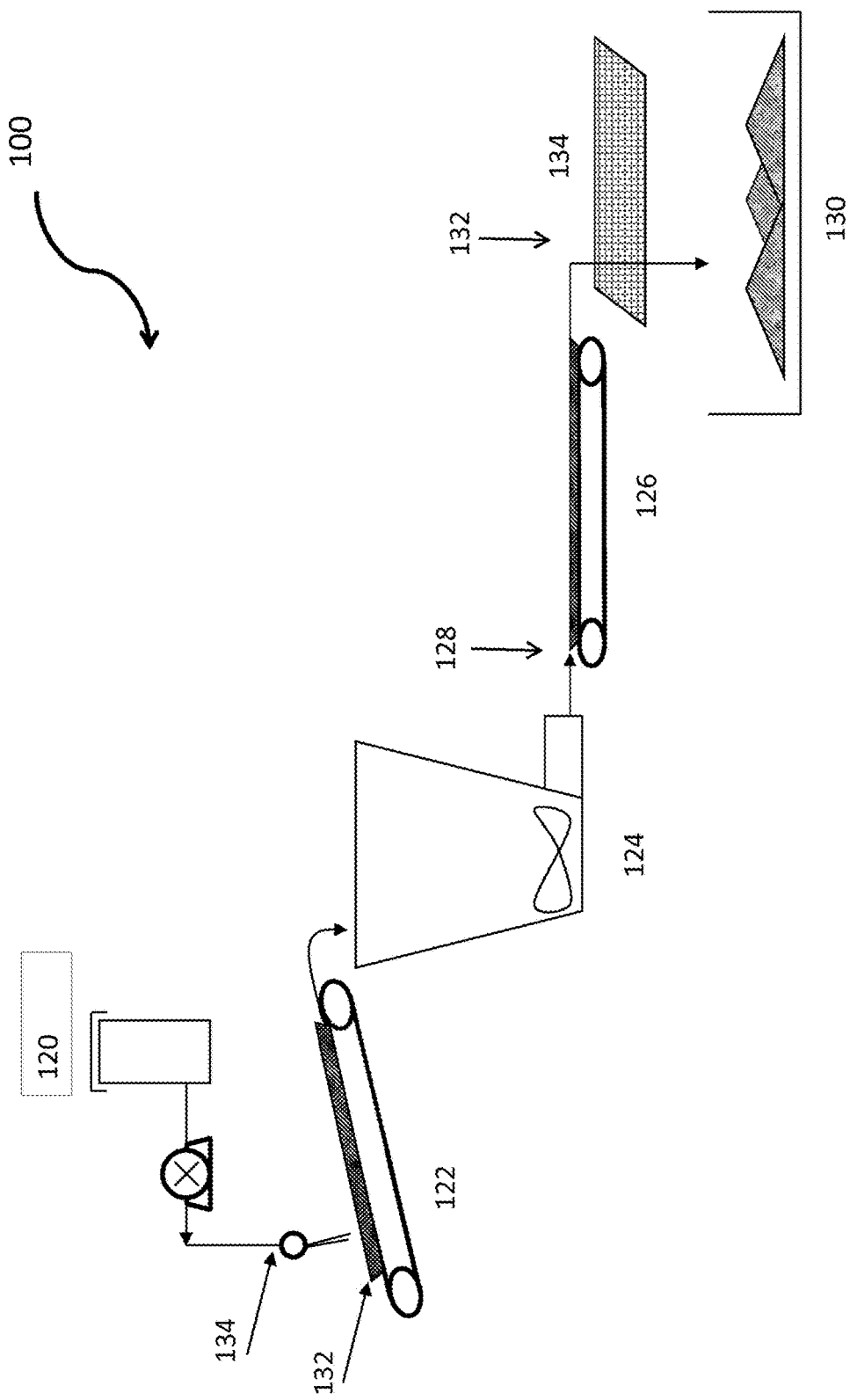
FIG. 3 is a flow diagram of a manufacturing process for self-suspending proppants.

FIG. 3 illustrates schematically a manufacturing process 100 for preparing self-suspending proppant 130 in accordance with the present disclosure. In the depicted embodiment, sand 132 (e.g., dry sand having less than 0.1% moisture) is conveyed via a conveyor belt 122 into a mixing vessel 124, and a liquid polymer composition 120 is sprayed via pump and spray nozzle apparatus 134 onto the sand 132 along the conveyor belt 122. The sand 132 exposed to the liquid polymer 120 reports to a low shear mixing vessel 124, where the ingredients are further blended to form modified sand 128. After mixing, the modified sand containing the liquid polymer is sent to a dryer 126 to remove water and/or organic carrier fluids associated with the liquid polymer 120. After the drying step, the dried modified sand 132 is passed through a finalizing step 134, which can include a shaker and/or other size classification equipment such as a sieve to remove over-sized agglomerates. The finalizing step 134 can also subject the dried modified sand 132 to mechanical mixers, shear devices, grinders, crushers or the like, to break up aggregates to allow the material to pass through the appropriate sized sieve. The finished material 130 is then stored for shipment or use.

In embodiments, the sand or other substrate that is used to produce self-suspending proppant is pre-dried to a moisture content of ≤1%, and preferably ≤0.1% before being modified with a hydrogel polymer. In embodiments, the sand or other substrate temperature at the time of mixing with the liquid polymer is in the range of about 10 to about 200 degrees C., and preferably in the range of about 15 to about 80 degrees C. or between 15 and 60 degrees C.

In embodiments, the proppant substrate is contacted with the liquid polymer composition by means of spraying or injecting. The amount of liquid polymer composition added is in the range of about 1 to about 20%, and preferably about 2 to about 10% by weight of the sand. The proppant substrate and liquid polymer are blended for a period of 0.1 to 10 minutes. In a preferred embodiment, the mixing equipment is a relatively low shear type of mixer, such as a tumbler, vertical cone screw blender, v-cone blender, double cone blender, pug mill, paddle mixer, or ribbon blender. In embodiments, the mixing equipment can be equipped with forced air, forced hot air, vacuum, external heating, or other means to cause evaporation of the carrier fluids.

In embodiments, the modified proppant substrate containing the liquid polymer is dried to remove water and/or organic carrier fluids associated with the liquid polymer. The dryer equipment can be a conveyor oven, microwave, or rotary kiln type. In an embodiment the drying step is carried out in such a way that the dried, modified sand contains less than 1% by weight of residual liquids, including water and any organic carrier fluids associated with the liquid polymer composition.

In embodiments, the same equipment can be used to blend the proppant substrate with the liquid polymer and to dry the blended product in a single processing stage, or in a continuous production line.

In other embodiments, methods for modification of proppant include synthesis of a hydrogel coating in situ, or in the presence of the proppant particle, resulting in a hydrogel layer encapsulating the surface of the proppant particle. As an example, the in situ synthesis of the hydrogel can be accomplished by combining proppant particles with coating precursor monomers and/or macromonomers followed by a polymerization step. In other exemplary instances, a water-soluble polymer can be dissolved in monomers, with or without solvent, followed by polymerization in the presence of the proppant particles, resulting in the formation of interpenetrating polymer networks as a coating on the proppants. In other exemplary instances, the water-soluble polymer is dispersed in the monomers, with or without solvent, and the subsequent polymerization will result in proppants encapsulated by a hydrogel consisting of water-soluble polymer particles locked up by the newly formed polymer. The monomers or macromonomers used can be selected from monomers that result in water-soluble polymers. In other exemplary instances, the particles can be encapsulated by non-water soluble polymer that will then be modified or hydrolyzed to yield the water-soluble hydrogel coating. As would be understood by those of ordinary skill in the art, the encapsulating layer can be formed by different polymerization techniques, with or without solvents. The in situ polymerization of polymer on the surface of proppant grains can have the advantage of reducing or eliminating drying steps.

By way of example, a water-soluble monomer(s) for the hydrogel coating or the in situ polymerization can be chosen from the following monomers or salts thereof: acrylic acid, methacrylic acid, acrylamide, methacrylamide, and their derivatives, carboxyethyl acrylate, hydroxyethylmethacrylate (HEMA), hydroxyethyl acrylate (HEA), polyethyleneglycol acrylates (PEG-acrylates), N-isopropylacrylamide (NiPA), 2-acrylamido-2-methyl-1-propanesulfonic acid (AMPS), sodium salt of styrene sulfonate, vinylsulphonic acid, (meth)allylsulphonic acid, vinylphosphonic acid, N-vinylacetamide, N-methyl-N-vinylacetamide, N-vinylformamide, N-methyl-N-vinylformamide, N-vinylpyrrolidone, N-butyrolactam or N-vinylcaprolactam, maleic anhydride, itaconic acid, vinyl acetate, dimethyldiallylammonium chloride; quaternized dimethylaminoethyl methacrylate (DMAEMA), (meth)acrylamidopropyltrimethylammonium chloride, methylvinylimidazolium chloride; 2-vinylpyridine; 4-vinylpyridine, and the like. The ratio of ionic to nonionic monomers can be selected to yield hydrogels with different charge density. In some instances, for example, it is desirable to have hydrogels with higher charge in order to yield coatings with faster hydration or swelling properties. In an embodiment, the ionic content or charge density of the hydrogel polymer is in the range of 10-70% ionic, with the balance nonionic, on a molar percent basis of the monomers. In a preferred embodiment, the charge density of the hydrogel polymer is in the range of 25-55% on a molar percent basis. In other instances the ionizable monomers can be selected to have higher or lower ionization constants to yield hydrogels more or less stable in brine environments. Other advantageous properties can be imparted by selection of appropriate charge densities.

In embodiments, coating precursors can include polyfunctional monomers that contain more than one polymerizable group and that will introduce the crosslinking or branching points in the hydrogel. Examples of these monomers are: pentaerythritol triallyl ether, PEG-diacrylates and metahcrylates, N,N'-methylenebisacrylamide, epichlorohydrin, divinyl sulfone, and glycidyl methacrylate. When such monomers are used, the crosslinking monomer will be in the range 0.001 to 0.5% of the total monomer content. In selecting a range for adding crosslinkers, one should be aware that adding excessive amounts of crosslinker, for example amounts greater than the 0.001 to 0.05% of total monomer content amount, could form brittle hydrogels that can fracture or degrade under pressure. In embodiments, adding crosslinkers can form hydrogels less likely to become detached from the surface particle under extreme conditions.

In embodiments the monomers/macromonomers used are selected from coating precursor monomers that that will form a non-water soluble coating. After the coating is applied, its further modification will result in the water swellable polymer. As an example, a polymeric coating containing hydrolysable groups can be formed, and subsequent hydrolysis will yield the hydrogel. Examples of monomers that fall in this category are esters, anhydrides, nitriles, and amides; for example the ester monomers methyl acrylate, t-butyl acrylate can be used. As another example, a monomer containing vinyl functionalities can form the hydrogel by different polymerization techniques with or without solvents. The polymerization techniques include bulk, suspension, admicellar, solution polymerization.

In other embodiments, coating monomers or precursors can be selected to form a self-suspending proppant with a hydrogel comprising a polyurethane or polyurea. A list of suitable monomers to form polymers with polyurethane and/or polyurea functionalities are: polyols such as ethylene glycol, propylene glycol, glycerin, trimethylolpropane, 1,2,6-hexanetriol, pentaerythritol, sorbitol, sucrose, a-methylglycoside, polyoxyalkylenes such as PEG, copolymers of PEG-PPG, Pluronics, Tetronics, polyamines such as Jeffamines. Among the isocyanates there may be mentioned toluene-diisocyanate, naphthalenediisocyanate, xylene-diisocyanate, tetramethylene diisocyanate, hexamethylene diisocyanate, trimethylene diisocyanate, trimethyl hexamethylene diisocyanate, cyclohexyl-1,2-diisocyanate, cyclohexylene-1,4-diisocyanate and the like. Other appropriate polymers can include HYPOL® hydrophilic polyurethane prepolymers from Dow, DESMODUR® and MONDUR® resins from Bayer (2,4'-diphenylmethanediisocyanate, 4,4'-diphenylmethanediisocyanate, and their mixtures), and CONATHANE® (polyisocyanate functionalized prepolymers of toluene diisocyanate and poly(tetramethylene glycols)) from Cytec, and the like.

The coating of proppant particle with a polyurethane (PU) hydrogel can be carried out by conventional methods. In an embodiment, the coating can be performed in bulk without the use of solvents. For example, a typical formulation for a crosslinked PU hydrogel can be prepared in a one-step bulk polymerization process using a diisocyanate, polyoxyalkylene, and a multifunctional crosslinking agent. In an embodiment, the formulation will contain 10 to 80% of a polyoxyalkylene having the polyoxyalkylene molecular weight between 200 and 25,000.

Another method to form the hydrogel layer in situ can be carried out by dissolving or suspending a water-soluble polymer in a monomer formulation followed by polymerization of the monomer. The monomers can be selected form the previous list of water soluble monomers. In the case that the water-soluble polymer is dissolved in the monomer mixture, the resulting coating will consist in interpenetrating hydrogel network of the initial water-soluble polymer and the polymer formed in situ. In the case where the water-soluble polymer is suspended in the monomer mixture, the resulting coating will consist of a hydrogel coating in which the water soluble particles are locked up or entrapped. For example, these particles can be trapped inside the newly formed hydrogel coating or they can be bonded to the newly formed polymer. The water-soluble polymer can be dissolved or suspended in the monomer formulation in the presence or absence of a solvent and the polymerization can be carried out by different techniques.

Suitable water soluble polymers to be mixed with monomers can be selected from the group consisting of polyacrylamide, polyacrylic acid, copolymers of acrylamide with acrylic acid salts, polyethyleneglycol, polyvinylpyrrolidone, polyvinylalcohol, carboxymethyl cellulose, hydroxyethyl cellulose, hydroxypropyl cellulose, guar gum, carboxymethyl guar, carboxymethyl hydroxypropyl guar gum, hydrophobically associating swellable emulsion polymers, starches, latex polymers, and the like.

Another method for modification of proppant particles includes chemically grafting hydrophilic polymers onto the particle. The grafting of polymer chains onto the surface of the particle can be done by reactions such as Huisgen cycloaddition and other coupling or addition reactions that can immobilize the polymers onto the particle surface.

The proppant particle used for these purposes can be selected to have surface functional groups such as epoxy, vinyl, amine, hydroxyl, etc. Those groups can then react with polymers having groups capable of reacting with the functional groups on the particle surface. For example, proppant particles comprising silica can be surface modified by silanes such as aminosilanes, vinylsilanes, epoxysilanes, etc.

In embodiments, the polymers that will react with the functionalized particle are hydrophilic linear or branched polymers or copolymers. The polymer can have one or more grafting moiety. In embodiments, the polymers can have functional groups such as amino, carboxyl or salts thereof, hydroxyl, thiol, acid anhydride, acid chloride and/or isocyanate groups which enable covalent binding to the functional groups of the particle. Examples of polymers that can be used to react with the functionalized particle are: epoxide functionalized PEG, amine functionalized PEG, azide functionalized PEG, polyethyleneimine, polyacrylic acid, polyvinyl alcohol, etc.

In embodiments the resulting hydrogel, in addition to having swellable properties, can have temperature responsive or pH-responsive properties. The resulting swellable properties of the proppant can thus be tuned. This is an added benefit for transporting proppant down the wellbore, since temperatures are lower at the early stages in which proppant is transported and full swelling behavior is desirable; higher temperatures are expected inside the fractures where lower swelling of the hydrogel layer is desirable for packing improvement. The monomers used to make the temperature responsive hydrogel coated proppants can be selected from N-isopropylacrylamide (NiPA), ethylene oxide, propylene oxide, or macromonomers/polymers that display a lower critical solution temperature (LCST).

In an embodiment, the process of converting a substrate such as sand into a self-suspending proppant can be conducted at or near the point of use, for example at an oil or gas well site in preparation for hydraulic fracturing. This method has the advantage of converting a commodity material with high material handling costs, such as sand, into a specialized material that has added features. The sand can be acquired from local sources or shipped directly from a sand mining site or warehouse, for modification at the point of use. This avoids having to ship sand first into a blending plant and then ship a second time from the blending plant to the point of use. In the case of sand, the shipping costs can be higher than the material costs, so avoidance of extra shipping is desirable for controlling costs.

In an exemplary manufacturing process, the sand and the modifying chemicals can be added to a continuous mixer. After mixing is complete, the mixture can either be (a) ready to use, or (b) sent to a drying step. The drying step can include a thermal or vacuum drying process, and it can include the addition of anticaking agents. The finished product can be stored in containers at the well site. An example of the mixing equipment is a continuous ribbon blender or a pug mill. The drying step can be a separate process from mixing, and the drying step can be designed to avoid overshearing of the finished product such as a conveyor or tunnel dryer. Other types of drying mechanisms include rotary kilns, microwave driers, paddle driers, and vacuum driers.

Hydrogel polymers that can be used to modify proppants in accordance with the systems and methods disclosed herein can be introduced, in embodiments, as oil-based emulsions, suspensions, water-based emulsions, latexes, solutions, and dispersions. In embodiments, the hydrogel polymers can be introduced as a distilled emulsion, such as an oil based emulsion that has been partially evaporated to remove a portion of the carrier fluids.

This can offer the advantage of reduced drying requirements compared with conventional emulsions. In embodiments, the hydrogel polymer can be an alkali-swellable emulsion, wherein the hydrogel properties of the polymer are not fully developed until the polymer is contacted with alkali. In this embodiment, the alkali-swellable emulsion can be coated onto the proppant substrate to form a modified proppant, and this modified proppant can be suspended in a fracturing fluid in the presence of an alkaline material.

In embodiments, an additive such as an alcohol selected from the group consisting of ethylene glycol, propylene glycol, glycerol, propanol, and ethanol can be added during or before the step of mixing the proppant substrate particles and the liquid polymer coating composition. In embodiments, inversion promoters useful as additives in the polymer coating formulations for self-suspending proppants can include high HLB surfactants, such as polyethylene oxide lauryl alcohol surfactant, (ETHAL LA-12/80% from ETHOX), ethylene glycol, propylene glycol, water, sodium carbonate, sodium bicarbonate, ammonium chloride, urea, barium chloride, and mixtures thereof. In embodiments, inversion promoters can serve the function of facilitating the release of active polymer ingredients from the internal phase of an oil based emulsion polymer into the (typically aqueous) process fluid to be treated. Since this process converts an oil continuous polymer into a water continuous environment, can be characterized as a phase inversion.

In other embodiments, the proppant substrate can be modified with a polymer formulation, without the need for a drying step. This can be accomplished by the use of a solvent-free polymer formulation, or a curable formulation. In certain simplified methods, a dry or liquid polymer formulation can be applied onto the proppant substrate via inline mixing, and the modified material thus prepared can be used without further processing. The moisture content of the proppant substrate can be modified by addition or removal of water, or addition of other liquids, to allow the substrate to be effectively coated, handled, and delivered into the fracturing fluid.

The modified proppants can be further modified with a wetting agent such as a surfactant or other hydrophilic material to allow for effective dispersion into a fracturing fluid. When the hydrogel-modified proppants are suspended into a fracturing fluid, they are considered to be self-suspending if they require a lower viscosity fluid to prevent the particles from settling out of suspension.

The modified proppants can be further modified to improve flowability and handling properties during processing, transport and storage. The hygroscopic surface of the modified proppants can in some cases negatively impact the bulk solids flow of the modified proppants by causing the modified proppants to agglomerate, especially evident in moist and/or high humidity environments. Anticaking properties can be imparted to the modified proppants through further modification to reduce or eliminate agglomeration by reducing the hygroscopic tendency of the modified proppants during processing, transport, and storage or by reducing the interaction of surfaces between adjacent modified proppants during processing, transport and storage, or both. In embodiments, the anticaking agent does not impact the intended performance of the modified proppants once the modified proppants are added to an aqueous fluid in end use applications. The modified proppants can be treated with anticaking agents such as finely divided solids or a second outer layer or both. The second outer layer can be a low level of crosslinking of the modified proppant surface, or a solid non-hygroscopic layer, or a cationic salt layer, or an oily hydrophobic layer or a combination thereof. The modified proppants with the anticaking agent can have improved handling properties, such as free-flowing properties, resistance to clumping, ease of conveying, ease of metering, and ease of discharging from a storage or transport vessel. In embodiments, the modified proppants with the anticaking agents can have reduced drying requirements, so that the finished product can be produced with a reduced amount of energy, time, and equipment.

In embodiments, the anticaking agent is a finely divided solid comprising clays, siliceous materials, organics, metal oxides or fatty acid salts. In other embodiments, the anticaking agent is a finely divided solid such as calcium silicate, magnesium silicate, calcium carbonate, talc, kaolin, bentonite, attapulgite, diatomaceous earth, silica, colloidal silica, fumed silica, corn starch, carbon black, microcrystalline cellulose, iron oxide, aluminum oxide, calcium stearate, magnesium stearate, or combinations thereof.

In embodiments, the anticaking agent is a second outer layer formed by crosslinking the surface of the modified proppant. The addition of a species capable of crosslinking the swellable polymer on the proppant surface can effectively reduce the ability of the polymer layer to swell prematurely. Decreased swelling of the polymer will reduce the tendency of the modified proppant to experience caking or agglomeration during transport and storage. In embodiments, the crosslinking species has the capability of forming a bond with either a hydroxyl functional group, a carboxyl functional group, an amine functional group, or an amide functional group. The crosslinking species can be chosen from organic compounds containing aldehyde, amine, anhydride, or epoxy functional groups. The crosslinking species can also be an organometallic compound. In embodiments, the crosslinking species forms a bond that can be broken or removed under mechanical shear. Organometallic compounds able to associate and/or bond with hydroxyl and carboxyl functional groups are an example of a crosslinking species that form shear-sensitive bonds. Upon the high shear of pumping associated with hydraulic fracturing, the crosslink on the polymer can be degraded and the polymer is able to swell unhindered once the modified proppant is introduced into the hydraulic fracturing fluid.

In embodiments, the anticaking agent is a thin second layer of a solid non-hygroscopic material such as fatty acids, hydrogenated fatty acids, hydrogenated oils, waxes, polyethylene, polyethylene oxides, polypropylene oxides, copolymers of polyethylene oxide and polypropylene oxide, or combinations thereof. Examples of fatty acids suitable for use as a second layer include stearic acid, palmitic acid, lauric acid or tallow fatty acids containing stearic acid, palmitic acid/or lauric acid. Examples of hydrogenated oils suitable for use as a second layer include hydrogenated castor oil. Examples of waxes suitable for use as a second layer include paraffin, petroleum jelly and slack wax. A thin, solid layer can be applied to the surface of the modified proppant to create a barrier preventing the swellable polymer layer on adjacent modified proppant particles from adhering to each other during storage. The solid outer layer utilized can be comprised of compounds that are either water soluble, water insoluble or both. The solid outer layer is non-hygroscopic. The solid outer layer is chosen such that it remains in the solid phase at temperatures below 38° C. and has a melting point in the range of 40° C. to 120° C. In embodiments, the outer layer is chosen such that the melting point is low enough that the outer layer will be in the liquid phase during the drying process in the manufacturing of the modified proppant yet high enough that the outer layer will exist in the solid phase during storage and transport of the modified proppant. The solid phase outer layer acts as a barrier to prevent/reduce caking of the modified proppant due to humid environments. The solid outer layer can be added to the modified proppant as a finely divided powder, a flake, a solution in an oil carrier or as a warm liquid. The solid outer layer can be added to the modified proppant immediately before the polymer, simultaneously with the polymer, as a blend with the polymer, or can be added at some time after addition of polymer but before the drying process. Preferably, the solid outer layer anticaking agent is added after the polymer has been well mixed with the modified proppant but before the modified proppant is dried.

In embodiments the anticaking agent is a second layer of a salt possessing a monovalent cationic charge that can be added to the modified proppant as a liquid or solution in oil at temperatures below 100° C. such as a cationic surfactant or a monovalent salt hydrate. Cationic surfactants comprising a quaternary amine with a hydrophobic tail such as commercially available Adogen 464 or Arquad 2HT-75 from Akzo Nobel can be used as a second coating to give the modified proppant a hydrophobic layer while also neutralizing the potential anionic charge of the polymer. Many salt hydrates, such as sodium acetate trihydrate and sodium aluminum sulfate dodecahydrate, have melting points below 100° C. and can be added to the modified proppant and melted on as a second layer during the drying process of the modified proppant. In both the case of the cationic surfactant and the salt hydrate a concentrated layer of cationic charge on the modified proppant surface is achieved that can reduce the swelling potential of an anionically charged polymer. Upon introduction of the modified proppant to an aqueous stream the monovalent salt would be sufficiently diluted so as to allow the modified proppant to perform as intended.

In embodiments, the anticaking agent is a hydrophobic, lubricious oil second layer applied to the modified proppant, selected from the group consisting of silicone oils, mineral oils, petroleum jellies, triglycerides or a combination thereof. Examples of silicone oils suitable for use as a hydrophobic lubricious second layer include polydimethylsiloxane. Examples of triglycerides suitable for use as a hydrophobic lubricious second layer include corn oil, peanut oil, castor oil and other vegetable oils. Preferably, the hydrophobic lubricious oil has a smoke point and a boiling point above the temperature used in the drying stage of manufacturing the modified proppant. Preferably the smoke point of the oil is above 200° C. Preferably the smoke point of the oil is at least 175° C.

The hydrogel-modified proppants of the invention can advantageously use a localized polymer concentration on the proppant surface, in contrast to the traditional approach of making the entire fluid medium viscous. This localized hydrogel layer can permit a more efficient use of polymer, such that a lower total amount of polymer can be used to suspend proppant, as compared, for example, with conventional polymer-enhanced fracturing fluids such as slickwater, linear gel, and crosslinked gel. Although the hydrogel-modified proppants are considered to be self-suspending, they can be used in combination with friction reducers, linear gels, and crosslinked gels.

The hydrogel-modified proppants as disclosed herein can have the advantage of delivering friction-reducing polymer into the fracturing fluid, so that other friction reducer polymers might not be required or might be required in lesser amounts when the hydrogel-modified proppants are used in hydraulic fracturing operations. In embodiments, some of the hydrogel polymer can desorb from the surface of the proppant to deliver friction reducing benefits or viscosity features to the fracturing fluid. While the exemplary embodiments herein focus on the use of hydrogel-modified proppants for hydraulic fracturing purposes, other uses for hydrogel-modified proppants can be envisioned, where their capabilities for water retention or friction reduction can be exploited. For example, hydrogel-modified proppants can be used for absorbing water from moist environments, forming water-retaining particles that can be removed from the environment, carrying with them undesirable moisture. As another example, hydrogel-modified proppants can be used in situations where adding water to an environment would be advantageous. A hydrogel-modified proppant can be saturated with water or an aqueous solution and then used, for example, as a soil remediation additive in a dry environment. The hydrogel-modified proppant can be formed from sand or other substrates that are compatible with the soil, and they can be transported to the area of interest in dry form; they then can be saturated with water and used as a soil amendment. In other embodiments, hydrogel-modified proppants can be used as a soil amendment in dry form, where they can absorb and hold moisture from the environment, from irrigation, from rainfall and the like. In these embodiments, the moisture-holding properties of the hydrogel-modified proppant can be used advantageously. In embodiments, the hydrogel-modified proppant can be used to reduce erosion of topsoil, seedbeds, hydroseeding mixtures, and the like. In embodiments, the hydrogel-modified proppant can be used as a vehicle for introducing other compatible agents into the region, for example into the soil. Hydrogel-modified proppants can comprise additional formulations that leach out of or through the hydrogel layer into the environment, either as the hydrogel degrades, or as it absorbs moisture and expands. Examples of these formulations include fertilizers, seeds, plant growth regulators, herbicides, pesticides, fungicides, and the like. Other uses for hydrogel-modified proppants prepared in accordance with these formulations and methods can be envisioned that are consistent with their properties described herein.

The hydrogel polymer used for preparation of hydrogel-modified proppants can, in embodiments, comprise polymers such as a polyacrylamide, copolymers of acrylamide with anionic and cationic comonomers, hydrolyzed polyacrylamide, copolymers of acrylamide with hydrophobic comonomers, poly(acrylic acid), poly(acrylic acid) salts, carboxymethyl cellulose, hydroxyethyl cellulose, hydroxypropyl cellulose, guar gum, alginate, carrageenan, locust bean gum, carboxymethyl guar, carboxymethyl hydroxypropyl guar gum, hydrophobically associating swellable emulsion (HASE) polymers, latex polymers, starches, and the like. In embodiments, the hydrogel polymer can have a molecular weight (g/mol) above 1 million, for example a range of 10 million to 40 million Daltons. In embodiments, the hydrogel polymer can be a high molecular weight vinyl addition polymer that is water soluble and has a linear structure.

In embodiments, the hydrogel polymer can be crosslinked as described above to enhance the water absorbing and swelling properties of the polymer. The crosslinkers can be introduced as an element of the hydrogel base polymer, or they can be introduced as chemical modifiers for pre-formed polymers. The crosslinking species can be added directly into the polymer used to coat the proppant, simultaneously added to the proppant with the polymer while mixing, or added some time after addition of the polymer to the proppant but before drying.

Localizing the polymer around the proppant surface as described herein can result in a more effective use of polymer and can prevent proppant from settling out of a polymer solution. In embodiments, the polymer layer hydrates around the proppant effectively preventing proppant/proppant (interparticle) contact. This can prevent the proppant from forming a compact settled bed and can result in a proppant that is easier to resuspend in a fracturing fluid. The resuspension properties for the modified proppants can be important if the fluid flow is interrupted during hydraulic fracturing operations. In this event, when the flow is resumed it is important that the proppant can be resuspended to avoid the loss of proppant or the unintended blockage of a fluid path.

The polymer surface modifications as described herein can cause an increase in the effective hydrodynamic radius of the proppant particle when the polymer swells. This can result in increased drag on the proppant as well as effectively changing the overall hydrogel/particle density. Both can result in a proppant particle with a slower settling rate and superior transport properties.

Figure 4B:
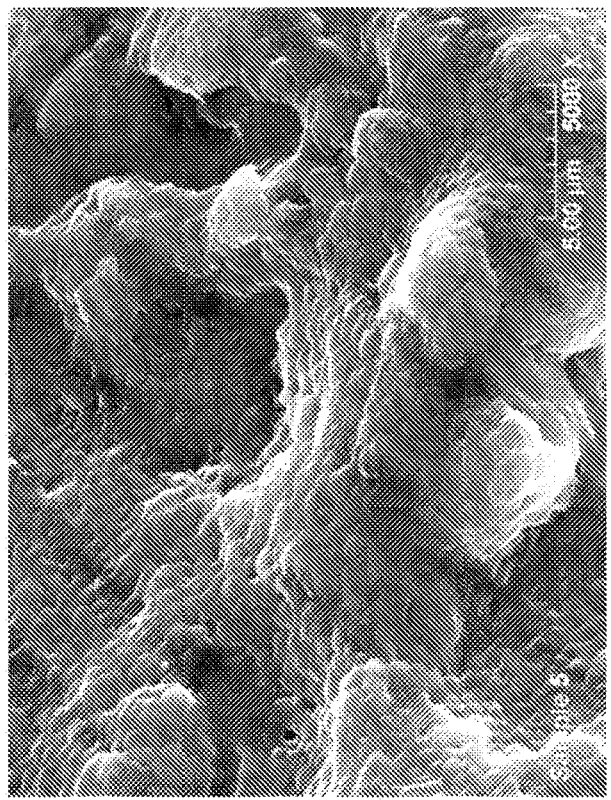
FIG. 4 (FIGS. 4A and 4B) shows SEM images of proppant particles coated with hydrogel, without addition of glycerol (FIG. 4A) and with the addition of glycerol (FIG. 4B).
Figure 4A:
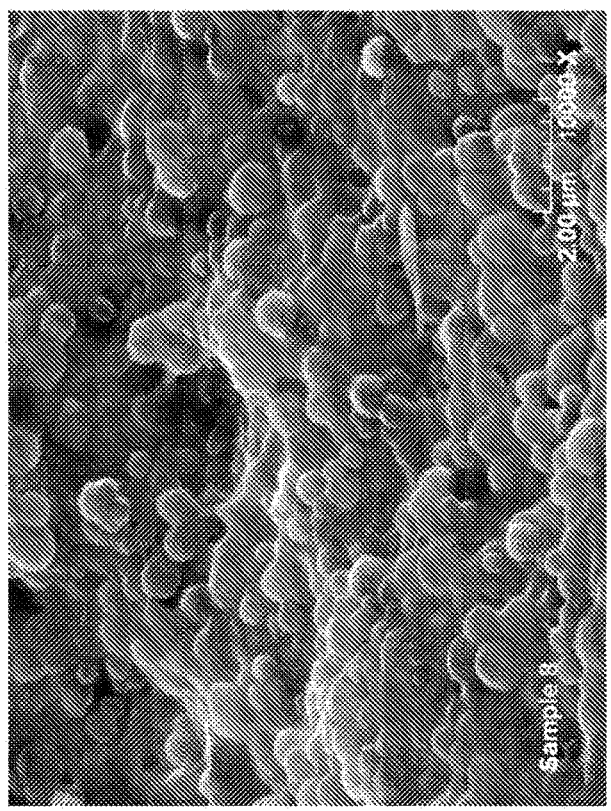
Figure 5:
FIG. 5 shows a SEM image of dried hydrogel coating on the surface of proppant particle.

The hydrogel-modified proppants of the invention can advantageously use a localized polymer concentration on the proppant surface. Preferably, after the hydrogel is hydrated in water and exposed to shear conditions such as pipeline transport, much of the hydrogel polymer remains associated with the proppant surface. In embodiments, the manufacturing process of coating the substrate particles with the hydrogel polymer causes a physical or chemical attachment of the polymer onto the proppant surface. This attachment can be caused by entanglement of the polymer chains upon drying of the hydrogel film, leading to a hydrogel coating that resists desorption upon exposure to shear in the hydrated state. In embodiments, the entanglement of the polymer chains is aided by chemical reaction or interaction of the polymer chains. In embodiments, a linear, non-crosslinked hydrogel polymer is used as a coating to enable the linear polymer chains to become entangled upon formation of the polymer coating. In embodiments, the polymer entanglement is aided by the drying process during manufacturing and by the use of coalescing aids. The coalescing aids are additives that cause the individual emulsion droplets of the coating formulation to become coalesced into a continuous film upon drying. In embodiments, the coalescing aid is an alcohol such as propanol, glycerol, propylene glycol, or ethylene glycol. FIGS. 4A and 4B show two scanning electron micrographs (SEM) that demonstrate the effect of glycerol in causing the coalescence of the coating polymer into a continuous film. In the scanning electron micrograph image in FIG. 4A, the proppant was coated with a hydrogel formulation of anionic polyacrylamide emulsion without added glycerol and then dried at 100° C. for 1 hour. In the image of FIG. 4A, a complete coating of the proppant grain surface is seen, but the individual emulsion droplets of approximately 1 micron diameter are still visible. In the SEM image in FIG. 4B, the proppant was coated with the same anionic polyacrylamide emulsion but with 10 wt. % added glycerol as a coalescing agent; it was then dried at 100° C. for 1 hour. The effect of the coalescing agent is evident in the appearance of the dried film: the SEM image in FIG. 4B shows a substantially complete coating of the proppant grain, and in this case the emulsion droplets have coalesced into a more continuous film. FIG. 5 shows a SEM image of a dried hydrogel film made in the same way as the sample in FIG. 4B. The hydrogel film in FIG. 5 shows good coalescence of the emulsion droplets into a film, and complete coverage of the proppant grain surface.

In embodiments, polymer pairing, optionally in combination with ionic coupling, can be used to improve the hydrogel polymer retention on the surface of the proppant particles. For example, a cationic polymer can be deposited onto the proppant as a first layer to "lock in place" a second layer containing a hydrogel such as a high molecular weight anionic polymer by ionic coupling. In embodiments, the cationic polymer can be polydiallyldimethylammonium chloride (poly-(DADMAC)), linear polyethylenimine (LPEI), branched polyethylenimine (BPEI), chitosan, epichlorohydrin/dimethylamine polymer, ethylene dichloride dimethylamine polymer, or cationic polyacrylamide. The cationic polymer layer can be placed on the proppant either before or after proppant surface modification with the anionic hydrogel layer. The ionic coupling interaction can act as an anchoring mechanism to help prevent the anionic polymer from desorbing in high shear environments such as going through a pump or during pumping down the wellbore. The cationic polymer can also improve polymer retention by causing a delay in the hydration and extension of the anionic polymer chains. It is believed that less polymer chain extension during the pumping process will yield higher polymer retention on the proppant (i.e. less desorption).

In embodiments, covalent crosslinking of the hydrogel polymer layer on proppant surface can improve the swelling properties of the polymer and the shear tolerance to prevent premature release of the hydrogel from the proppant. Covalent crosslinkers can include the following functional groups: epoxides, anhydrides, aldehydes, diisocyanates, carbodiamides, divinyl, or diallyl groups. Examples of these covalent crosslinkers include: PEG diglycidyl ether, epichlorohydrin, maleic anhydride, formaldehyde, glyoxal, glutaraldehyde, toluene diisocyanate, methylene diphenyl diisocyanate, 1-ethyl-3-(3-dimethylaminopropyl) carbodiamide, methylene bis acrylamide, and the like. Covalent crosslinking of the hydrogel polymer layer on the proppant surface can effectively create a swellable "polymer cage" around the proppant. The covalent bonds prevent the polymer from completely desorbing into solution. The slightly insoluble polymer layer is able to swell and produce a hydrated polymer layer.

To further prevent the possible detachment of the hydrogel from the surface of the particle, the proppant particle can be treated to impart functionalities that will also take part in the polymerization process. For example, sand particles can be treated with silanes to yield particles with vinyl functionalities, hydroxyl, epoxy, etc.

Delayed/controlled hydration of polymer layer may be desirable to delay the hydration of the polymer surface modification during handling of the proppant and initial pump-down through the wellbore. Environmental factors such as humidity and rain could cause premature hydration of the polymeric coating, which would make it difficult to effectively meter the proppant dose into the blender during a hydraulic fracturing operation. It is also believed that a fully hydrated polymer layer can be more prone to desorption under the high shear conditions associated with pumping of a fracturing fluid down the tubular. For these reasons, it may be advantageous to engineer a surface-modified proppant having slower or delayed hydration properties. In embodiments, delayed hydration can be achieved by addition of a low hydrophilic-lipophilic balance (HLB) surfactant, exclusion of a high HLB finishing surfactant, comonomers that reduce solubility, charge shielding using a monovalent salt, or by incorporation of a hydrophobic layer such as a fatty acid, or a fatty alcohol.

In embodiments, hydrophobic groups can be incorporated into the hydrogel polymer to allow for hydrophobic interactions. This method can improve the salt tolerance of the hydrogel layer, such that the hydrogel layer remains swellable even in an aqueous fluid that contains elevated salt concentrations.

Since the goal of the hydrogel coating is to improve hydraulic transport of the proppant, it is important that the hydrated hydrogel layer remains attached or localized on the proppant surface when exposed to shear conditions during fluid transport. However, upon placement of the hydrogel coated proppant in a fractured well, the hydrogel polymer should degrade or disentangle to detach from the proppant grains and yield a proppant pack with sufficient hydraulic conductivity to enable the production of fluids. The removal of the hydrogel layer from the proppant is caused by environmental factors such as elevated temperatures, microbial action, and the presence of breakers, brine, and/or hydrocarbons. In a preferred embodiment, after the hydrogel-coated proppant is pumped into a well, the hydrogel is degraded, disentangled, dissolved, or detached with the assistance a breaker such as an oxidizer or an enzyme. The oxidizer type of breakers can be peroxides, magnesium peroxide, calcium peroxide, a persulfate salt, sodium bromate, sodium hypochlorite, ozone, sodium nitrate, and the like. A blend of a first oxidant that activates at lower temperature, such as ammonium persulfate, with a second oxidant that activates at higher temperature, such as magnesium peroxide, can improve the breaking of the hydrogel after placement of the hydrogel coated proppant. Enzyme-based breakers are known in the art and are commonly used to break down the viscosity of fluids pumped into wells. The enzymes promote reactions to degrade or cleave polymer linkages. In some cases enzyme breakers can provide a more efficient break because they target and bind the hydrogel polymer(s). Enzyme breakers are typically more effective at lower to moderate temperatures and can be combined with oxidizers that activate at higher temperatures. Selection of the appropriate enzyme breaker based on the identity of the hydrogel polymer and bottom hole conditions can improve the breaking of the hydrogel.

Also disclosed herein, is a method of fracturing a well using a hydrogel coated proppant in combination with non-hydrogel-coated proppant. For example, the hydrogel-coated proppant can serve as a suspending agent for the non-hydrogel-coated proppant.

In particular embodiments, the hydrogel polymer is selected so that its hydration is essentially complete at least by the time the modified proppant carrying this hydrogel polymer reaches its destination. In embodiments, the destination in a downhole application is the area in the well where the modified proppant enters the geological formation to be fractured, for example where the direction of travel for the hydraulic fracturing fluid changes from vertical to horizontal, or where the direction of the drill string begins to change from vertical to horizontal. The self-suspending feature of preferred modified proppants of this disclosure can be particularly exploited in hydraulic fracturing fluids that are moving in a generally horizontal direction. In embodiments, the hydrogel polymer for the modified proppant is selected so that its hydration is essentially complete within 2 hours, within 1 hour, within 40 minutes, within 30 minutes, within 20 minutes or even within 10 minutes of being contacted with an excess of tap water at 20° C.

Also disclosed herein is a method of improving well productivity by improved proppant placement using a hydrogel-coated proppant. The hydrogel-coated proppant can be more effectively transported into the far end of fractures to enable higher productivity of oil and gas from a well. Because the surface-modified proppants disclosed herein can be less inclined to settle out of the fluid and easier to resuspend and transport through the fracture, it is believed that proppant placement will be more effective. The ability to transport proppant further into fractures could significantly increase the effectiveness of a fracturing stimulation operation, resulting in a larger of volume of higher density fractures. These fracture channels can advantageously allow gas/condensate to more easily flow into the wellbore from the reservoir.

Also disclosed herein is an improved method of proppant placement using a low viscosity fluid. The surface modified proppants as disclosed herein utilize polymers more effectively to suspend/transport proppant particles. The surface modification renders the proppant self-suspending, thereby reducing or eliminating the need for highly viscous fluids/gels to transport proppant. Hence, lower viscosity fluids can be used in combination with the surface-modified proppant to transport proppant into fractures. This would advantageously simplify the formulation of fracturing gels for use with proppants.

Also disclosed herein is a more efficient method of fracturing a well using less proppant. Because highly effective proppant placement can be achieved with the easily-transportable surface-modified proppants as disclosed herein, it is anticipated that a smaller amount of these surface-modified proppants would be required for any given fracturing operation, as compared to systems using traditional proppants. With an increasing demand for fracturing grade sand/proppants, and a decreasing supply of desirably-shaped sand for proppant use, it would be advantageous to provide systems and methods such as those disclosed herein where less proppant can be used to achieve results comparable to or superior to the outcomes using current techniques.

After the hydrogel coated proppants of the invention have been pumped into a well, the hydrogel layer can be degraded by chemical, thermal, mechanical, and biological mechanisms. Specifically, the polymeric surface modification on the proppant can be broken down with the aid of chemical breakers, for example, ammonium persulfate, magnesium peroxide, or other oxidizers. The polymeric surface modification on the proppant can also be broken down with the aid of ambient reservoir conditions, such as elevated brine content, elevated temperature, and contact with hydrocarbons. Controlled breaking of the hydrogel layer upon reaching a target temperature or amount of time in the fluid can be used as a means to direct the placement of the proppant in the desired location in fractures. The degradation of the hydrogel layer is also beneficial to ensuring the adequate conductivity of the propped fracture after completing the hydraulic fracturing operations. In embodiments, the hydrogel layer can demonstrate stimuli-responsive properties, so that it swells with water when exposed to a first set of conditions, such as a certain first temperature or pH, and it loses water, loses volume, loses thickness, or even collapses, when subjected to a certain set of conditions, such as a second temperature or pH.

For example, in an embodiment, temperature-responsive hydrogels can be coated onto proppant materials. The temperature responsive hydrogel layer can swell when exposed to water at a first set of conditions, such as a water temperature of 50-100 degrees F., and then it can collapse when exposed to a second set of conditions, such as a water temperature of 110-450 degrees F. Using this stimuli-responsive mechanism, the temperature responsive hydrogel coated proppant can have self-suspending properties as the fracturing fluid carries it underground to the location of the fractures at an initial water temperature, for example 50-100 degrees F. As the coated proppant encounters the higher temperature region of the underground formation, such as 110-450 degrees F., the hydrogel layer can collapse, allowing deposition and consolidation of the proppant in the fissures. The temperature responsive hydrogel can be a water soluble polymer or copolymer composition comprising hydrophobic monomers selected from the group consisting of alkyl acrylate esters, N-alkyl acrylamides, propylene oxide, styrene, and vinylcaprolactam. The N-alkyl substituted acrylamides can be N-isopropylacrylamide, N-butylacrylamide, N-octylacrylamide, and the like. The alkyl acrylate esters can be substituted by alkyl chains having from 1 to about 30 carbons. In a preferred embodiment, the temperature responsive hydrogel polymer comprises N-isopropylacrylamide and contains up to about 90 percent of hydrophilic comonomer units. The type and amount of the hydrophobic monomer substituent in the hydrogel polymer can be selected by experimental optimization techniques to adjust the water solubility and the temperature responsive properties of the hydrogel polymer.

Also disclosed herein is a method of delivery of additives, for example, chemical additives, into the proppant pack, by incorporating the additives into the hydrogel layer of the modified proppant. The additives can include chemical additives that can be advantageously delivered in the hydrogel layer, for example scale inhibitor, biocide, breaker, wax control, asphaltene control, and tracers. The chemical additives can be in the form of water soluble materials, water insoluble particles, fibers, metallic powders or flakes, and the like. The chemical additives can be selected such that they slowly dissolve or decompose to release their chemical activity.

In embodiments, chemical additives can be chemically bound to the polymer in the hydrogel layer, for example, by covalent bonding, ionic bonding, hydrophobic association, hydrogen bonding, or encapsulation. The chemical additives can be added to the proppant separately from the hydrogel, or they can be combined with the hydrogel coating formulation at the time of manufacture of the coated proppant. Breaker chemicals such as persulfates, peroxides, permanganates, perchlorates, periodates or percarbonates can be added in this method of delivery. The transport and delivery of these chemicals with the hydrogel coated proppant has the advantage of a targeted delivery of the chemicals to a fracture or to a proppant pack. This method offers the advantage of concentrating the chemical additives in the location where their function is needed, thereby delivering the chemical additive more efficiently, more effectively, and at lower concentration. In embodiments, the desorption, oxidation, or degradation of the hydrogel polymer can result in the controlled release of the chemical additives from the self-suspending proppant.

In embodiments, a hydraulic fracturing operation can have multiple stages of fracturing; the proppants injected in each stage can contain unique chemical additives acting as tracers. Tracers are commonly used in hydraulic fracturing, including tracers that can be detected by high performance liquid chromatography (HPLC), gas chromatography (GC), ultraviolet or visible absorbance, and radioactive signal measurement. Analysis of the fluids produced from the fractured well can provide information about the relative productivity of each fracturing stage by the presence and concentration of the unique tracers corresponding to the stages. In other embodiments, additives acting as breakers can be carried in the hydrogel layer, e.g., by physical binding or entanglement in the polymer layer. In embodiments, the breakers can be modified with a cationic surface coating to provide an anchoring mechanism to attach the breakers to the anionic hydrogel of the self-suspending proppant. For example, magnesium peroxide powder can be coated with a cationic polymer such as poly-DADMAC, and this cationically modified magnesium peroxide can be blended with the hydrogel coated proppant either before or after the proppant is introduced into the hydraulic fracturing water stream. Using this approach, the breakers are transported to the same location as the hydrogel proppants, so the breaker can be efficiently targeted at the hydrogel layer. The oxidative breakers can have an accelerated activity at higher temperatures. Using this method, the breaker chemicals incorporated in the hydrogel layer can become activated upon placement in the fractures, for example, by the elevated temperatures of the petroleum bearing reservoir.

In other embodiments, breakers can be pumped into a subterranean formation before and/or after the introduction of the hydrogel-coated proppants. In the case that the breaker is pumped before the proppant, the fluid containing the excess breaker will flow back through the proppant pack and have the ability to assist degradation of the hydrogel layer after the proppant has reached its destination. In the event that breaker is pumped into the propped formation after the proppant, the breaker can infiltrate the proppant pack and have its effect on the breakdown of the hydrogel layer. In embodiments, the breaker can be added at multiple times to assist breaking the hydrogel layer. In embodiments, the breakers can be used in a combination of types, for example, a lower temperature activated breaker such as ammonium persulfate can be used for a quick effect, in combination with an encapsulated, longer acting, or higher temperature activated breaker such as magnesium peroxide, to give a sustained effect of breaking the hydrogel layer over the course of time before the fluids are flowed back and the well is put into production.

In embodiments, the surface of a proppant particulate substrate can be coated with a selected polymer, either as a single layer or as a series of multiple coating layers. The coating (either single layer or multilayer) can show switchable behavior under certain circumstances. As used herein, the term "switchable behavior" or "switching behavior" refers to a change in properties with a change in circumstances, for example, a change from one set of properties during the transport phase and another set of properties inside the fracture. Switching behavior can be seen, for example, when a particle demonstrates hydrophilic properties in the fracturing fluid and adhesive properties when in place within the fractures. Such behavior can triggered by circumstances like the high closing pressures inside the fracture site so that the outer layer of the coating rearranges itself to exhibit more advantageous properties.

In an embodiment, the coated particle can switch from hydrophilic to hydrophobic when subjected to the high pressures inside the fractures. In an exemplary embodiment, during the transport phase, when the hydrophilic covering of the particle is exposed to the water-based fracturing fluid, it will tend to be fully distended. As a result, the coating can provide the particle with lubrication in this state, facilitating its movement through the proppant slurry. When the particle has been conveyed to its destination within the fractures in the formation though, the high pressures there will overcome the steric repulsions of the external hydrophilic polymer chains, forcing the outer layer to rearrange itself so that the inner layer is exposed. In embodiments, the switchable inner layer can be hydrophobic or adhesive, or both. As the inner layer becomes exposed, its properties can manifest themselves. If the inner layer has adhesive properties, for example, it can fix the particles to each other to prevent their flowback. This inner layer can also be configured to capture fines in case the proppant particle fails. Moreover, the residual intact hydrophilic groups present in the outer coating can allow easy flow of oil through the proppant pack.

In embodiments, a coated proppant particle can be produced that bears the following layers of coating. First, a pressure-activated fixative polymer can be used to coat the proppant substrate. This coating layer can be elastomeric, thereby providing strength to the proppant pack by helping to agglomerate the proppant particles and distribute stress. In addition, this coating layer can encapsulate the substrate particles and retain any fines produced in the event of substrate failure. Second, a block copolymer can be adsorbed or otherwise disposed upon the first layer of coating. The copolymer can have a section with high affinity for the first polymeric layer, allowing strong interaction (hydrophobic interaction), and can have another section that is hydrophilic, allowing for easy transport of the proppant in the transport fluid.

In certain embodiments, a stronger interaction between the first and second coating layers may be useful. To accomplish this, a swelling-deswelling technique can be implemented. For example, the block copolymer can be adsorbed onto the surface of the elastomeric-coated particle. Then, the first coating layer can be swelled with small amounts of an organic solvent that allow the hydrophobic block of the copolymer to penetrate deeper into the first coating layer and to become entangled in the elastomeric coating. By removing the organic solvent, the layered polymeric composite will deswell, resulting in a stronger interaction of copolymer with the elastomeric particle. A method for swelling-deswelling technique that can be useful is set forth in "Swelling-Based Method for Preparing Stable, Functionalized Polymer Colloids," A. Kim et al., J. Am. Chem. Soc. (2005) 127: 1592-1593, the contents of which are incorporated by reference herein.

In embodiments, proppant systems using coatings as disclosed herein can decrease the amount of airborne particles associated with proppant manufacture. For example, respirable dust including fine crystalline silica dust associated with handling and processing proppant sand can be captured and held by the proppant coatings during their processing. In embodiments, coating agents can be added that have a particular affinity for particulates in the environment that could adversely affect worker safety or create nuisance dust problems. In embodiments, a hydrogel coating on proppant particles can serve as a binder or capturing agent by mechanically entrapping or adhering to the dust particulates.

While the systems described herein refer to a two-layer coating system, it is understood that there can be multiple (i.e., more than two) coating layers forming the composite proppant particles disclosed herein, with the each of the multiple coating layers possessing some or all of the attributes of the two coating layers described above, or with one or more of the multiple coating layers providing additional properties or features.

The addition of a species capable of crosslinking the swellable polymer on the proppant surface can effectively reduce the ability of the polymer layer to swell prematurely. Decreased swelling of the polymer can reduce the tendency of the polymer-coated proppant to undergo caking during storage in humid conditions. In some embodiments, the crosslinker will not impede hydration/swelling of the polymer coating once the polymer-coated proppant is dispersed in an aqueous fluid, such as a hydraulic fracturing fluid. In embodiments, the crosslinking species has the capability of forming a bond with a carboxyl functional group, an amide functional group, or both. In certain aspects, the crosslinking species forms a bond that can be broken or removed under mechanical shear or by the action of a chemical breaker. The crosslinking species can be added directly into the polymer used to coat the proppant, simultaneously added to the proppant with the polymer while mixing, or added some time after addition of the polymer to the proppant but before drying.

The crosslinking species can be chosen from organic compounds containing aldehyde, amine, anhydride, or epoxy functional groups. The crosslinking species can also be an organometallic compound. Organometallic compounds able to associate and/or bond with the carboxyl functional group are an example of a crosslinking species that form shear sensitive bonds. In such embodiments, the organometallic compound is able to reduce the swelling tendency of the polymer-coated proppant via crosslinking the carboxyl groups prior to the introduction of the proppant into a hydraulic fracturing fluid. Then, when the crosslinked polymer coating encounters the high shear forces of pumping associated with hydraulic fracturing, the crosslink on the polymer can be degraded, allowing the polymer to swell unhindered when the proppant is introduced into the hydraulic fracturing fluid.

In certain embodiments, a thin, non-hygroscopic coating layer can be applied to the surface of a hydrogel-coated proppant to create a barrier preventing the swellable polymer layer on adjacent proppant particles from adhering during storage. The outer layer utilized can be comprised of compounds that are water-soluble, water insoluble or both. In embodiments, the outer layer can be formulated such that it remains in the solid phase at temperatures below 40° C. and has a melting point in the range of 40° C. to 120° C. Preferably, the outer layer is formulated such that the melting point is low enough that the outer layer will be in the liquid phase during the drying process in the manufacturing of the polymer coated proppant, yet is high enough that the outer layer will exist in the solid phase during storage and transport of the polymer coated proppant.

In these embodiments, the outer layer acts as a barrier to reduce caking of the coated proppant in humid environments. As used herein, the term "caking" refers to the formation of clumps or solid masses by adhesion of the loose granular material. Caking of proppants during storage is undesirable for material handling purposes. The hydrophobic outer layer can be added to the polymer-coated proppant as a finely divided powder or as a liquid. In embodiments, the outer layer material can be melted prior to addition to the coated proppant; in other embodiments the outer layer material can be added as a solid or waxy material, which can melt during the drying process. The solid outer layer can be added to the proppant simultaneously with the polymer or can be added at some time after addition of polymer but before the drying process. The outer layer can be comprised of fatty acids, hydrogenated oils, vegetable oils, castor oil, waxes, polyethylene oxides, polypropylene oxides, and the like.

2. Particulate Substrate Materials

Composite proppant particles in accordance with these systems and methods can be formed using a wide variety of proppant substrate particles. Proppant particulate substrates can include for use in the present invention include graded sand, resin coated sand, bauxite, ceramic materials, glass materials, walnut hulls, polymeric materials, resinous materials, rubber materials, and the like, and combinations thereof. The self-suspending proppant ("SSP") as disclosed herein can also be made using specialty proppants, such as ceramics, bauxite, and resin coated sand. By combining sand SSP with specialty SSP, a proppant injection can have favorable strength, permeability, suspension, and transport properties. In embodiments, the substrates can include naturally occurring materials, for example nutshells that have been chipped, ground, pulverized or crushed to a suitable size (e.g., walnut, pecan, coconut, almond, ivory nut, brazil nut, and the like), or for example seed shells or fruit pits that have been chipped, ground, pulverized or crushed to a suitable size (e.g., plum, olive, peach, cherry, apricot, etc.), or for example chipped, ground, pulverized or crushed materials from other plants such as corn cobs. In embodiments, the substrates can be derived from wood or processed wood, including but not limited to woods such as oak, hickory, walnut, mahogany, poplar, and the like. In embodiments, aggregates can be formed, using an inorganic material joined or bonded to an organic material. Desirably, the proppant particulate substrates will be comprised of particles (whether individual substances or aggregates of two or more substances) having a size in the order of mesh size 4 to 100 (US Standard Sieve numbers). As used herein, the term "particulate" includes all known shapes of materials without limitation, such as spherical materials, elongate materials, polygonal materials, fibrous materials, irregular materials, and any mixture thereof.

In embodiments, the particulate substrate can be formed as a composite from a binder and a filler material. Suitable filler materials can include inorganic materials such as solid glass, glass microspheres, fly ash, silica, alumina, fumed carbon, carbon black, graphite, mica, boron, zirconia, talc, kaolin, titanium dioxide, calcium silicate, and the like. In certain embodiments, the proppant particulate substrate can be reinforced to increase their resistance to the high pressure of the formation which could otherwise crush or deform them. Reinforcing materials can be selected from those materials that are able to add structural strength to the proppant particulate substrate, for example, high strength particles such as ceramic, metal, glass, sand, and the like, or any other materials capable of being combined with a particulate substrate to provide it with additional strength.

In addition to bare or uncoated substrates, composite hydrogel-coated proppants can be formed from substrates that have undergone previous treatments or coatings. For example, a variety of resin-coated proppant particles are familiar to skilled artisans. The formulations and methods described above for coating are suitable for use with coated or treated proppant particles, including curable and precured resin coated proppants.

In one embodiment for treating resin-coated sand, a swellable hydrogel layer, as described above, can be applied to the resin-coated sand to improve its suspension characteristics. In embodiments, one can include the addition of the species that acts as an adhesion promoter to attach the hydrogel to the resin layer. The adhesion promoters can be, for example, block co-polymers composed of both hydrophilic and hydrophobic monomers. The block co-polymer can be added after the substrate sand is resin-coated or at the same time as the resin coating. In addition to block co-polymers, cationic species can be used such as fatty amines, polyquaternary amines, and cationic surfactants.

In certain embodiments, the proppant particulate substrate can be fabricated as an aggregate of two or more different materials providing different properties. For example, a core particulate substrate having high compression strength can be combined with a buoyant material having a lower density than the high-compression-strength material. The combination of these two materials as an aggregate can provide a core particle having an appropriate amount of strength, while having a relatively lower density. As a lower density particle, it can be suspended adequately in a less viscous fracturing fluid, allowing the fracturing fluid to be pumped more easily, and allowing more dispersion of the proppants within the formation as they are propelled by the less viscous fluid into more distal regions. High density materials used as proppant particulate substrates, such as sand, ceramics, bauxite, and the like, can be combined with lower density materials such as hollow glass particles, other hollow core particles, certain polymeric materials, and naturally-occurring materials (nut shells, seed shells, fruit pits, woods, or other naturally occurring materials that have been chipped, ground, pulverized or crushed), yielding a less dense aggregate that still possesses adequate compression strength.

Aggregates suitable for use as proppant particulate substrates can be formed using techniques to attach the two components to each other. As one preparation method, a proppant particulate substrate can be mixed with the buoyant material having a particle size similar to the size of the proppant particulate substrates. The two types of particles can then be mixed together and bound by an adhesive, such as a wax, a phenol-formaldehyde novolac resin, etc., so that a population of doublet aggregate particles are formed, one subpopulation having a proppant particulate substrate attached to another similar particle, one subpopulation having a proppant particulate substrate attached to a buoyant particle, and one subpopulation having a buoyant particle attached to another buoyant particle. The three subpopulations could be separated by their difference in density: the first subpopulation would sink in water, the second subpopulation would remain suspended in the liquid, and the third subpopulation would float.

In other embodiments, a proppant particulate substrate can be engineered so that it is less dense by covering the surface of the particulate substrate with a foamy material. The thickness of the foamy material can be designed to yield a composite that is effectively neutrally buoyant. To produce such a coated proppant particulate, a particle having a desirable compression strength can be coated with one reactant for a foaming reaction, followed by exposure to the other reactant. With the triggering of foam formation, a foam-coated proppant particulate will be produced.

As an example, a water-blown polyurethane foam can be used to provide a coating around the particles that would lower the overall particle density. To make such a coated particle, the particle can be initially coated with Reactant A, for example, a mixture of one or more polyols with a suitable catalyst (e.g., an amine). This particle can then be exposed to Reactant B containing a diisocyanate. The final foam will form on the particle, for example when it is treated with steam while being shaken; the agitation will prevent the particles from agglomerating as the foam forms on their surfaces.

In embodiments, fibers, including biodegradable fibers can be added to the fracture fluid along with SSP. Fibers, including biodegradable fibers, can form a fiber network that help carry the proppant with the fluid. A number of fiber types are familiar to skilled artisans for adding to fracture fluid. As would be understood by skilled artisans, fibers added to the fracture fluid can degrade under downhole conditions, and channels are formed in the proppant pack. The channels then have higher permeability and are therefore the flow channels through which hydrocarbons travel from the formation to the wellbore.

The term "fiber" can refer to a synthetic fiber or a natural fiber. As used herein, the term "synthetic fibers" include fibers or microfibers that are manufactured in whole or in part. Synthetic fibers include artificial fibers, where a natural precursor material is modified to form a fiber. For example, cellulose (derived from natural materials) can be formed into an artificial fiber such as Rayon or Lyocell. Cellulose can also be modified to produce cellulose acetate fibers. These artificial fibers are examples of synthetic fibers. Synthetic fibers can be formed from synthetic materials that are inorganic or organic. Exemplary synthetic fibers can be formed from materials such as substituted or unsubstituted lactides, glycolides, polylactic acid, polyglycolic acid, or copolymers thereof. Other materials to form fibers include polymers of glycolic acid or copolymers formed therewith, as are familiar to skilled artisans.

As used herein, the term "natural fiber" refers to a fiber or a microfiber derived from a natural source without artificial modification. Natural fibers include vegetable-derived fibers, animal-derived fibers and mineral-derived fibers. Vegetable-derived fibers can be predominately cellulosic, e.g., cotton, jute, flax, hemp, sisal, ramie, and the like. Vegetable-derived fibers can include fibers derived from seeds or seed cases, such as cotton or kapok. Vegetable-derived fibers can include fibers derived from leaves, such as sisal and agave. Vegetable-derived fibers can include fibers derived from the skin or bast surrounding the stem of a plant, such as flax, jute, kenaf, hemp, ramie, rattan, soybean fibers, vine fibers, jute, kenaf, industrial hemp, ramie, rattan, soybean fiber, and banana fibers. Vegetable-derived fibers can include fibers derived from the fruit of a plant, such as coconut fibers. Vegetable-derived fibers can include fibers derived from the stalk of a plant, such as wheat, rice, barley, bamboo, and grass. Vegetable-derived fibers can include wood fibers. Animal-derived fibers typically comprise proteins, e.g., wool, silk, mohair, and the like. Animal-derived fibers can be derived from animal hair, e.g., sheep's wool, goat hair, alpaca hair, horse hair, etc. Animal-derived fibers can be derived from animal body parts, e.g., catgut, sinew, etc. Animal-derived fibers can be collected from the dried saliva or other excretions of insects or their cocoons, e.g., silk obtained from silk worm cocoons. Animal-derived fibers can be derived from feathers of birds. Mineral-derived natural fibers are obtained from minerals. Mineral-derived fibers can be derived from asbestos. Mineral-derived fibers can be a glass or ceramic fiber, e.g., glass wool fibers, quartz fibers, aluminum oxide, silicon carbide, boron carbide, and the like.

Fibers may advantageously be selected or formed so that they degrade at specified pH or temperatures, or to degrade over time, and/or to have chemical compatibilities with specified carrier fluids used in proppant transport. Useful synthetic fibers can be made, for example, from solid cyclic dimers or solid polymers of organic acids known to hydrolyze under specific or tunable conditions of pH, temperature, time, and the like. Advantageously, fibers can decompose in the locations to which they have been transported under predetermined conditioned. Advantageously, the decomposition of the fibers can yield decomposition products that are environmentally benign.

EXAMPLES

Materials
  30/70 mesh frac sand
  30/50 mesh frac sand
  40/70 mesh frac sand
  Polydiallyldimethylammonium chloride (Aldrich, St. Louis, Mo.)
  LPEI 500 (Polymer Chemistry Innovations, Tucson, Ariz.)
  Ethyl Alcohol, 200 Proof (Aldrich, St. Louis, Mo.)
  Hexane (VWR, Radnor, Pa.)
  FLOPAM EM533 (SNF)
  Polyethyleneglycol diglycidyl ether (Aldrich, St. Louis, Mo.)
  Glyoxal, 40 wt % solution (Aldrich, St. Louis, Mo.)
  HFC-44 (Polymer Ventures, Charleston, S.C.)
  Carboxymethyl Cellulose, sodium salt (Sigma-Aldrich, St. Louis, Mo.)
  Ammonium Persulfate (Sigma-Aldrich, St. Louis, Mo.)
  Ethoxylated lauryl alcohol surfactant (Ethal LA-12/80%)) (Ethox Chemical Co, SC)

Glycerol (US Glycerin, Kalamazoo, Mich.)
Potassium Chloride (Morton Salt, Chicago, Ill.)
Fumed Silica (Cabot, Boston, Mass.)

Example 1: Preparation of Inner Polymer Layer

An inner polymer layer of 100 ppm concentration was prepared on a sand sample by adding 200 g 30/70 mesh frac sand to a FlackTek Max 100 long jar. To the sand was added 85 g tap water and 2 g of a 1% polydiallyldimethylammonium chloride (PDAC) solution. The sample was then shaken by hand for approximately 5 minutes, vacuum filtered and dried in an oven at 80° C. The sand sample was then removed from the oven and used in subsequent testing.

An identical method was used as described above to formulate a 10 ppm inner polymer layer coating with the exception being that only 0.2 g of a 1% PDAC solution were used.

An identical method was used as described above to formulate an inner polymer layer at a maximum polymer loading ("Max PDAC") with the exception that 1 g of a 20 wt % PDAC solution was used. Following treatment the sand was washed with excess tap water, vacuum filtered and dried in an oven at 80° C. The sand sample was then removed from the oven and used in subsequent testing.

Example 2: Preparation of Inner Polymer Layer

An inner polymer layer of 100 ppm concentration was prepared on a sand sample by dissolving 0.2 g LPEI 500 in 10 g ethanol to form a 2% LPEI 500 solution in ethanol. To 70 g ethanol in a 250 mL round bottom flask was added 0.75 g of the 2% LPEI 500 solution. Then 150 g of 30/70 mesh frac sand was added to the round bottom flask. The solvent was removed using a rotary evaporator with a 65° C. water bath. The sample was then removed from the flask and used in subsequent testing.

Example 3: Preparation of Outer Polymer Layer

Outer polymer layers were applied to sand samples by mixing sand with liquid Flopam EM533 polymer under different conditions. In one coating method, polymer product was added neat. In another coating method the polymer product was extended by diluting with hexane. For hexane dilution 10 g polymer was added to 10 g hexane in a 40 mL glass vial and vortex mixed until homogenous. Polymer was then added to 30/70 mesh frac sand samples of 30 g in FlackTek Max 100 jars. Samples were placed in a FlackTek DAC150 SpeedMixer at 2600 rpm for about 25 seconds. Samples were removed from SpeedMixer and allowed to dry in an oven at 80° C. overnight.

Example 4: Performance of Outer Polymer Layer, Settling Times

Sand samples prepared in previous example were assessed for performance in a settling test. Prior to testing, all sand samples were sieved through a 25 mesh screen. Settling times were obtained by adding 1 g of sand sample to 100 mL of tap water in a 100 mL graduated cylinder. The graduated cylinder was then inverted about 8 times and then the time required for all of the sand to settle at the bottom of the graduated cylinder was recorded. Three times were recorded for each sample. Settling times are reported in Table 1.

TABLE 1

Settling Times

| Sample | Inner Layer | Outer Layer Treatment | Treatment Added (g) | Settling Time1 (sec) | Settling Time2 (sec) | Settling Time3 (sec) |
|---|---|---|---|---|---|---|
| 1 | 100 ppm PDAC | Flopam EM533 | 1 | 34 | 35 | 32 |
| 2 | 100 ppm PDAC | 50:50 Flopam EM533/hexane | 2 | 25 | 25 | 26 |
| 3 | 100 ppm PDAC | Flopam EM533 | 3 | 35 | 71 | 60 |
| 4 | 100 ppm PDAC | 50:50 Flopam EM533/hexane | 6 | 24 | 33 | 32 |
| 5 | Max PDAC | Flopam EM533 | 1 | 19 | 21 | 27 |
| 6 | Max PDAC | 50:50 Flopam EM533/hexane | 2 | 17 | 23 | 21 |
| 7 | Max PDAC | Flopam EM533 | 3 | 29 | 31 | 35 |
| 8 | Max PDAC | 50:50 Flopam EM533/hexane | 6 | 23 | 24 | 25 |
| 9 | None | Flopam EM533 | 1 | 22 | 22 | 22 |
| 10 | None | Flopam EM533 | 3 | 25 | 54 | 64 |
| 11 | None | None | 0 | 10 | 10 | 10 |

Example 5: Performance of Outer Polymer Layer, Settled Bed Height

Sand samples prepared in Example 3 with outer polymer layer were also assessed by observing the settled bed height in water. In a 20 mL glass vial, 1 g of a sand sample was added to 10 g tap water. The vials were inverted about 10 times to adequately wet the sand treatments. The vials were then allowed to sit undisturbed for about 30 minutes. A digital caliper was then used to record the height of the sand bed in the vial. Results are reported in Table 2.

TABLE 2

Settled Bed Heights

| Sample | 1 | 2 | 3 | 4 | 5 | 6 | 7 | 8 | 9 | 10 | 11 |
|---|---|---|---|---|---|---|---|---|---|---|---|
| Bed Height (mm) | 13.5 | 6.9 | 22.6 | 8.9 | 8.9 | 5.8 | 11.9 | n/a | 11.9 | 22.9 | 0.8 |

Example 6: Ionic Crosslink of Outer Polymer Layer

A 40 g 30/70 mesh frac sand sample was treated with an outer polymer layer by adding 1.3 g Flopam EM533 polymer to the 40 g of sand in a FlackTek Max 100 jar and shaking the jar by hand for 2 minutes. The sand was then sieved through a 25 mesh screen. To assess polymer retention on sand under shear, tests were conducted by adding 10 g of treated sand to 200 g tap water with different levels of PDAC in a 300 mL glass beaker. It is believed that the PDAC will interact ionically to stabilize the polymer layer on the sand. The slurries were then stirred at 900 rpm with an overhead mixer using a flat propeller style mixing blade for 5 minutes. Mixing was then stopped and samples were allowed to settle for 10 minutes. Viscosity of the supernatant was then measured using a Brookfield DV-III+ rheometer with an LV-II spindle at 60 rpm. Bed height of the settled sand in the beaker was also recorded using a digital caliper. Results are reported in Table 3.

TABLE 3

Polymer Retention

| Sample | PDAC Conc. (ppm) | Visc. (cP) | Bed Height (mm) |
|---|---|---|---|
| 12 | 0 | 25 | 4.5 |
| 13 | 60 | 10 | 8.6 |
| 14 | 200 | 2.5 | 6.3 |

Example 7: Covalent Crosslink of Outer Polymer Layer—PEGDGE

Four samples of 30/70 mesh frac sand were treated with Flopam EM533 by adding 0.66 g polymer to 20 g sand in a FlackTek Max 100 jar and shaking by hand for 2 minutes. Then various amounts of a fresh 1% polyethyleneglycol diglycidyl ether solution in deionized water were added to the treated sand samples. The samples were again shaken by hand for 2 minutes and then placed in an oven at 100° C. for 1 hour. Samples were then removed from the oven and sieved through a 25 mesh screen. Bed heights were measured for the four samples by adding 1 g of the sand sample to 10 g of tap water in a 20 mL glass vial, inverting the vials approximately 10 times to adequately wet the sand and allowing the vials to sit undisturbed for about 10 minutes. Bed heights were then measured with a digital caliper. Results are listed in Table 4.

TABLE 4

PEGDGE Treated Outer Polymer Layer

| Sample | 1% PEGDGE (g) | Bed Height (mm) |
|---|---|---|
| 15 | 0.1 | 9.3 |
| 16 | 0.2 | 8.8 |
| 17 | 1.0 | 6.2 |
| 18 | 0 | 12.7 |

Example 8: Covalent Crosslink of Outer Polymer Layer—Glyoxal

Four samples of 30/70 mesh frac sand were treated with Flopam EM533 by adding 0.66 g polymer to 20 g sand in a FlackTek Max 100 jar and shaking by hand for 2 minutes. A 1% glyoxal solution in ethanol was formulated by adding 0.25 g 40 wt % glyoxal to a 20 mL glass vial and diluting to 10 g with ethanol. Then varying amounts of the 1% glyoxal solution were added to the treated sand samples, and the samples were shaken by hand for 2 minutes and placed in the oven at 100° C. for 30 minutes. The sand samples were removed from the oven and sieved through a 25 mesh screen. For settled bed height measurements 1 g of sand was added to 10 g of tap water in 20 mL vials, inverted about 10 times and given about 10 minutes to settle. Bed height was measured with a digital caliper. Results are listed in Table 5.

TABLE 5

Glyoxal Treated Outer Polymer Layer

| Sample | 1% glyoxal (g) | Bed Height (mm) |
|---|---|---|
| 19 | 0.2 | 3.8 |
| 20 | 0.5 | 3.5 |
| 21 | 1.0 | 2.7 |
| 22 | 2.0 | 2.7 |

Example 9: Cationic/Anionic Polymer Treatments

Three samples of 30 g of 30/70 mesh frac sand were treated with Polymer Ventures HCF-44 in a FlackTek Max 100 jar. The jar was shaken by hand for 2 minutes. Flopam EM533 was then added to each of the samples. The jars were again shaken by hand for 2 minutes. The samples were then dried at 80° C. overnight. The sand samples were removed from the oven and sieved through a 25 mesh screen. For settled bed height measurements 1 g of sand was added to 10 g tap water in 20 mL vials, inverted about 10 times and given about 10 minutes to settle. Bed height was measured with a digital caliper. Results are given in Table 6.

TABLE 6

Cationic/Anionic polymer treatment

| Sample | HCF-44 (g) | Flopam EM533 (g) | Bed Height (mm) |
|---|---|---|---|
| 23 | 0 | 0.45 | 10.26 |
| 24 | 0.07 | 0.38 | 8.08 |
| 25 | 1.0 | 0.35 | 5.08 |
| 26 | 1.5 | 0.30 | 3.94 |

Example 10: Sand Coated with Macromolecular Particles

A 30 g sample of 30/70 mesh frac sand was added to a FlackTek Max 100 jar. To the sand, 0.3 g of paraffin wax was added. The sample was placed in a FlackTek DAC 150 SpeedMixer and mixed at 2500 rpm for 2 minutes. After mixing, 1 g of carboxymethyl cellulose was added to the sample. The sample was again placed in the FlackTek DAC 150 SpeedMixer and mixed at 2500 rpm for 1 minute. The sand sample was sieved through a 25 mesh screen. For settled bed height measurements 1 g of sand was added to 10 g tap water in a 20 mL vial, inverted about 10 times and given about 10 minutes to settle. The sand in this sample clumped together immediately and did not disperse in the water, and an accurate measurement of bed height could not be obtained.

Example 11: Modified Sand Beaker Testing

A 30 g sample of 30/70 mesh frac sand was added to a FlackTek Max 100 jar. The sand was treated with Flopam EM533 by adding 0.45 g of the polymer to the jar and shaking by hand for 2 minutes. The sample was then dried at 80° C. overnight. After drying, the sample was removed from the oven and sieved over a 25 mesh screen. After sieving, four samples were prepared by adding 1 g of the treated sand to 10 g of tap water in a 20 mL vial. The vials were inverted about 10 times and left to settle for 10 minutes. A 10% ammonium persulfate solution was made by adding 2 g of ammonium persulfate to 18 g of tap water. Varying amounts of the 10% ammonium persulfate solution were then added to the sample vials. The samples were inverted several times to mix, and then placed in an oven at 80° C. for 1 hr. After 1 hour the samples were removed and the settled bed heights were observed. Table 7 shows the results.

TABLE 7

Breaker testing

| Sample | 10% APS (μL) | Sand Suspension |
|---|---|---|
| 27 | 0 | Suspended |
| 28 | 180 | Settled |
| 29 | 90 | Settled |
| 30 | 18 | Settled |

Example 12: Emulsion Additives

To determine the effect of emulsion additives on self-suspending proppant ("SSP") performance, we added glycerol and Ethal LA-12/80% to the emulsion polymer EM533 before coating the proppant sand. Three different polymer samples were made as follows:
SSP Polymer: 10 g of EM533, no additive
SSP+glycerol: 9 g EM533 and 1 g of glycerol
SSP+glycerol+Ethal: 9 g EM533+0.9 g glycerol+0.1 g Ethal LA-12/80%.

Figure 6:
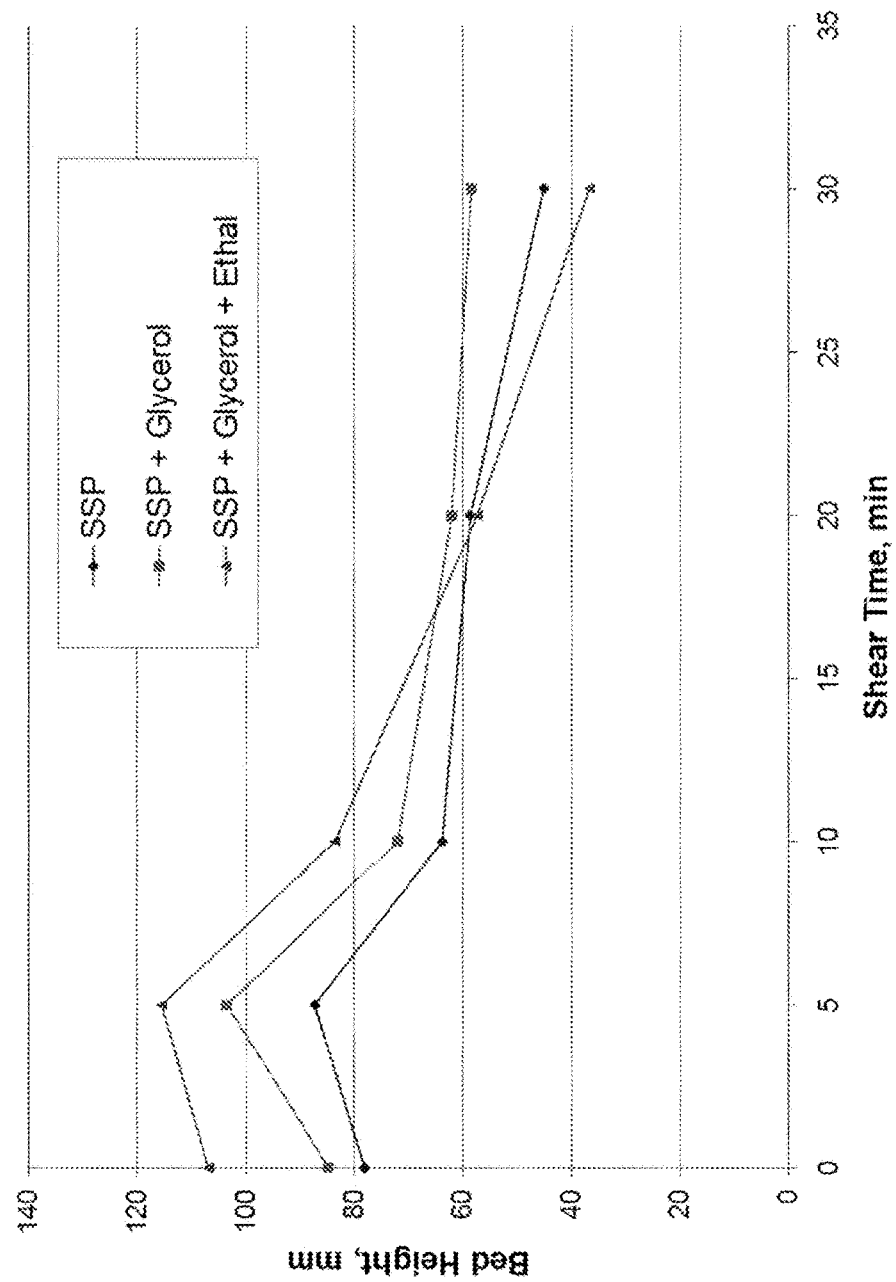
FIG. 6 is a graph of bed height vs. shear time for three sets of self-suspending proppant samples.

Each of the above samples was vortex mixed for 30 seconds to ensure homogeneity. To make the modified proppant, 50 g of 40/70 sand was combined with 1.5 g of one of the polymer samples above and then mixed for 30 s. The modified proppant samples were evaluated for shear stability in the 1 liter shear test. This test involves addition of 50 grams of modified proppant to 1 liter of water in a square plastic beaker, followed by mixing on a paddle/jar mixer (EC Engineering model CLM-4) at 200 rpm (corresponding to a shear rate of about 550 s$^{-1}$) for different amounts of time. The sheared samples are then poured into a 1000 mL graduated cylinder and allowed to settle by gravity for 10 minutes, then the bed height of the settled proppant sand is recorded. For comparison, an unmodified proppant sand will produce a bed height of 10 mm after any amount of mixing. The self-suspending proppant samples will produce a higher bed level vs. unmodified proppant due to the hydrogel layer encapsulating the sand grains. Generally, increasing the shear rate or time can cause the bed height of self-suspending proppant to decrease as a result of desorption of the hydrogel layer from the surface of the modified proppant. For this reason, it is desirable for the bed height to be as high as possible in this test, especially after shear. The results below show that the addition of glycerol improves the bed height and the shear stability of the product. The addition of glycerol and Ethal, while it improves the initial bed height, the long term shear stability is slightly decreased. These results are illustrated in the graph in FIG. 6.

Example 13: Glycerol and Processability

Figure 7:
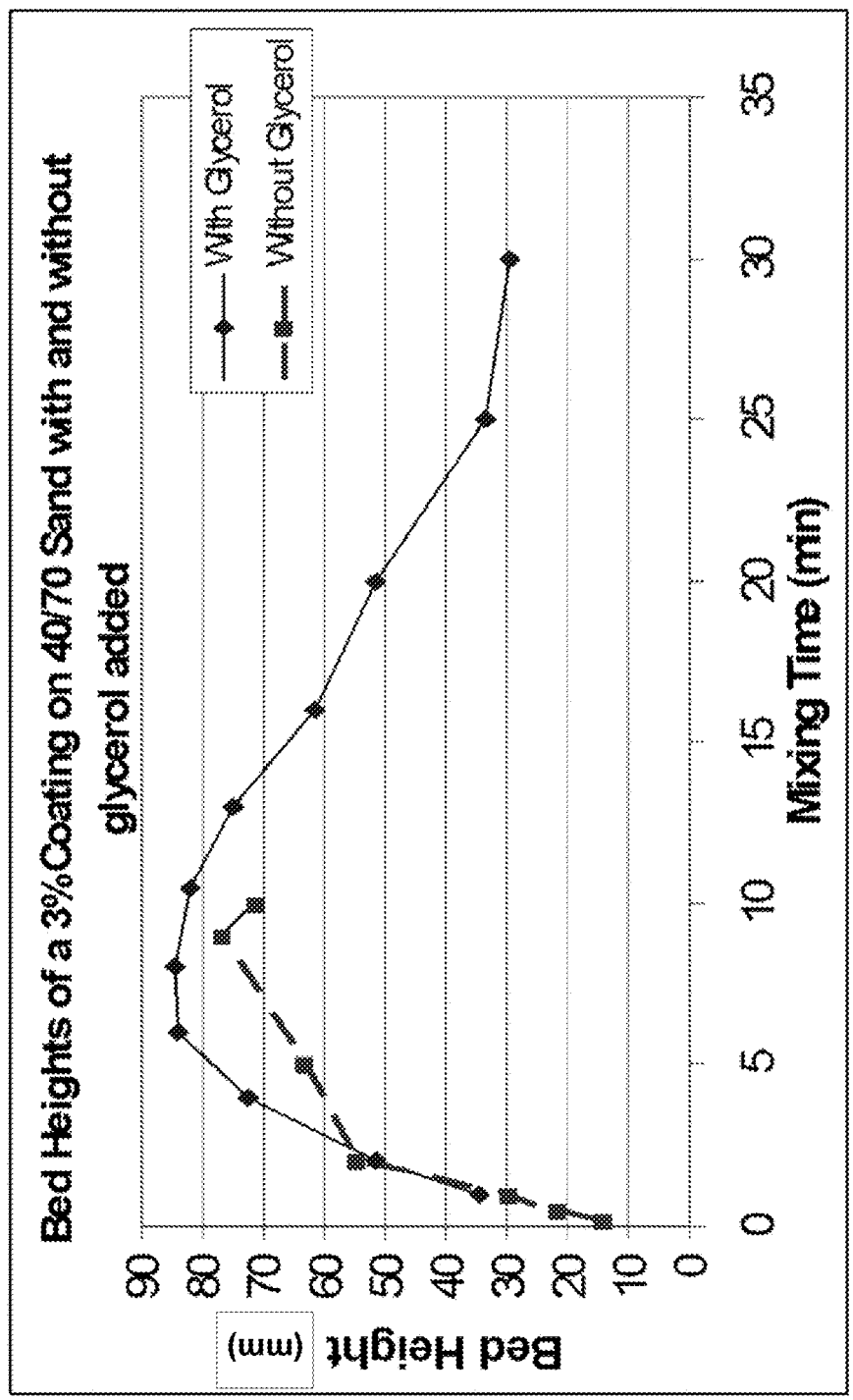
FIG. 7 is a graph of bed height vs. mixing time for two sets of self-suspending proppant samples.

This experiment sought to determine the effect of glycerol and other additives on the performance of self-suspending proppants (denoted as SSP below). 1 kg of dry 40/70 sand was added to the bowl of a KitchenAid stand mixer, model KSM90WH, which was fitted with the paddle attachment. 3.09 g of glycerol was mixed with 27.84 g of EM533 emulsion polymer, then the mixture was added to the top of the sand and allowed to soak in for 1 minute. At time 0, the mixer was started at speed 1 (72 rpm primary rotation). Samples were collected at 1-2 minute intervals and dried for 1 hour at 90° C. Then, each sample was subjected to the 1 liter shear test, where 50 g of SSP was added to 1 L of water and sheared at 200 rpm (an approximate shear rate of 550 s$^{-1}$) for 20 minutes. After transferring the water/SSP mixture to a 1 liter graduated cylinder and settling for 10 min, the bed heights were recorded. The experiment was repeated with 30.93 g EM533 emulsion polymer alone added to 1 kg of sand. These results are shown in FIG. 7. As shown in the graph, the glycerol additive increased bed heights significantly.

Figure 8:
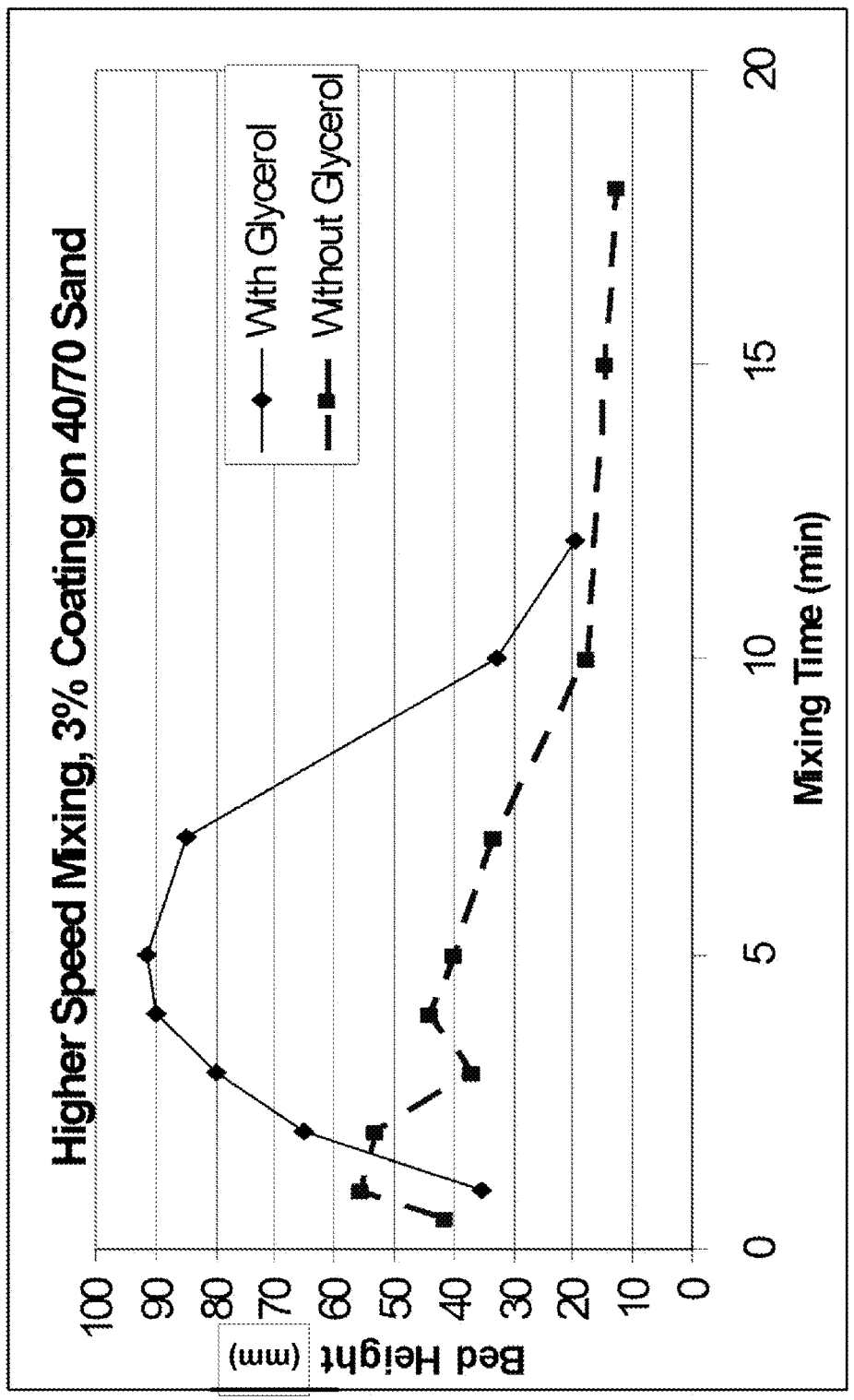
FIG. 8 is a graph of bed height vs. mixing time for two sets of self-suspending proppant samples.

The difference in performance was even more marked when the experiment was repeated at higher mixing speeds. Here the mixer was set to speed 4 (150 rpm primary rotation). At low mixing times, the samples were insufficiently mixed, leading to incomplete coating of the sand and ready desorption of the polymer from the surface of the SSP during the shear test. As mixing time of the coating process increased so did performance, until an ideal coating was reached, giving maximum bed height for that sample. After that, increasingly worse (lower) bed heights were seen at higher mixing times, possibly as a result of abrasion of the coating during extended mixing. At higher mixing speeds, this process happened even faster, such that the processing window for the emulsion polymer alone was less than 1 minute. With the addition of glycerol and the use of a lower mixing speed, this processing window was widened to nearly 15 minutes. In comparison to the tests with emulsion polymer alone, glycerol caused the processing window to widen, indicating that SSP preparation with the glycerol is more robust. At the same time, glycerol allowed the polymer emulsion to invert more fully, leading to better coatings and increased bed heights. Testing with combinations of glycerol and the emulsion polymer EM533 at a higher mixing speed yielded the results shown in FIG. 8.

Example 14: Modified Proppant with an Anticaking Agent

Modified proppant samples were made with and without anticaking agent for a comparison. For Sample A, 50 g of 40/70 sand was added to a FlackTek jar. 1.5 g of EM533 emulsion polymer was added to the sand and the sample was mixed for 30 seconds. After mixing, 0.25 g of calcium silicate was added to the sample and the sample was mixed again for 30 seconds. The sample was then dried for 1 hour at 85° C. After drying, the sample was poured over a 25 mesh screen and shaken lightly for 30 seconds. The amount of sand that passed through the sieve was then measured. For Sample B, 50 g of 40/70 sand was added to a FlackTek jar. 1.5 g of EM533 emulsion polymer was added to the sand and the sample was mixed for 30 seconds. The sample was then dried for 1 hour at 85° C. After drying, the sample was poured over a 25 mesh screen and shaken lightly for 30 seconds. The amount of sand that passed through the sieve was then measured. Table 8 shows the results.

TABLE 8

| Sample | Total Mass Sample, g | Mass passing Sieve, g | % Passing Sieve |
|---|---|---|---|
| Sample A | 50.5 | 50.16 | 99.3% |
| Sample B | 50.5 | 15.71 | 31.1% |

The results of sieve testing show that the incorporation of an anticaking agent was effective at improving the handling properties of the modified proppants.

Samples A and B were separately added to 1 L of water and then sheared in the EC Engineering Mixer for 20 minutes at 200 rpm. After shearing, the samples were transferred to a 1 L graduated cylinder and left to settle for 10 minutes. After settling, the bed heights were measured, showing no significant loss in shear stability as a result of incorporating an anticaking agent. Table 9 shows these results.

TABLE 9

| Sample | Bed Height, mm |
| --- | --- |
| Sample A | 56.21 |
| Sample B | 59.67 |

Example 15: Hydrogel Coating of Sand by Dissolving a Water-Soluble Polymer in a Monomer Formulation Followed by Polymerization of the Monomers 2.5 g of a mixture of acrylic acid (Aldrich 147230), poly(ethylene glycol) methyl ether acrylate (Aldrich 454990), and polyethylene glycol dimethacrylate (Aldrich 437441) in a mol ratio: 0.5/0.4/0.1 can be mixed with 7.5 g of polyethylene glycol (Aldrich 202371) and 1 wt % of ammonium persulfate. The solution can be mixed with 100 g of 30/70 mesh sand under nitrogen and can be allowed to react by increasing the temperature to 70° C. for 5 hours. Next the solids obtained are washed with methanol, vacuum filtered and dried in an oven at 80° C.

Example 16: Polyurethane Hydrogel Coating of Sand 100 g of 30/70 mesh frac sand can be added to a Hobart type mixer and heated to 120° C. Next 6 g of a polyethyleneglycol (Fluka 81190) will be added and allowed to mix for 1 minute. Then 0.53 g of Desmodur N75 from Bayer will be added. After mixing for 1 more minute, one drop of catalyst 1,4-Diazabicyclo[2.2.2]octane (Aldrich D27802) will be added and the mixture will be allowed to react for 5 more minutes. The obtained solid is washed with methanol, vacuum filtered and dried in an oven at 80° C.

Example 17: Shear Stability Testing

Coated sand samples made in Examples 15 and 16 were tested for shear stability. 1 L of tap water was added to a square beaker with a capacity of 1.25 L and markings at the 1 L level. The beaker was then placed in an EC Engineering CLM4 paddle mixer. The mixer was set to mix at 300 rpm. Once mixing commenced, 50 g of the coated sand sample was added to the beaker. After 30 seconds of mixing at 300 rpm, the mixing was reduced to 200 rpm and continued for 20 minutes. At the end of this mixing, the mixture was poured into a 1 L graduated cylinder and allowed to settle. After 10 minutes, the settled bed height was recorded, as shown in Table 10. Higher bed heights indicate better proppant performance.

TABLE 10

| Sand Sample | Bed Height after shear, mm |
| --- | --- |
| Untreated 40/70 Sand | 13.24 |
| Example 2 | 70.4 |
| Example 3 | 57.64 |

Example 18: Brine Tolerance

Two 20 mL vials were filled with 10 mL of tap water. Separately, another two 20 mL vials were filled with 10 mL of a 1% KCl solution. 1 g of sand prepared in Example 15 was added to a vial containing tap water and 1 g was added to a vial containing 1% KCl. Also, 1 g of sand prepared in Example 6 was added to a vial containing tap water and 1 g was added to a vial containing 1% KCl. All four vials were inverted ~7 times and then left to settle for 10 minutes. After settling, the bed heights were measured. The results are shown in Table 11.

TABLE 11

| Sand Sample | Tap Water Bed Height, mm | 1% KCl Bed Height, mm |
| --- | --- | --- |
| Example 2 | 10.39 | 5.02 |
| Example 6 | 17.15 | 9.23 |

Example 19: Abrasion Testing

Three 250 mL beakers were filled with 50 mL of tap water. One aluminum disk with a mass of about 5.5-6 g was placed in each of the beakers. One 2 inch stir bar was placed in each of the beakers as well. All three beakers were placed their own magnetic stir plates and the plates were set to speed setting 5. Six grams of 40/70 sand was added to one of the beakers. Six grams of sand prepared in Example 15 was placed a second beaker. The third beaker had no sand added at all. Each of the beakers was left to stir for 2 hours. After stirring, the aluminum disk was removed, washed and then dried. The mass was then measured again. The results, shown in Table 12, indicate that the sand prepared in Example 15 results in less abrasion to metal surfaces upon contact, compared with unmodified sand.

TABLE 12

|  | Initial Mass, g | Mass After 2 hrs, g | Total Loss, g | % Loss |
| --- | --- | --- | --- | --- |
| No Sand | 5.62 | 5.612 | 0.008 | 0.14% |
| 40/70 Sand, uncoated | 6.044 | 6.027 | 0.017 | 0.28% |
| Example 15 Sand | 5.673 | 5.671 | 0.002 | 0.04% |

Figure 9:
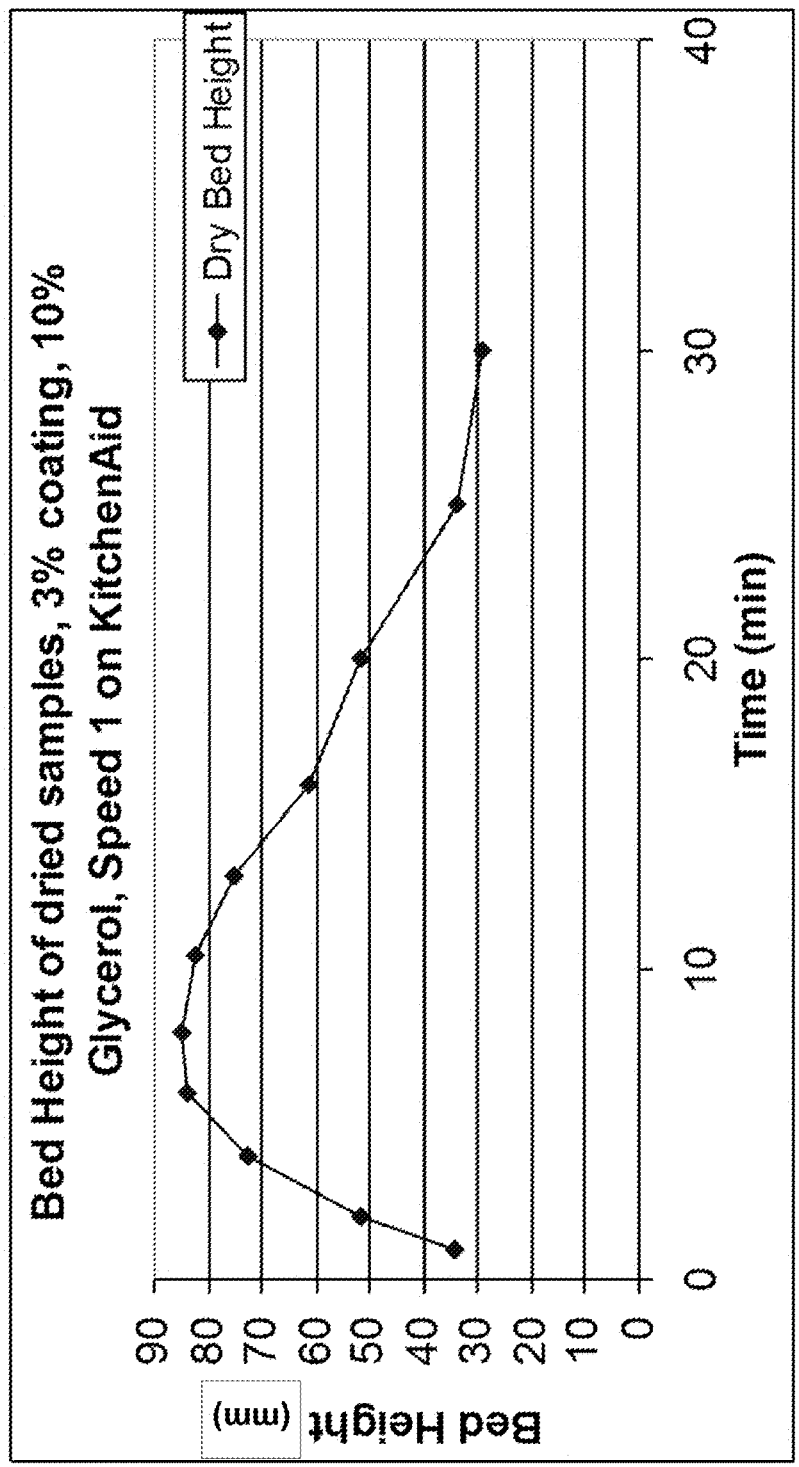
FIG. 9 is a graph of bed height vs. mixing time for a series of treated self-suspending proppant samples.

Example 20: Effect of Glycerol on Mixing 1 kg of dry 40/70 sand was added to the bowl of a KitchenAid stand mixer, model KSM90WH, which was fitted with the paddle attachment. 3.09 g of glycerol was mixed with 27.84 g of emulsion polymer then the mixture was added to the top of the sand and allowed to soak in for 1 minute. At time 0 the mixer was started at speed 4 (150 rpm primary rotation). Samples were collected at 1-2 minute intervals and dried for 1 hour at 90° C. Then, each sample was subjected to a shear test, where 50 g of SSP was added to 1 L of water and sheared at 550 s$^{-1}$ for 20 minutes. After settling for 10 min, the bed heights were recorded. The results of these shear tests are shown in FIG. 9. The graph demonstrates that both undermixing and overmixing can affect the behavior of the coated proppants, leading to dissociation of the polymer from the sand during the shear test. In this example, an optimal amount of mixing was between about 5 and 20 minutes. The effect of mixing duration upon performance suggests that the coating is fragile while wet, and it is more durable once it is dry. In comparison to the coating tests with emulsion polymer alone, coatings with glycerol-blended emulsions appeared to cause the processing window (i.e., the acceptable amount of mixing time) to widen. Additionally, glycerol-blended emulsion coatings appeared to invert more fully, leading to better coating properties such as increased bed heights.

Example 21: Production of Self-Suspending Proppant Using a Pug Mill

A 3 cubic foot pug mill type mixer was used to make a batch of self-suspending proppant. About 50 lbs of 40/70 mesh sand was added to the pug mill. In a 1 L beaker, about 756 g of SNF Flopam EM533 was added and 84 g of glycerol was mixed into the polymer. The entire mixture was then poured evenly on top of the sand in the pug mill. The pug mill was turned on and mixed at about 70 rpm. Samples were taken after 30, 60, 120, 180, 240, 300, 420, and 600 seconds of mixing. The samples were dried for one hour. After drying, the 50 g of each sample was added to 1 L of water and mixed in an EC Engineering CLM4 for 20 min at 200 rpm. After mixing, the sample was poured into a 1 L graduated cylinder and allowed to settle for 10 minutes. After settling, the bed height was measured. The results are shown in Table 13.

TABLE 13

| Pug Mill Mixing Time(sec) | Bed Height, mm |
| --- | --- |
| 30 | 29.34 |
| 60 | 23.49 |
| 120 | 48.9 |
| 180 | 57.58 |
| 240 | 55.71 |
| 300 | 44.88 |
| 420 | 57.21 |
| 600 | 57.25 |

Example 22: Wet Aging

A 400 g sample of self-suspending proppant (SSP) was manufactured in the same manner as Example 15. The 400 g of SSP was split into 50 g samples and left in closed containers and left at room temperature. After drying for various amounts of time, the samples were tested in the same manner as Example 21. The results are shown in Table 14.

TABLE 14

| Aging Time, hr | Final Bed Height, mm |
| --- | --- |
| 0 | 10.1 |
| 2 | 26.63 |
| 4 | 60.16 |

Example 23: SSP Plus Uncoated Proppant 10 mL of tap water was added to a 20 mL vial. Proppant sand, both SSP prepared in accordance with Example 15 and unmodified 40/70 was then added to the vial. The vial was inverted several times and then left to settle for 10 minutes. After settling, the bed height was measured. The results are shown in Table 15.

TABLE 15

| SSP, grams | 40/70 Sand, grams | Settled Bed Height, mm |
| --- | --- | --- |
| 0.5 | 0.5 | 5.46 |
| 0.75 | 0.25 | 5.71 |
| 0.9 | 0.1 | 8.23 |

Example 24: Anti-Caking Agents Added to SSP

A 400 g batch of SSP was produced in the same manner as described in Example 15. The sample was split into about 50 g subsamples and then 0.25 g of fumed silica with an aggregate size of 80 nm was mixed into each sample. Samples were then covered and aged at room temperature. The samples were tested in the same manner as described in Example 21. The results are shown in Table 16.

TABLE 16

| Hours Aging | Settled Bed Height, mm |
| --- | --- |
| 18 | 57.3 |
| 24 | 41.28 |
| 42 | 44.29 |
| 48 | 44.76 |
| 72 | 45.48 |

Example 25: Respirable Dust 200 g samples of uncoated and hydrogel-coated sand (40/70 mesh) prepared according to Example 15 were sieved with a 140 mesh screen, and the fine particulates that pass through the 140 mesh sieve were collected and weighed. The coated sample of sand demonstrated an 86% reduction on the amount of fine particulates relative to the uncoated sample of sand. The results are shown in Table 17.

TABLE 17

| | Weight of the sample | Weight of the dust | Dust Percentage of total |
| --- | --- | --- | --- |
| Uncoated sample | 200.011 g | 0.0779 g | 0.03895% |
| Coated sample | 200.005 g | 0.0108 g | 0.00540% |

Example 26: Anti-Caking Agents with Different Particulate Size 50 g of 40/70 mesh sand was mixed with 2 g of SNF Flopam EM533 using the speed mixer for 30 seconds at 800 rpm. Then 0.625 g of an anti-caking agent was added and the material was again mixed in the speed mixer for 30 seconds. The samples were allowed to sit for 3 hours, then tested in a 20 min shear test, allowed to settle for 10 min and the bed height measured. Results are shown in Table 18. The anti-caking agents improved the bed height after shear testing with a wide range of particle sizes.

TABLE 18

| Anti-caking agent | Particulate Size | Bed Height (mm) |
|---|---|---|
| Talc (magnesium silicate) | 12 microns | 16.76 |
| Calcium Silicate | 1-3 microns | 39.78 |
| Fumed Silica (EH-5) | 80 nanometers | 73.87 |

Example 27: Chemical Composition of Anti-Caking Agents

A wide variety of anti-caking agents were tested, as listed in Table 19. For each agent tested, 700 g of 40/70 sand was mixed in the KitchenAid mixer at speed 1 (144 rpm) with 21.65 g of a 10% glycerol/90% EM533 mixture. 50 g samples were separated out and mixed with the appropriate amount of anti-caking agent in the speed mixer. Three samples, which were mixed with 1% calcium silicate, 1.5% diatomaceous earth, and 1.5% Kaolin respectively, were tested in the shear test immediately, while the other 7 samples were dried for 1 hour in an 80° C. oven along with a control sample with no anti-caking agent. All samples were tested in the same manner as Example 17. Table 19-A shows bed heights after shear testing wet (non-dried) samples with an anti-caking agent applied. Table 19-B shows bed height after shear testing of dried (1 hr at 80° C.) samples with anti-caking agent applied.

TABLE 19-A

| Anti-Caking Agent | Amount | Bed Height (mm) |
|---|---|---|
| Calcium Silicate | 0.5 g (1%) | 30.26 |
| Diatomaceous earth (DE) | 0.75 g (1.5%) | 12.95 |
| Kaolin clay | 0.75 g (1.5%) | 18.46 |

TABLE 19-B

| Anti-Caking Agent | Amount | Bed Height (mm) |
|---|---|---|
| NONE | — | 85.9 |
| Sodium Bicarbonate | 0.5 g (1%) | 56.97 |
| Cornstarch | 0.5 g (1%) | 32.29 |
| Baby Powder (talc) | 0.5 g (1%) | 84.83 |
| Dry-Floc AF (hydrophobic starch) | 0.5 g (1%) | 32.24 |
| Tapioca Maltodextrin | 0.5 g (1%) | 27.08 |
| Microcrystalline cellulose | 0.5 g (1%) | 40.12 |
| Baking Powder | 0.5 g (1%) | 39.88 |

Example 28: Anti-Caking Agents: Amounts Needed for Drying

Figure 10:
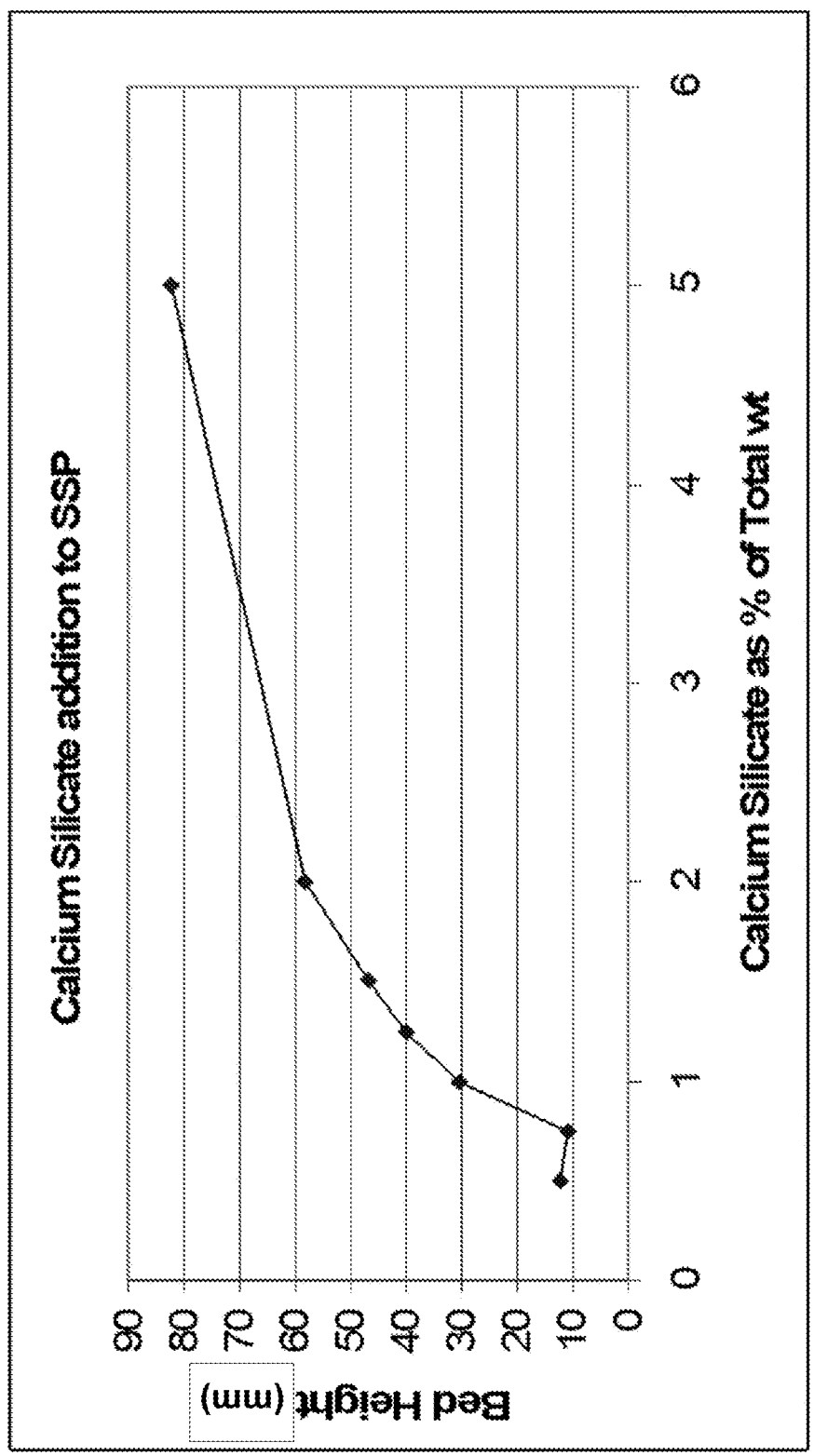
FIG. 10 is a graph of bed height for varying amounts of calcium silicate added to self-suspending proppant samples.

Seven 50 g samples of 40/70 sand were added to small plastic jars, followed by 2 g each of 10% glycerol/90% emulsion polymer mixture for each. After speed mixing for 30 seconds, 0.25 g, 0.375 g, 0.5 g, 0.675 g, 0.75 g, 1 g and 2.5 g of calcium silicate powder were added to the seven samples and the sand was again mixed for 30 seconds. The samples were shear tested without a further drying step, and the settled bed height was recorded in mm. The results are shown in FIG. 10. A similar experiment was carried out using silica as an anticaking agent. These tests showed that a sand coated with a hydrogel can be treated with an anticaking agent, yielding a product that does not require a separate drying step to produce an acceptable bed height after shear testing.

Example 29: Silica Anti-Caking Agents 50 g of 40/70 sand was added to a small jar, followed by 2 g of 10% glycerol/90% EM533. The jar was speed mixed at 800 rpm for 30 seconds, then the appropriate amount of fumed silica was added, as described in Table 20, and it was mixed for another 30 sec. The samples underwent a 20 min shear test and the bed heights were recorded. No oven drying was used. Results are shown in Table 20.

TABLE 20

| Compound name | Chemical character | Amount added | Bed Height |
|---|---|---|---|
| EH-5 | Amorphous fumed silica | 1% | 136.25 mm |
| M-5 | Untreated fumed silica | 1% | 123.52 mm |
| TS-720 | Treated fumed silica, siloxanes and silicones | 1% | 26.21 mm |
| PG001 | 30% anionic colloidal silica, 25.9% solids | 1% solids | 15.30 mm |

A batch of coated sand was mixed in the KitchenAid mixer and separated into several 50 g samples. Then 1 wt % of various sizes of fumed silica were added to each of 3 samples, mixed, and shear tested. These test results are shown in Table 21.

TABLE 21

| Powder | Approx. Size | Amount added | Bed height |
|---|---|---|---|
| Aldrich Fumed Silica | 7 nm | 1% | 48.86 mm |
| Aldrich Silica Nanopowder | 10 nm | 1% | 35.48 mm |
| Cabot EH-5 | 80 nm aggregates | 1% | 59.10 mm |

Figure 11:
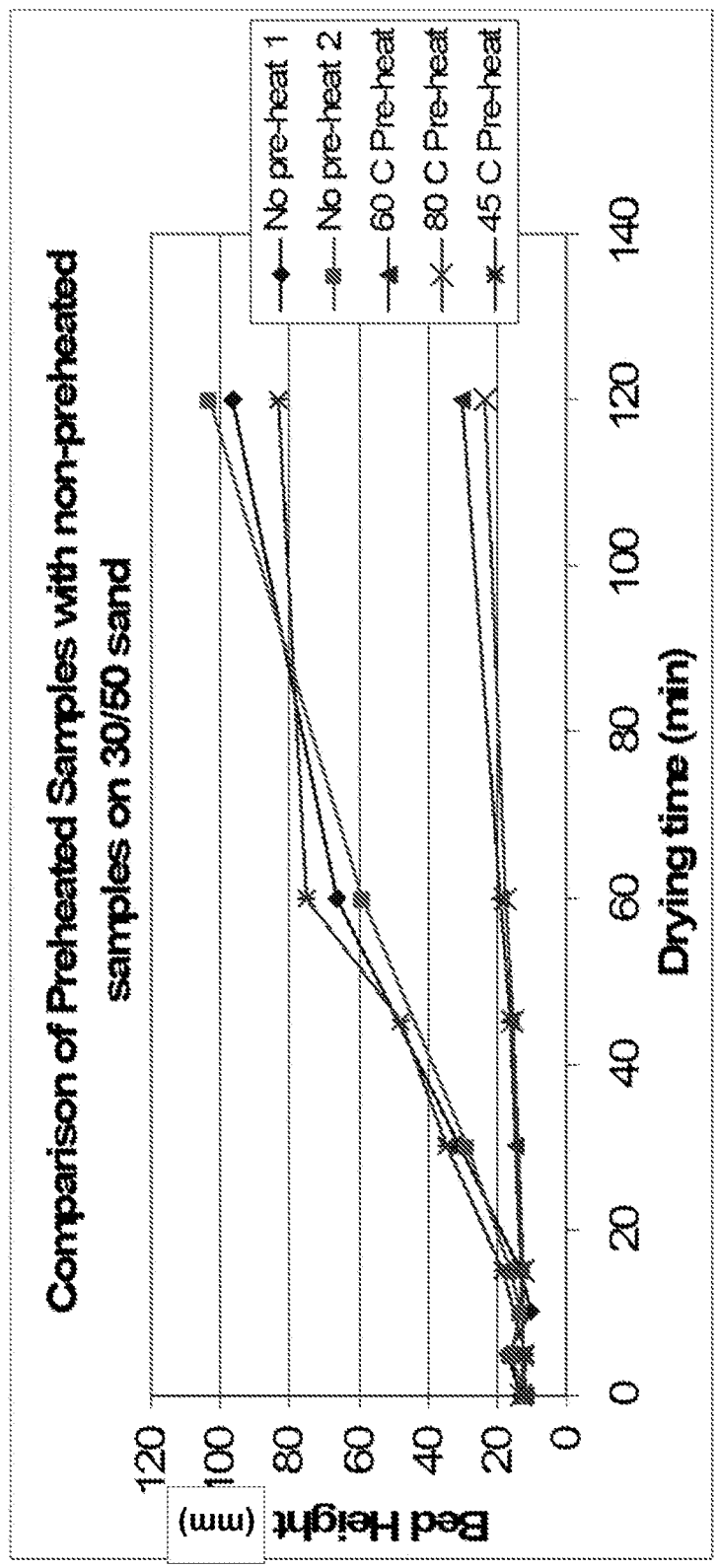
FIG. 11 is a graph of bed height vs. drying time for a series of preheated and non-preheated proppant samples.

Example 30: Preheating Sand 500 g of 30/50 sand was placed in a 90° C. oven for 1 h with occasional stirring, until the temperature of the sand equilibrated. The sand was then mixed in a commercial planetary mixer until it reached the desired pre-heated temperature (45° C., 60° C. or 80° C.), at which point 20.8 g of the SNF Flopam EM533 was added and the sample mixed for 7 min. The batch was then divided and dried in the oven for a range of times at 80° C. For the non-preheated samples, 500 g of 30/50 sand was placed in the mixer bowl with 20.8 g of polymer emulsion, mixed for 7 minutes, and then dried for varying amounts of time. All samples were shear tested using the standard procedure: 50 g of sand added to 1000 g of tap water, stirred at a shear rate of 550 $s^{-1}$ for 20 minutes, then settled for 10 min in a 1 L graduated cylinder. The results are shown in FIG. 11. These results suggest that preheating the sand to 45° C. is acceptable but 60-80° C. results in lower bed height in shear tests.

Figure 12:
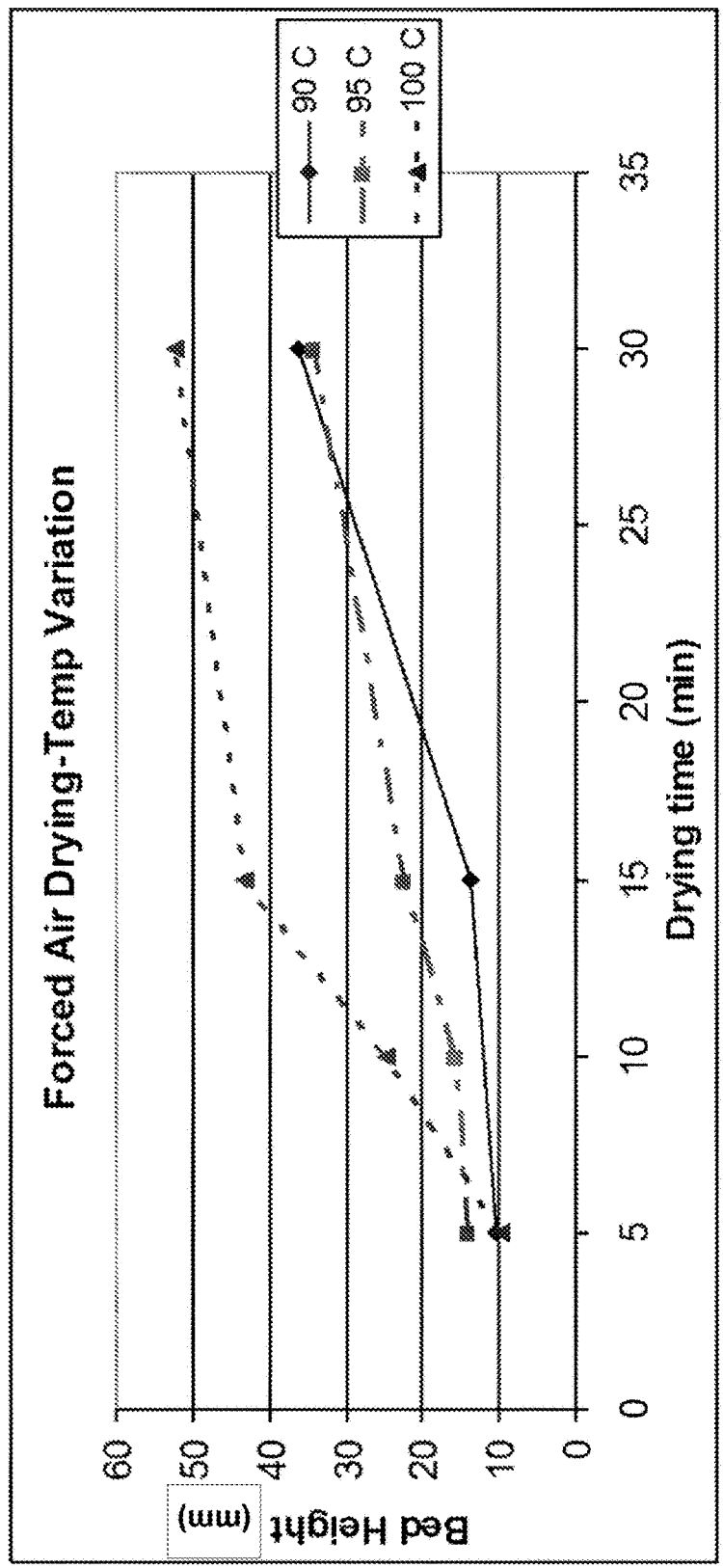
FIG. 12 shows a graph of bed height vs. drying time at various temperatures.

Example 31: Forced Air Drying 50 g of 40/70 sand was mixed with of 4% emulsion polymer (2 g) prepared according to Example 14 using the speed mixer for 30 seconds. The sample was transferred to a container fitted with a hot air gun set at 90, 95 or 100° C. The sample was left under the heat gun for 30 min total, with 5 g samples taken out at the 5, 10, 15 and 30 min marks. These samples were then tested using the Small shear test, performed as follows: 100 mL of tap water was set stirring in a 300 mL beaker using a 2 inch stir bar spinning at 500 rpm; 5 g of the sand sample was added to the beaker and sheared for 3 minutes; the whole solution was transferred to a 100 mL graduated cylinder, inverted once, settled for 5 minutes, and the bed height measured. The results of these tests are shown in FIG. 12. As shown in the graph, higher temperatures of the incoming forced air caused more complete drying and better bed height. To test the susceptibility of SSP to shear while drying with forced air, a seven prong rake was pulled back and forth through the sample to simulate light shear while drying. Two 50 g batches of SSP were prepared and dried under 110° C. air for 30 min. The first was completely static, while the second was constantly raked during the 30 min dry time. Both samples were tested using the large shear test for 20 min with a settling time of 10 min. The sample with static drying gave a settled bed volume of 100.63 mm; while the sample dried with light shear gave a settled bed volume of 109.49 mm.

Example 32: Mixing with Vertical Screw

A small-scale vertical screw blender was constructed. Sand and SNF Flopam EM533 were added to the container, and then mixed with the screw turning at about 120 rpm. The sample was then split into two 50 g parts, one of which was oven dried at 80° C., the other mixed with 0.5 g (1 wt %) fumed silica. Both were then subjected to a shear test as described in Example 17. The results of bed height measurement were as follows: Oven Dried, 1 h gave a bed height of 101.34 mm; Undried, with 1% of 7 nm fumed silica added, gave a bed height of 91.47 mm. Both oven drying and the addition of anti-caking agent to dry the product produced high bed heights.

Example 33: Microwave Drying 50 g of 40/70 sand was added to a small plastic jar, and then mixed with 2 g of a blend containing (10% glycerol/90% emulsion polymer) in the speed mixer for 30 seconds at 800 rpm. The sample was placed in a 700 W microwave oven and heated on high for 45 seconds. The sample was sieved and cooled, then sheared at 200 rpm for 20 min in an EC Engineering CLM4 mixer. After mixing the sample was transferred to a 1 L beaker and left to settle for 10 minutes. After settling, the bed height was measured in millimeters, giving a bed height of 52.43 mm. Microwave heating gives acceptable bed heights with relatively short drying times.

Figure 13:
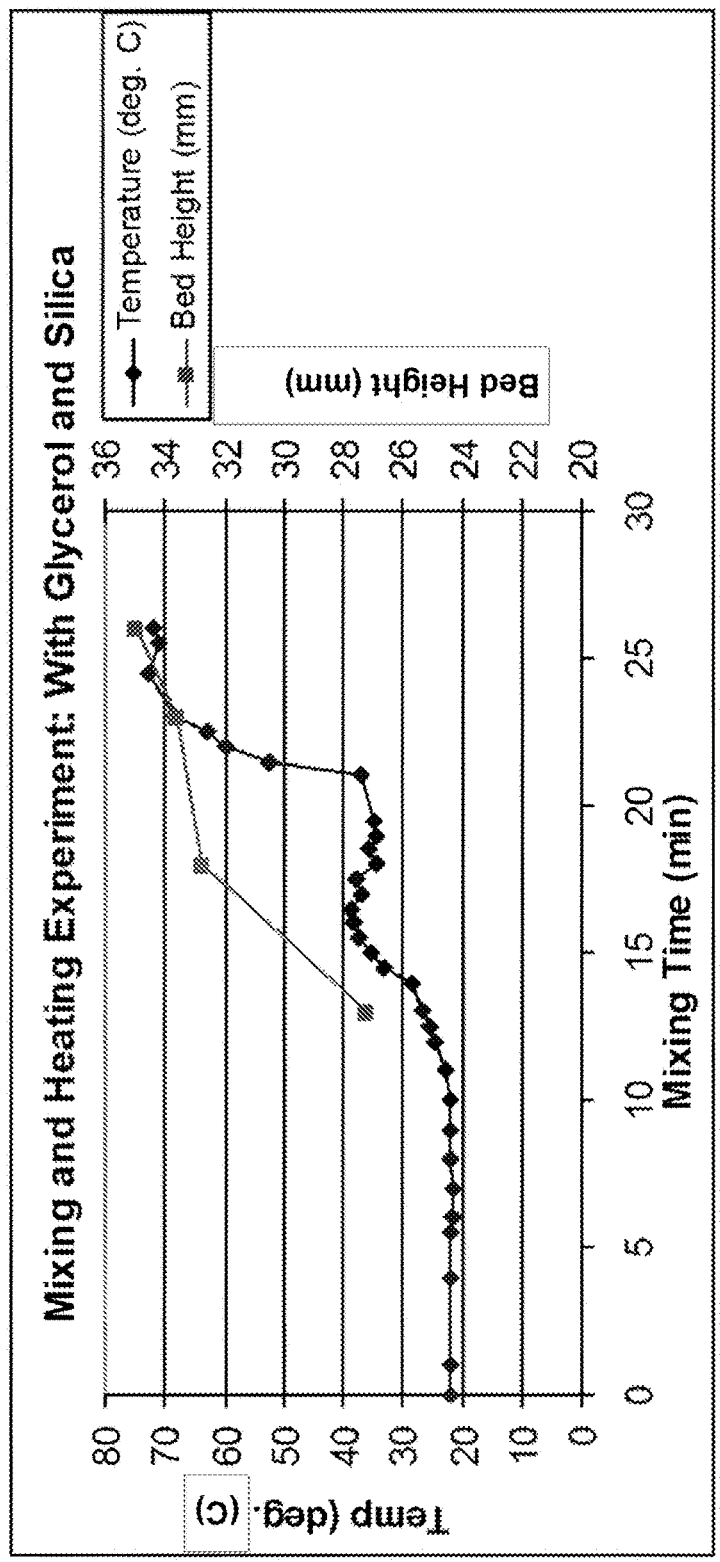
FIG. 13 shows a graph of temperature vs. mixing time for a series of treated self-suspended proppant samples.

Example 34: Mixing and Heating with Anti-Caking Agents 500 g 40/70 sand was mixed in a KitchenAid mixer with 20 g of (20% Glycerol/80% emulsion) for 8 min. Next was added 0.44% of Cabot EH-5 fumed silica and mixed for 2 minutes, and then the sample was heated with the heat gun. 50 g samples were collected at 13, 18, 24 and 26 minutes of mixing time. These were shear tested for 20 min and the bed heights recorded. The results are shown in FIG. 13. A combination of glycerol and silica made the processing window longer.

Figure 14:
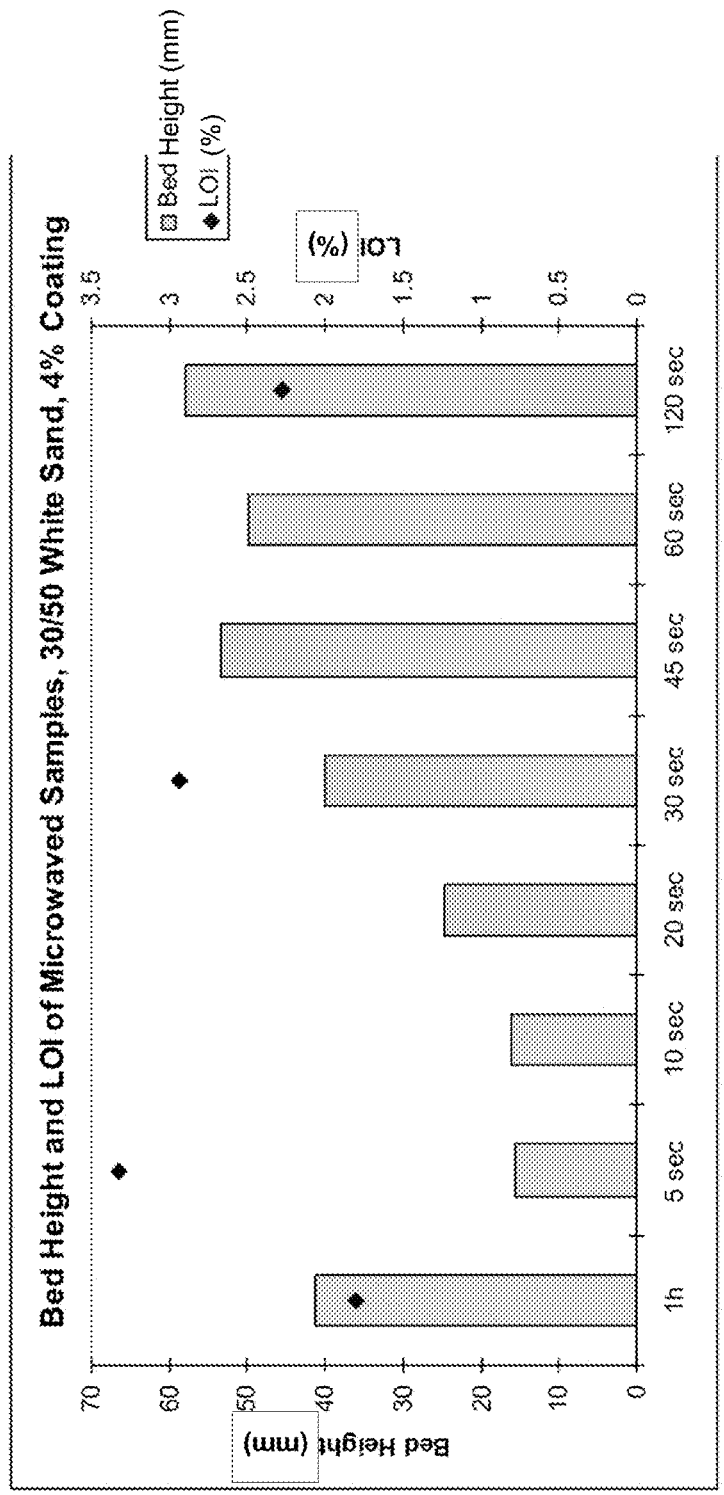
FIG. 14 shows a graph of bed height and loss of ignition (LOI) vs. drying time.

Example 35: Microwave Drying 400 g of 30/50 sand was combined with 16 g (4% wt) of emulsion polymer prepared according to Example 14 and mixed in a KitchenAid stand mixer for 7 minutes. One 50 g sample was dried using the oven (80° C.), and 7 other samples were placed in a 700 W microwave oven for 5, 10, 20, 30, 45, 60 and 120 seconds respectively. Shear tests (20 minutes long) as described in Example 12 and loss on ignition (LOI) tests were run on the samples. An LOI test consisted of adding 10 g of sand to a tared crucible, which was placed in a 960° C. oven for 1 hour. After heating for an hour, the crucible was cooled in a dessicator for 1 hour then weighed. Drying time, bed height and LOI are shown on Table 22. The difference between the initial and final weights was expressed as a percentage of the total initial sand weight, as shown in FIG. 14.

TABLE 22

| Drying Method | Drying time | Bed height (mm) | LOI (%) |
|---|---|---|---|
| Oven | 1 h | 41.36 | 1.8 |
| Microwave | 5 sec | 15.54 | 3.33 |
| Microwave | 10 sec | 16.14 | |
| Microwave | 20 sec | 24.68 | |
| Microwave | 30 sec | 39.99 | 2.929 |
| Microwave | 45 sec | 53.31 | |
| Microwave | 60 sec | 49.84 | |
| Microwave | 120 sec | 57.81 | 2.279 |

These tests suggest that the microwave drying technique removes predominantly the water, rather than the oil, from the coated samples.

Example 36: Vacuum Drying 250 g of 30/50 sand were combined with 10 g emulsion polymer as described in Example 14. The sand mixture was stirred in a KitchenAid stand mixer on lowest speed for 7 minutes, then separated into 50 g samples and dried in a vacuum oven under 24 inches Hg vacuum at 25° C., 50° C. and 85° C. for 1 hour, 1 hour, and 30 minutes respectively. The samples were cooled to room temperature, sieved, and shear tested (as described in Example 12) for 20 minutes. The results are shown in Table 23.

TABLE 23

| Sample # | Temperature (° C.) | Time | Bed Height (mm) |
|---|---|---|---|
| 1 | 25 | 1 hour | 16.79 |
| 2 | 50 | 1 hour | 17.34 |
| 3 | 85 | 30 min | 18.04 |

During these tests, none of the samples dried completely, although further testing may show that higher temperatures can effect more complete drying.

Example 37: Hydrogel Coating of Sand by Admicellar Polymerization 250 g of 30/70 frac sand can be added to 500 ml of a previously degassed aqueous solution containing 0.6 mM hexadecyltrimethylammonium bromide (CTAB) surfactant (equivalent to 2/3 of the critical micelle concentration of CTAB), and 6 mM monomer (mixture of acrylic acid/acrylamide in a mol ratio 30/70). Adsorption of the CTAB and monomer onto the sand particle can be carried out under gentle stirring for 24 h at 25° C. Then, 0.6 mM Ammonium persulfate can be added to the reactor and the polymerization will take place for 3 h at 80° C. Excess polymer and surfactant can be rinsed with several volumes of water and the sample will be dried overnight in the vacuum oven at 80° C.

Example 38: Hydrogel Coating of Sand by Inverse Suspension Polymerization

To a flask can be added 60 ml of DI-water, 6.6 g acrylamide, 3 g of acrylic acid, 2.4 g of N,N'-methylenebisacrylamide, 0.1 g ammonium persulfate, 2.0 g sodium chloride and 2 drops of N, N, N',N'-tetramethylethylenediamine. To this solution can be added 200 g of 30/70 mesh frac sand and the whole mixture will be kept at temperature <10° C. To the mixture can be added 200 ml of cyclohexane and the whole mixture can be vigorously stirred under nitrogen. Next the temperature can be increased to 60° C. and the reaction allowed to proceed for 6 hours. The resultant coated particles can be filtered and washed with hot water, acetone and dried at 45° C. under reduced pressure.

Example 39: Coating Polymer

A mixture for coating the proppant was made by combining 10 g glycerol and 90 g Flopam EM533 in a glass vial and mixing for 30 seconds with a vortex mixer. This polymer mixture is used in following examples.

Example 40: Preparation of 40/70 Mesh Self-Suspending Proppant ("SSP")

A sample of 40/70 mesh size SSP was prepared by adding 500 g of 40/70 frac sand into the bowl of a KitchenAid mixer. 20 g of the coating polymer of Example 39 was added to the sand. The mixer was turned on at a setting of 1 and the sand and polymer mixture mixed for 7 minutes. After mixing, the sample was dried for 1 hour at 85° C. After 1 hour, the sample was removed from the oven and any lumps were broken into individual grains.

Example 41: Preparation of 30/50 Mesh Self-Suspending Proppant ("SSP")

A sample of 30/50 mesh size SSP was prepared by adding 500 g of 30/50 frac sand into the bowl of a KitchenAid mixer. 20 g of the coating polymer of Example 39 was added to the sand. The mixer was turned on at a setting of 1 and the sand and polymer mixture mixed for 7 minutes. After mixing, the sample was dried for 1 hour at 85° C. After 1 hour, the sample was removed from the oven and any lumps were broken into individual grains.

Example 42: Reduced Fines Content of Self-Suspending Proppant ("SSP") Vs. Sand A stack of standard mesh sieves was prepared with 40 mesh on top, 70 mesh in the middle, and a pan at the bottom. The tare weight of each clean/dry sieve was measured and recorded. 50 g of the 40/70 mesh SSP of Example 20 was added to the top of the sieve stack, and the stack was shaken by hand for five minutes. After shaking, the stack was disassembled and each sieve was weighed. The mass retained on each sieve was calculated as a percent of the original sample mass, and the amount of the sample remaining in the pan represents the fines fraction, as defined by a 70 mesh cutoff. The procedure was repeated, substituting unmodified 40/70 mesh frac sand for the 40/70 SSP. The results in Table 24 show the particle size distribution for 40/70 SSP. Table 25 contains the particle size analysis for unmodified 40/70 frac sand. The results show that the amount of material passing the 70 mesh screen is reduced in 40/70 SSP (1.2% vs. 4.8%). This shows that SSP can contain a reduced amount of fine particulates than a sand sample.

TABLE 24

Particle size analysis of 40/70 SSP
Sample: 49.516 g of 40/70 SSP

| Mesh | Tare, g | Final Mass, g | Mass Sand Retained, g | Size Distribution |
|---|---|---|---|---|
| 40 | 118.826 | 127.685 | 8.859 | 17.9% |
| 70 | 111.136 | 151.036 | 39.9 | 80.6% |
| Pan | 81.501 | 82.072 | 0.571 | 1.2% |
| | | Total | 49.33 | 99.6% |

TABLE 25

Particle size analysis of unmodified 40/70 white sand
Sample: 50.974 g of 40/70 White sand

| Mesh | Tare, g | Final Mass, g | Mass Sand Retained, g | Size Distribution |
|---|---|---|---|---|
| 40 | 118.806 | 118.921 | 0.115 | 0.2% |
| 70 | 111.045 | 159.465 | 48.420 | 95.0% |
| Pan | 81.503 | 83.935 | 2.432 | 4.8% |
| | | Total | 50.967 | 100.0% |

Example 43: Friction Reduction

1 L of tap water was added to a square beaker and the beaker was placed in an EC Engineering CLM-4 Mixer. The mixer was turned on and set to 200 rpm mixing speed. 120 g of the 30/50 SSP of Example 21 was added to the tap water. The slurry mixed for 20 minutes, then was transferred to a 1 L graduated cylinder and left to settle for 10 minutes. After settling, the supernatant was collected. This procedure was repeated until 2 L of supernatant fluid was collected. The friction reduction of the collected fluid was then determined using a flow loop apparatus. The flow loop consists of a 0.12 in (ID) by 3 ft stainless steel test pipe and a pump that delivers a constant flowrate of 55 gph. These conditions correspond to a Reynolds number of 23,000, confirming that the fluid is in turbulent flow. The percent friction reduction (% FR) is determined experimentally by measuring the pressures at the entrance and the exit of the test pipe at a constant flow rate. The following equation to calculate the percent friction reduction: % $FR=100*(1-(\Delta P_1/\Delta P_0))$, where here $\Delta P_1$ is the pressure drop across the test pipe using the SSP supernatant fluid and $\Delta P_0$ is the pressure drop across the test pipe using tap water. The pressure values were $\Delta P_i=11.8$ psi and $\Delta P_{0=38.5}$ psi, corresponding to a friction reduction (% FR) of 69%. This shows that the SSP contributes significantly to friction reduction of the associated fluid, representing a reduction in the pumping requirements.

Example 44: Hydraulic Conductivity Tests

To model hydraulic conductivity of a simulated proppant pack, 48 g of 30/50 mesh size SSP of Example 21 were mixed into 1 liter of water. Ammonium persulfate, was added at 0.1% level and the mixture was heated to 185° F. for 1 hour. After cooling to room temperature, the mixture was filtered through a 2.25 inch ID column with a 100 mesh sieve at the bottom, separating the particles from the fluid. The particles formed a bed depth of 0.5 inch on the 100 mesh screen, and the flowrates of various fluids through the bed were measured by gravity flow. A plain sand bed was constructed in a similar manner and the flowrates compared with the SSP derived bed. Using this method, the flowrates obtained by SSP (250 mL efflux in 28 seconds) and plain sand (250 mL efflux in 25 seconds) were nearly identical, showing that SSP, once treated with oxidative breakers such as ammonium persulfate, has no deleterious effect on hydraulic conductivity of a sand bed or a simulated proppant pack.

Example 45: Self-Suspending Proppants ("SSP") with Anticaking Agents

In addition to anticaking agents' being able to replace a drying step, they can be used to generally improve handling qualities for SSP. A number of different particulate materials were tested as anticaking agents, as set forth in Table 26 below. To prepare the samples for each material, 800 g of 30/50 mesh sand was mixed in a KitchenAid mixer at speed 1 (144 rpm) with 32 g of coating polymer of Example 19. 20 g samples were taken and blended with a selected anticaking agent in a mixer, with anticaking agent doses calculated as a percent of the total sand in the sample. The consistency of the samples was observed and recorded as "Appearance before drying," then they were dried for 1 hour at 85° C. Their consistency was again observed and recorded as "Appearance after drying." Samples were then subjected to conditions of 80%-90% relative humidity at 25-35° C. for one hour to assess their anticaking properties, and consistency was observed and recorded as "Appearance after humidity exposure." Results are shown in Table 26 below, indicating that the anticaking agent improves the handling properties of the SSP, where free-flowing is a desirable feature.

TABLE 26

Evaluation of SSP samples with added anticaking agents

| Anticaking agent dose | Anticaking agent | Appearance before drying | Appearance after drying | Appearance after humidity exposure |
|---|---|---|---|---|
| 0 | None (control) | Wet | Clumpy | Sticky |
| 0.1% | Fumed Silica | Wet | Slightly clumpy | Free-flowing |
| 0.2% | Fumed Silica | Slightly clumpy | Free-flowing | Free-flowing |
| 0.5% | Fumed Silica | Free-flowing | Free-flowing | Free-flowing |
| 0.5% | Calcium Silicate | Free-flowing | Free-flowing | Free-flowing |
| 1% | Corn Starch | Wet | Clumpy | Clumpy |
| 1% | Sodium Stearate | Wet | Clumpy | Slightly clumpy |
| 0.5% | Kaolin | Slightly clumpy | Free-flowing | Free-flowing |
| 0.5% | Bentonite | Slightly clumpy | Free-flowing | Free-flowing |
| 0.2% | Attapulgite | Slightly clumpy | Free-flowing | Free-flowing |

Example 46: Treating Resin Coated Sand with SMA 4000i

Resin coated sand was coated with SMA 4000i by adding 25 g of resin coated sand into a 250 mL round bottom flask. Separately, 0.25 g of SMA 4000i was dissolved in 3.57 g of tetrahydrofuran (THF) to make a 7% solution. 1.43 g of the THF solution was then added to the resin coated sand in the round bottom flask. Additional THF was added to the round bottom flask until the sand was coved. The THF was then evaporated off of the sample using a rotary evaporator.

Example 47: Treating Resin Coated Sand with SMA 4000i

Resin coated sand was coated with SMA 4000i by adding 25 g of resin coated sand into a 250 mL round bottom flask. Separately, 0.25 g of SMA 2000i was dissolved in 3.57 g of THF to make a 7% solution. 0.72 g of the THF solution was then added to the resin coated sand in the round bottom flask. Additional THF was added to the round bottom flask until the sand was coved. The THF was then evaporated off of the sample using a rotary evaporator.

Example 48: Treating Resin Coated Sand with SMA 2000i

Resin coated sand was coated with SMA 2000i by adding 25 g of resin coated sand into a 250 mL round bottom flask. Separately, 0.25 g of SMA 4000i was dissolved in 3.57 g of THF to make a 7% solution. 1.43 g of the THF solution was then added to the resin coated sand in the round bottom flask. Additional THF was added to the round bottom flask until the sand was coved. The THF was then evaporated off of the sample using a rotary evaporator.

Example 49: Treating Resin Coated Sand with SMA 2000i

Resin coated sand was coated with SMA 2000i by adding 25 g of resin coated sand into a 250 mL round bottom flask. Separately, 0.25 g of SMA 2000i was dissolved in 3.57 g of THF to make a 7% solution. 0.72 g of the THF solution was then added to the resin coated sand in the round bottom flask. Additional THF was added to the round bottom flask until the sand was coved. The THF was then evaporated off of the sample using a rotary evaporator.

Example 50: Treating Resin Coated Sand with Pluronic L31

Resin coated sand was coated with Pluronic Surfactant L31 by adding 20 g of resin coated sand into a small FlackTek jar. 0.025 g of the surfactant was added to the resin coated sand. The sample was then mixed using a FlackTek Speedmixer at 800 rpm for 30 seconds.

Example 51: Treating Resin Coated Sand with Pluronic L35

Resin coated sand was coated with Pluronic Surfactant L35 by adding 20 g of resin coated sand into a small FlackTek jar. 0.025 g of the surfactant was added to the resin coated sand. The sample was then mixed using a FlackTek Speedmixer at 800 rpm for 30 seconds.

Example 52: Treating Resin Coated Sand with Pluronic L81

Resin coated sand was coated with Pluronic Surfactant L35 by adding 20 g of resin coated sand into a small FlackTek jar. 0.025 g of the surfactant was added to the resin coated sand. The sample was then mixed using a FlackTek Speedmixer at 800 rpm for 30 seconds.

Example 53: Treating Resin Coated Sand with ARQUAD® 2HT-75

Resin coated sand was coated with ARQUAD® 2HT-75 by adding 25 g of resin coated sand into a 250 mL round bottom flask. Separately, 0.25 g of ARQUAD® 2HT-75 was dissolved in 3.57 g of IPA to make a 7% solution. 0.72 g of the IPA solution was then added to the resin coated sand in the round bottom flask. Additional IPA was added to the round bottom flask until the sand was coved. The IPA was then evaporated off of the sample using a rotary evaporator.

Example 54: Treating Resin Coated Sand with ADOGEN® 464

Resin coated sand was coated with ADOGEN® 464 by adding 20 g of resin coated sand into a small FlackTek jar. 0.025 g of the ADOGEN® 464 was added to the resin coated sand. The sample was then mixed using a FlackTek Speedmixer at 800 rpm for 30 seconds.

Example 55: Coating Polymer Mixture 9 g of Flopam EM 533 (SNF) was combined with 1 g of glycerol in a 20 mL vial. The vial was then mixed for 30 seconds on a vortex mixer.

Example 56: Hydrogel Coating of Sand Samples

Sand samples were prepared by placing 20 g of the samples prepared in Example 46 through Example 54 into small FlackTek jars. 0.6 g of the coating mixture prepared in Example 35 was added into each the jar. The contents were then mixed at 800 rpm for 1 minute using a FlackTek speed mixer. The samples were then dried for 30 minutes at 100° C. After drying, 1 g of each sample was added to a 20 mL vial containing 10 mL of tap water. The vials were mixed gently for 1 minute then left to settle for 10 minutes. After settling, the bed height was measured to determine polymer hydration. The results of the testing are shown in Table 27.

TABLE 27

| Settled bed heights | | | |
|---|---|---|---|
| Example Number | Additive | Amount on Resin Coated Sand | Bed Height |
| 46 | SMA 4000i | 4000 ppm | 10 mm |
| 47 | SMA 4000i | 2000 ppm | 8 mm |
| 48 | SMA 2000i | 4000 ppm | 8 mm |
| 49 | SMA 2000i | 2000 ppm | 4 mm |
| 50 | Pluronic L31 | 1250 ppm | 8 mm |
| 51 | Pluronic L35 | 1250 ppm | 7 mm |
| 52 | Pluronic L81 | 1250 ppm | 10 mm |
| 53 | ARQUAD ® 2HT-75 | 2000 ppm | 3 mm |
| 54 | ADOGEN ® 464 | 1250 ppm | 2 mm |

Example 57: Humidity Aging Test (Metal Chelate Crosslinkers)

Tyzor TE is a triethanolamine titanium chelate 80% solution in ethanol. Tyzor TEAZ is a 100% actives triethanolamine zirconium chelate product. These metal chelates were dispersed in castor oil at different concentrations and applied to proppant in a second addition step during the coating process. Samples of coated proppant were prepared by adding 3 g of a blend of Flopam EM533 and glycerol to 100 g of 30/50 mesh proppant white sand in a FlackTek Max 100 jar. The samples were then mixed in a FlackTek Speedmixer at 850 rpm for 30 seconds. Samples were then removed from the Speedmixer and in some cases treated with a metal chelate/castor oil blend. Samples were then returned to the Speedmixer and mixed at 850 rpm for 30 seconds. Samples were then removed from the Speedmixer, transferred to a watch glass, and dried at 100° C. for 30 minutes in a forced air laboratory oven. After drying, samples were sieved through an 18 mesh screen. For humidity aging 50 g of the formulated samples were placed in Max 100 FlackTek jars and left sitting in a humidity chamber for 1 hour. The relative humidity of the chamber was kept between 60-70%. After humidification, samples were tested in a Carver Press cell (2.25" I.D.) with an applied load of 1,000 lbs for 30 seconds. Caking of the samples was visually assessed and compared to the control (no second addition). The extent to which samples caked was scored from 1 to 4 with a score of "1" indicating a solid cake and a score of "4" indicating a free-flowing, non-caking material. Results are shown in Table 28.

TABLE 28

| Caking Result with Metal Chelate Add | | | |
|---|---|---|---|
| Sample | Metal chelate | Metal Chelate Conc. (ppm) | Caking Score |
| 1 | None | 0 | 1 |
| 2 | Tyzor TE | 600 | 3 |
| 3 | Tyzor TE | 1500 | 3 |
| 4 | Tyzor TEAZ | 600 | 2 |
| 5 | Tyzor TEAZ | 900 | 3 |

(Caking Scores for Table 14: "1"-Solid cake that can be handled without falling apart, "2"-Mostly solid cake that begins to break as handled, "3"-Cake is crumbly out of press cell, "4"-No cake formation).

Example 58: Humidity Aging Test (Powder Additives)

Samples of coated proppant sand were formulated by adding 3 g of a Flopam EM533/glycerol blend to 100 g of 30/50 mesh proppant white sand. The samples were mixed at 850 rpm for 30 seconds in a FlackTek Speedmixer. Samples were then removed from the Speedmixer and in some cases treated with a dry powder. Samples were then returned to the Speedmixer and mixed at 850 rpm for 30 seconds to uniformly distribute the powder through the sample. Samples were then removed from the Speedmixer, transferred to a watch glass, and dried at 100° C. for 30 minutes in a forced air laboratory oven. After drying, samples were sieved through an 18 mesh screen. For humidity aging about 50 g of the formulated samples were placed in Max 100 FlackTek jars and left sitting in a humidity chamber for 1 hour. The relative humidity of the chamber was kept between 60-70%. After humidification, samples were tested in a Carver Press cell (2.25" I.D.) with an applied load of 1,000 lbs for 30 seconds. Caking of the samples was visually assessed and compared to the control (no second addition). The extent to which samples caked was scored from 1 to 4 with a score of "1" indicating a solid cake and a score of "4" indicating a free-flowing, non-caking material, as shown in Table 29.

TABLE 29

Caking Results of Coated Proppant with Powder Additive

| Sample | Powder | Powder Melting Point (° C.) | Powder Conc. (wt %) | Caking Score |
|---|---|---|---|---|
| 6 | None | N/A | 0.0% | 1 |
| 7 | Thixcin-R | 85 | 0.5% | 2 |
| 8 | Stearic Acid | 70 | 0.6% | 3 |

(Caking Scores for Table 15: "1"-Solid cake that can be handled without falling apart, "2"-Mostly solid cake that begins to break as handled, "3"-Cake is crumbly out of press cell, "4"-No cake formation).

Example 59: Oil-Based Additives

Several oil-based or relatively hydrophobic materials were tested to determine their efficacy in decreasing caking in humidified samples of self-suspending proppant (SSP). Samples were prepared by mixing 300 g of 30/50 sand, preheated to 45° C., with 9 g of a 10% glycerol/90% Flopam 533 mixture in a KitchenAid mixer at speed 1. After 1 minute of mixing, the second additive (usually at 0.2% by wt sand) was introduced and the mixture was mixed for another minute. The sample was dried under medium shear conditions using a heat gun and KitchenAid. The samples were then subjected to >50% RH in a humidity chamber for 1 hour. They were then individually tested for caking behavior by undergoing the compression test. This consisted of being compressed at 200 PSI for 30 seconds in a compression cell using a Carver Press, then removed from the cell and observed. The resulting cake (See Table 16, Compression Test) was graded on the following scale: "1"-Solid cake that can be handled without falling apart, "2"-Mostly solid cake that begins to break as handled, "3"-Cake is crumbly out of press cell, "4"-No cake formation, as set forth in Table 30.

TABLE 30

Anti-caking Results of Coated Proppant with Oil Based Additives

| 2$^{nd}$ Addition: Chemical Identity | 2$^{nd}$ Addition: Amount (% of total sand weight) | Compression Test |
|---|---|---|
| Control | — | 1 |
| Castor Oil | 0.2% | 1 |
| Triacetin (mixed into polymer) | 0.3% | 1 |
| Grapeseed Oil | 0.2% | 1 |
| 50% Corn Oil mixed with 50% D400 Jeffamine | 0.2% | 1 |
| Adogen 464 | 0.2% | 3 |
| 50% Adogen 464 mixed with 50% Castor Oil | 0.2% | 2 |
| 10% Adogen 464 mixed with 90% Castor Oil | 0.2% | 1 |
| Petroleum Jelly | 0.2% | 1 |
| Mineral Oil (high molecular weight) | 0.2% | 1 |
| Corn Oil | 0.2% | 1 |
| Dimethyl, phenylmethyl siloxane, trimethyl terminated | 0.2% | 1 |
| Aminopropyl terminated poly(dimethyl siloxane) | 0.2% | 3 |
| 50% Adogen mixed with 50% Corn Oil | 0.2% | 2 |
| Arquad 2HT-75 | 0.2% | 3 |
| Adogen 464 | 0.1% | 3 |

The sample treated with Adogen 464 barely formed a cake in this test, even at lower doses.

EQUIVALENTS

While specific embodiments of the subject invention have been disclosed herein, the above specification is illustrative and not restrictive. While this invention has been particularly shown and described with references to preferred embodiments thereof, it will be understood by those skilled in the art that various changes in form and details may be made therein without departing from the scope of the invention encompassed by the appended claims. Many variations of the invention will become apparent to those of skilled art upon review of this specification. Unless otherwise indicated, all numbers expressing reaction conditions, quantities of ingredients, and so forth, as used in this specification and the claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A process for fracturing a subterranean geological formation comprising introducing into said formation a treatment fluid wherein the fluid comprises a hydraulic fracturing fluid and a suspended modified proppant having hydrophilic properties while suspended during transport, wherein the suspended modified proppant comprises a proppant substrate particle and a swollen hydrogel coating,
wherein the hydrogel coating has been applied to a surface of the proppant substrate particle and localizes on the surface, and
wherein the process further comprises degrading the hydrogel coating by chemical, thermal, mechanical or biological means after the suspended modified proppant has been introduced into the formation.

2. The process of claim 1, wherein degrading of the hydrogel coating is controlled by at least one of reaching a target temperature or amount of time in the fluid.

3. The process of claim 2, wherein degrading of the hydrogel coating is controlled so as to direct placement of the proppant substrate particle of the modified proppant to a desired location within the formation.

4. The process of claim 1, wherein degrading of the hydrogel coating is controlled so as to direct placement of the proppant substrate particle of the modified proppant to a desired location within the formation.

5. The process of claim 4, wherein degrading of the hydrogel coating is accomplished by means of a chemical breaker.

6. The process of claim 4, wherein degrading of the hydrogel coating is accomplished by means of an enzymatic breaker.

7. The process of claim 1, wherein the suspended modified proppant has been formulated so that when 1 to 3 grams of the modified proppant in a dry state is added to 100 ml of tap water in a 100 ml graduated cylinder and then inverted 8 times, the modified proppant exhibits a settling time which is about 2 to about 7 times the settling time of the proppant substrate particle from which the modified proppant is made.

8. The process of claim 7, wherein the modified proppant exhibits a settling time which is about 3 to about 7 times the settling time of the proppant substrate particle.

9. The process of claim 1, wherein the modified proppant has been formulated so that, after 1 gram of the modified proppant is mixed with 10 g of tap water and allowed to settle, the modified proppant exhibits a settled bed height which is about 3 to about 28 times greater than the settled bed height of an otherwise identical proppant not modified with the hydrogel coating.

10. The process of claim 1, wherein the hydrogel coating has been crosslinked.

11. The process of claim 10, wherein the hydrogel coating has been crosslinked by means of a cross-linking agent which has been applied to the hydrogel coating subsequent to the application of the hydrogel coating to the proppant substrate particle.

12. The process of claim 10, wherein the hydrogel coating has been crosslinked by means of a cross-linking agent, and further wherein the cross-linking agent is covalent and selected from an epoxide, an anhydride, an aldehyde, a diisocyanate and a carbodiamide.

13. The process of claim 12, wherein the cross-linking agent is a diisocyanate.

14. The process of claim 10, wherein the hydrogel coating has been crosslinked by an amount sufficient to prevent premature hydration due to humidity.

15. The process of claim 1, wherein the hydrogel coating is formed from a hydrogel-forming polymer selected from polyacrylamide, copolymers of acrylamide with anionic and cationic comonomers, hydrolyzed polyacrylamide, copolymers of acrylamide with hydrophobic comonomers, poly(acrylic acid), poly(acrylic acid) salts, carboxymethyl cellulose, hydroxyethyl cellulose, hydroxypropyl cellulose, guar gum, alginate, carrageenan, locust bean gum, carboxymethyl guar, carboxymethyl hydroxypropyl guar gum, hydrophobically associating swellable emulsion (HASE) polymers, latex polymers and starches.

16. The process of claim 15, wherein the hydrogel-forming polymer is selected from polyacrylamide, copolymers of acrylamide, poly(acrylic acid), poly(acrylic acid) salts and starches.

17. The process of claim 16, wherein the hydrogel-forming polymer is a polyacrylamide.

18. The process of claim 1, wherein the modified proppant comprises a cationic/anionic polymer pair.

19. The process of claim 18, wherein the cationic polymer is a cationic polyacrylamide.

20. The process of claim 1, wherein the hydrogel coating has a thickness between about 10% to about 1000% of the average diameter of the proppant substrate particle when suspended and a thickness between about 0.01% to about 20% of the average diameter of the proppant substrate particle before being suspended.

21. The process of claim 1, wherein the hydrogel coating forms a substantially continuous film on the surface of the proppant substrate particle.

22. The process of claim 1, wherein the proppant substrate particle comprises sand, bauxite, sintered bauxite or ceramic.

23. The process of claim 1, wherein swelling of the hydrogel coating is essentially complete within about 10 minutes of being contacted with an excess of tap water at 20° C., and further wherein the modified proppant exhibits an expanded settled bed height which is substantially retained after having been subjected to shear at a shear rate of about 550 $s^{-1}$ for 10 minutes.

24. The process of claim 23, wherein after having been subjected to shear at a shear rate of about 550 s−1 for 10 minutes the expanded bed height of the modified proppant is at least about 75% of the settled bed height of the proppant before shearing begins.

25. The process of claim 1, wherein swelling of the hydrogel coating is essentially complete within about 5 minutes of being contacted with an excess of tap water at 20° C.

26. The process of claim 1, wherein the hydrogel coating on the proppant particle substrate includes an alcohol selected from ethylene glycol, propylene glycol and glycerol.

* * * * *